US012798242B2

(12) United States Patent
Nakayama

(10) Patent No.: US 12,798,242 B2
(45) Date of Patent: Nov. 17, 2026

(54) HEAD CHIP, LIQUID JET HEAD, LIQUID JET RECORDING APPARATUS, AND METHOD OF MANUFACTURING HEAD CHIP

(71) Applicant: SII Printek Inc., Chiba (JP)

(72) Inventor: Hitoshi Nakayama, Chiba (JP)

(73) Assignee: SII PRINTEK INC., Chiba (JP)

( * ) Notice: Subject to any disclaimer, the term of this patent is extended or adjusted under 35 U.S.C. 154(b) by 118 days.

(21) Appl. No.: 18/890,254

(22) Filed: Sep. 19, 2024

(65) Prior Publication Data

US 2025/0100281 A1 Mar. 27, 2025

(30) Foreign Application Priority Data

Sep. 22, 2023 (JP) ................................ 2023-158134

(51) Int. Cl.
*B41J 2/16* (2006.01)
*B41J 2/14* (2006.01)

(52) U.S. Cl.
CPC ........... *B41J 2/1623* (2013.01); *B41J 2/1433* (2013.01); *B41J 2/1607* (2013.01)

(58) Field of Classification Search
CPC ......................... B41J 2/14201; B41J 2/14209; B41J 2/14233; B41J 2/14274; B41J 2/14282; B41J 2/1429; B41J 2/14298; B41J 2002/14217; B41J 2002/14225; B41J 2002/14241; B41J 2002/1425; B41J 2002/14266; B41J 2002/14306
See application file for complete search history.

(56) References Cited

U.S. PATENT DOCUMENTS 12,070,948 B2 * 8/2024 Mine ...................... B41J 2/1623
2020/0147964 A1 * 5/2020 Ai ........................ B41J 2/17509

FOREIGN PATENT DOCUMENTS

JP 2018-122551 A 8/2018
JP 7220327 B1 * 2/2023 .......... B41J 2/17546
JP 2023-091543 A 6/2023

* cited by examiner

*Primary Examiner* — Sharon Polk
(74) *Attorney, Agent, or Firm* — Crowell & Moring LLP

(57) ABSTRACT

A head chip, a liquid jet head, a liquid jet recording apparatus, and a method of manufacturing a head chip capable of preventing penetrating holes from being stopped up with an adhesive while increasing the yield ratio are provided. The head chip according to an aspect of the present disclosure includes a first plate provided with a first interconnection formed on an obverse surface, and a second plate bonded to the obverse surface. The second plate is provided with a first recessed part opening on a first surface, and a second recessed part opening on a second surface. The second recessed part includes a first inner surface part extending in a thickness direction at an inner side of the inner surface of the first recessed part viewed from the thickness direction, and a second inner surface part extending in the thickness direction at an outer side of the inner surface of the first recessed part. The second plate is provided with a second interconnection which penetrates the second plate through the first inner surface part and the inner surface of the first recessed part, and which couples an external interconnection disposed at the first side in the thickness direction to the second plate and the first interconnection to each other.

11 Claims, 41 Drawing Sheets

HEAD CHIP, LIQUID JET HEAD, LIQUID JET RECORDING APPARATUS, AND METHOD OF MANUFACTURING HEAD CHIP

RELATED APPLICATIONS

This application claims priority to Japanese Patent application No. JP2023-158134 filed on Sep. 22, 2023, the entire content of which is incorporated herein by reference.

BACKGROUND OF THE INVENTION

1. Field of the Invention

The present disclosure relates to a head chip, a liquid jet head, a liquid jet recording apparatus, and a method of manufacturing a head chip.

2. Description of the Related Art

Inkjet heads eject ink to recording target media through head chips. The head chips are each provided with an actuator plate provided with ejection channels, and a cover plate stacked on the actuator plate (see, e.g., JP2023-091543A and JP2018-122551A).

The cover plate is provided with penetrating holes which are made to function as through holes. The penetrating holes can be formed by sandblast or etching.

However, there is a possibility that the penetrating holes are stopped up with an adhesive when bonding the actuator plate and the cover plate to each other with the adhesive. On this occasion, it is difficult to ensure conduction between wiring at the actuator plate side and wiring at the cover plate side when depositing an electrode material on inner surfaces of the penetrating holes after bonding the actuator plate and the cover plate to each other.

The present disclosure provides a head chip, a liquid jet head, a liquid jet recording apparatus, and a method of manufacturing a head chip each capable of ensuring the conduction between the wiring at the actuator plate side and the wiring at the cover plate side to thereby increase the yield ratio.

SUMMARY OF THE INVENTION

In order to solve the problems described above, the present disclosure adopts the following aspects.

(1) A head chip according to an aspect of the present disclosure includes a first plate having an obverse surface which faces to a first side in a thickness direction, and which is provided with a first interconnection corresponding to a pressure chamber configured to retain a liquid, and a second plate bonded to the obverse surface, wherein the second plate is provided with a first recessed part opening on a first surface facing to the first side in the thickness direction, and a second recessed part which opens on a second surface facing to a second side opposite to the first side in the thickness direction, and which is communicated with the first recessed part, the second recessed part is provided with a first inner surface part which is located within a dimensional range of the first recessed part viewed from the thickness direction, and which extends in the thickness direction continuously to an inner surface of the first recessed part, or extends in the thickness direction at an inner side with respect to the inner surface of the first recessed part, and a second inner surface part which extends in the thickness direction at an outer side with respect to the inner surface of the first recessed part at a position different from a position of the first inner surface part viewed from the thickness direction, and the second plate is provided with a second interconnection which penetrates the second plate through the first inner surface part and the inner surface of the first recessed part, and which couples an external interconnection disposed at the first side in the thickness direction to the second plate and the first interconnection to each other.

According to the present aspect, when forming the first interconnection through the first opening part opening on the first surface in the first recessed part, it is easy to continuously form the interconnection throughout the first inner surface part and the inner surface of the first recessed part.

On that basis, a portion (an outer flared part) located at the outer side of the first recessed part viewed from the thickness direction in the second recessed part is formed. Therefore, when bonding the first plate and the second plate to each other, the outer flared part functions as an adhesive pool. In other words, it is possible to retain the adhesive in another portion than the communication portion between the first recessed part and the second recessed part. Thus, it is possible to prevent the conduction between the first interconnection and the second interconnection from being blocked by the adhesive, and thus, it is possible to achieve the stability in the conduction between the first interconnection and the second interconnection. As a result, the yield ratio can be improved.

(2) In the head chip according to the aspect (1) described above, it is preferable that an opening area on the second surface in the second recessed part is larger than an opening area on the first surface in the first recessed part.

According to the present aspect, it becomes easy to ensure the capacity of the outer flared part as the adhesive pool, and thus, it is possible to achieve the stability in conduction between the first interconnection and the second interconnection.

(3) In the head chip according to the aspect (1) or (2) described above, it is preferable that a plurality of the first recessed parts is disposed at intervals in a first direction crossing the thickness direction, and a plurality of the second recessed parts is disposed so as to correspond respectively to the first recessed parts.

According to the present aspect, since the first recessed part and the second recessed part are formed so as to individually correspond to each other, for example, when there is a plurality of second interconnections, it is easy to ensure the stability of conduction compared to when the second interconnections adjacent to each other are formed in the same first recessed part and the same second recessed part.

(4) In the head chip according to the aspect (1) or (2) described above, it is preferable that a plurality of the first recessed parts is disposed at intervals in a first direction crossing the thickness direction, the second recessed part extends in the first direction so as to straddle at least adjacent two of the plurality of first recessed parts, out of inner surfaces of the second recessed part, the first inner surface part extends in the thickness direction continuously to the inner surface of the first recessed part or extends in the thickness direction at an inner side in a second direction crossing the first direction viewed from the thickness direction with respect to the inner surface of the first recessed part, and out of the inner surfaces of the second recessed part, the second inner surface part extends in the thickness direction at an outer side in the first direction with respect to the inner surface of the first recessed part.

According to the present aspect, it is sufficient to dispose a single second recessed part to at least two first recessed parts adjacent to each other out of the plurality of first recessed parts. Therefore, compared to when forming the second recessed parts separately so as to correspond respectively to the first recessed parts, it is possible to achieve an increase in manufacturing efficiency of the second recessed parts.

(5) In the head chip according to any of the aspects (1) through (4) described above, it is preferable to further include an actuator plate which includes a drive unit disposed so as to face the pressure chamber, and which is configured to deform so as to expand or contract the pressure chamber, and a common electrode and an individual electrode which are provided to the actuator plate, and which are configured to generate an electric field in the actuator plate to deform the actuator plate, wherein the first interconnection includes a common extraction interconnection coupled to the common electrode, and an individual extraction interconnection coupled to the individual electrode.

According to the present aspect, it is easy to route the interconnections from the common electrodes and the individual electrodes toward the external interconnections.

(6) In the head chip according to the aspect (5) described above, it is preferable that the second interconnection includes a common penetrating interconnection coupled to the common extraction interconnection, and an individual penetrating interconnection coupled to the individual extraction interconnection, the common penetrating interconnection and the individual penetrating interconnection are formed independently of each other on an inner surface of the first recessed part and the second recessed part communicated with each other.

According to the present aspect, since common interconnection and the individual interconnection are formed through the first recessed part and the second recessed part communicated with each other, it is possible to reduce the number of the first recessed parts and the second recessed parts compared when separately forming the first recessed part and the second recessed part for each of the common interconnections and the individual interconnections. As a result, it is possible to achieve an increase in degree of design freedom, a reduction in pitch of the pressure chambers, and a reduction in size of the head chip.

Further, it is easy to ensure the opening area of the first opening part compared to when separately forming the first recessed part and the second recessed part for each of the common penetrating interconnections and the individual penetrating interconnections. Therefore, it is possible to effectively introduce the electrode material into the first recessed part and the second recessed part, and thus it is possible to increase the yield ratio.

(7) In the head chip according to the aspect (5) described above, it is preferable that the second interconnection includes a common penetrating interconnection coupled to the common extraction interconnection, and an individual penetrating interconnection coupled to the individual extraction interconnection, the second recessed part is provided with a common-use recessed part communicated with the first recessed part, and an individual-use recessed part communicated with the first recessed part in a state of being partitioned from the common-use recessed part with a partition wall, the common penetrating interconnection is formed throughout the inner surface of the first recessed part and an inner surface of the common-use recessed part, and the individual penetrating interconnection is formed throughout the inner surface of the first recessed part and an inner surface of the individual-use recessed part.

According to the present aspect, it is easy to ensure the opening area of the first opening part compared to when separately forming the first recessed part and the second recessed part for each of the common penetrating interconnections and the individual penetrating interconnections. On that basis, by partitioning the second recessed part with the partition wall, it is possible to reduce the area of a portion of the first plate, the portion being exposed through the second recessed part. Therefore, it is possible to prevent the interconnections of respective systems different from each other from being coupled to each other on the obverse surface of the first plate.

(8) In the head chip according to any of the aspects (1) through (7) described above, it is preferable that the first recessed part is formed to have a taper shape having an inner diameter decreasing toward the second side in the thickness direction, and a dimension in the thickness direction in the first recessed part is larger than a dimension in the thickness direction in the second recessed part.

According to the present aspect, when forming the first interconnection through the first opening part opening on the first surface in the first recessed part using, for example, oblique vapor deposition, it is easy to continuously form the interconnection throughout the first inner surface part and the inner surface of the first recessed part. As a result, it is possible to achieve the reduction in cost of the head chip.

(9) In the head chip according to any of the aspects (1) through (7) described above, it is preferable that the first recessed part is formed to have a taper shape having an inner diameter gradually decreasing toward the second side in the thickness direction, and a dimension in the thickness direction in the first recessed part is smaller than a dimension in the thickness direction in the second recessed part.

According to the present aspect, when forming the first recessed part using the sandblasting or the like, the first recessed part is formed to have the taper shape in which the inner diameter gradually decreases in a predetermined range in the thickness direction from the first opening part, but when the predetermined range is exceeded, there is a possibility of an occurrence of the phenomenon that the inner diameter increases once, and then decreases once again. In this case, a constricted portion is formed in a midway portion in the thickness direction in the first recessed part. The constricted portion tends to be formed at the second side in the thickness direction as the inner diameter of the first opening part increases.

Therefore, by making the dimension in the thickness direction in the first recessed part smaller than the dimension in the thickness direction in the second recessed part as in the present aspect, it is possible to decrease the inner diameter of the first opening part. As a result, it is possible to achieve an increase in degree of design freedom, a reduction in pitch of the pressure chambers, and a reduction in size of the head chip.

(10) A liquid jet head according to an aspect of the present disclosure preferably includes the head chip according to any one of the aspects (1) through (9) described above.

According to the present aspect, since the head chip according to the aspect described above is provided, it is possible to provide the liquid jet head excellent in reliability.

(11) A liquid jet recording apparatus according to an aspect of the present disclosure preferably includes the liquid jet head according to the aspect (10) described above.

According to the present aspect, since the head chip according to the aspect described above is provided, it is possible to provide the liquid jet recording apparatus excellent in reliability.

(12) A method of manufacturing a head chip according to an aspect of the present disclosure is a method of manufacturing a head chip including a first plate having an obverse surface which faces to a first side in a thickness direction, and which is provided with a first interconnection corresponding to a pressure chamber configured to retain a liquid, and a second plate disposed on the obverse surface, the second plate being provided with a first recessed part opening on a first surface facing to a first side in the thickness direction, and a second recessed part which opens on a second surface facing to a second side opposite to the first side in the thickness direction, and which is communicated with the first recessed part, the method including an interconnection formation step of forming a second interconnection configured to couple an external interconnection disposed at the first side in the thickness direction to the second plate and the first interconnection to each other on an inner surface of the first recessed part and an inner surface of the second recessed part through an opening part on the first surface in the first recessed part in a state in which the second plate is bonded to the obverse surface of the first plate, wherein the second recessed part is provided with a first inner surface part which is located within a dimensional range of the first recessed part viewed from the thickness direction, and which extends in the thickness direction continuously to an inner surface of the first recessed part, or extends in the thickness direction at an inner side with respect to the inner surface of the first recessed part, and a second inner surface part which extends in the thickness direction at an outer side with respect to the inner surface of the first recessed part at a position different from a position of the first inner surface part viewed from the thickness direction.

(13) In the method of manufacturing the head chip according to the aspect (12) described above, it is preferable that the first recessed part is formed by performing sandblasting from the first surface side, and the second recessed part is formed by performing dicing processing from the second surface side.

According to the present aspect, when forming the first recessed part using the sandblasting, the first recessed part is formed to have the taper shape in which the inner diameter gradually decreases in a predetermined range in the thickness direction from the first opening part, but when the predetermined range is exceeded, there is a possibility of an occurrence of the phenomenon that the inner diameter increases once, and then decreases once again. In this case, a constricted portion is formed in a midway portion in the thickness direction in the first recessed part. The constricted portion tends to be formed at the second side in the thickness direction as the inner diameter of the first opening part increases.

Therefore, in the present aspect, by forming the second recessed part using the dicing processing, it is possible to penetrate the second plate with the first recessed part and the second recessed part while removing the constricted portion. Therefore, unlike when grinding the second plate so as to remove the constricted portion after forming the first recessed part using the sandblasting as in the related art, it is possible to prevent the thickness of the second plate from changing between before and after the processing. In other words, since it is possible to perform the processing on the second plate while keeping the thickness of the second plate, it is possible to prevent an occurrence of cracks and so on to improve the handling property. As a result, it is possible to increase the manufacturing efficiency.

According to an aspect of the present disclosure, it is possible to ensure the conduction between the interconnection at the actuator plate side and the interconnection at the cover plate side to improve the yield ratio.

DETAILED DESCRIPTION OF THE PREFERRED EMBODIMENTS

Figure 1:
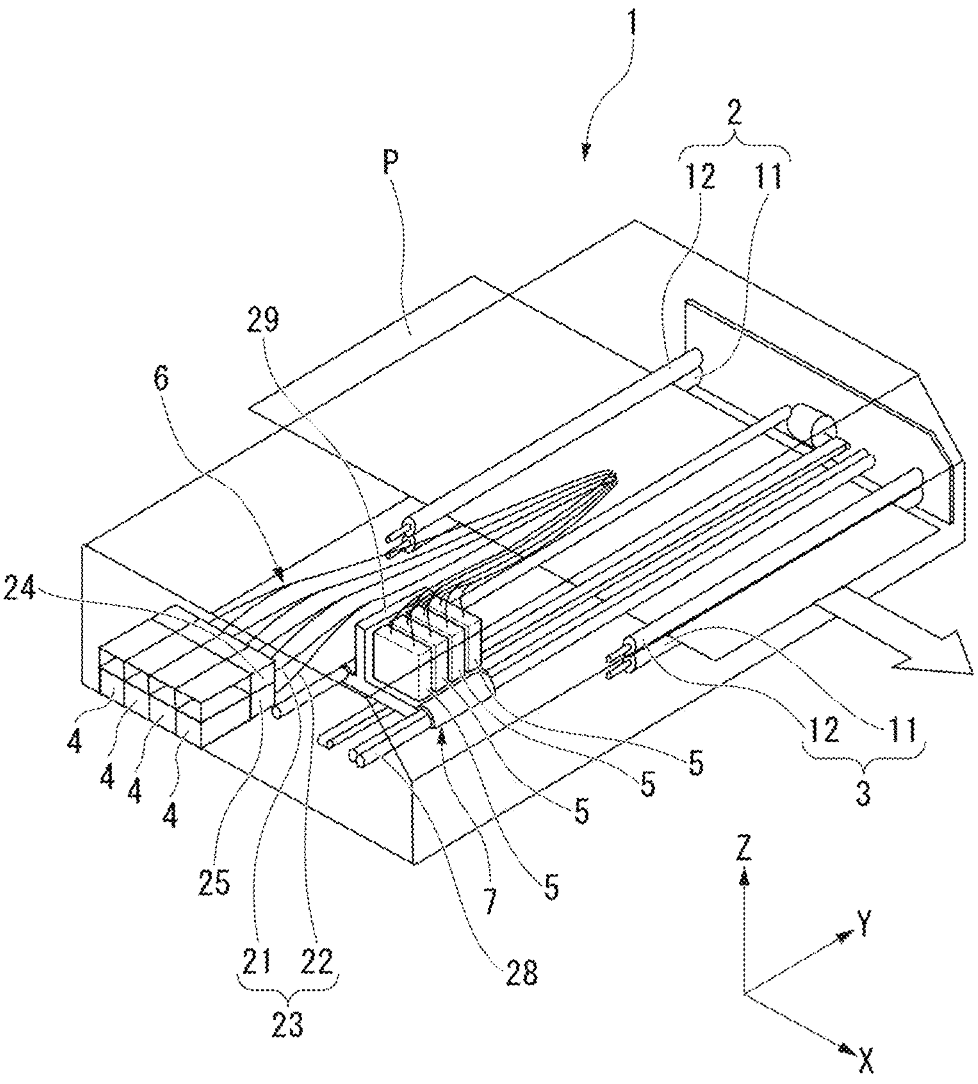
FIG. 1 is a schematic configuration diagram of an inkjet printer according to a first embodiment.

Some embodiments according to the present disclosure will hereinafter be described with reference to the drawings. In the embodiments and modified examples hereinafter described, constituents corresponding to each other are denoted by the same reference symbols, and the description thereof will be omitted in some cases. In the following description, expressions representing relative or absolute arrangements such as “parallel,” “perpendicular,” “central,” and “coaxial” not only represent strictly such arrangements, but also represent the state of being relatively displaced with a tolerance, or an angle or a distance to the extent that the same function can be obtained. In the following embodiment, the description will be presented citing an inkjet printer (hereinafter referred to simply as a printer) for performing recording on a recording target medium using ink (a liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

The printer (a liquid jet recording apparatus) 1 shown in FIG. 1 is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, the X direction coincides with a conveying direction (a sub-scanning direction) of a recording target medium P (e.g., paper). The Y direction coincides with a scanning direction (a main scanning direction) of the scanning mechanism 7. The Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present specification, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

In the ink tanks 4, there are respectively contained four colors of ink such as yellow ink, magenta ink, cyan ink, and black ink. The inkjet heads 5 are configured so as to be able to respectively eject the four colors of ink, namely the yellow ink, the magenta ink, the cyan ink, and the black ink according to the ink tanks 4 coupled thereto.

Figure 2:
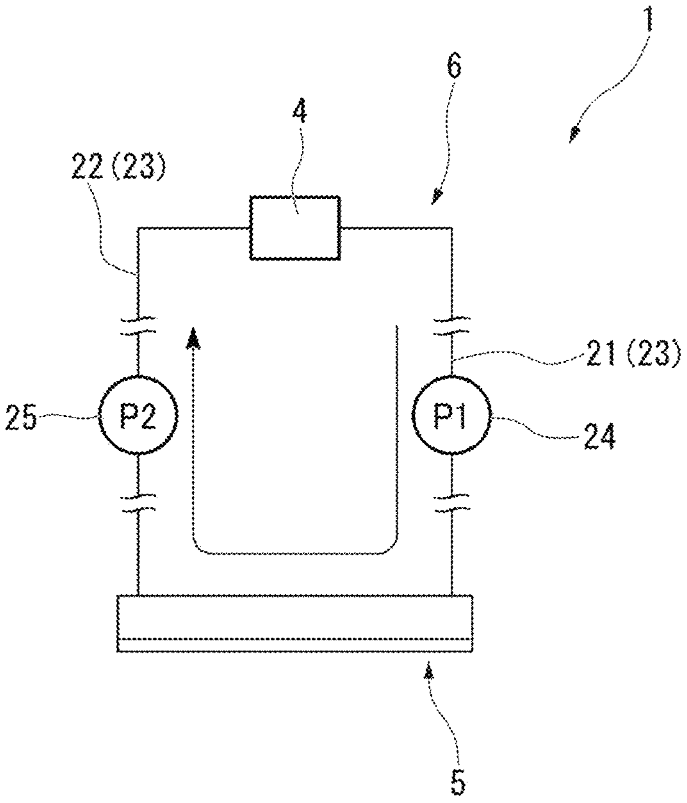
FIG. 2 is a schematic configuration diagram of an inkjet head and an ink circulation mechanism related to the first embodiment.

FIG. 2 is a schematic configuration diagram of the inkjet head 5 and the ink circulation mechanism 6.

As shown in FIGS. 1, 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 side is provided with positive pressure with respect to the inkjet head 5.

The suction pump 25 depressurizes the inside of the ink discharge tube 22 to suction the ink from the inkjet head 5 through the ink discharge tube 22. Thus, the ink discharge tube 22 side is provided with negative pressure with respect to the inkjet head 5. It is arranged that the ink can circulate between the inkjet head 5 and the ink tank 4 through the circulation flow channel 23 by driving the pressure pump 24 and the suction pump 25.

As shown in FIG. 1, the scanning mechanism 7 reciprocates the inkjet heads 5 in the Y direction. The scanning mechanism 7 is provided with a guide rail 28 extending in the Y direction, and a carriage 29 movably supported by the guide rail 28.

<Inkjet Heads 5>

The inkjet heads 5 are mounted on the carriage 29. In the illustrated example, the plurality of inkjet heads 5 is mounted on the single carriage 29 so as to be arranged side by side in the Y direction. The inkjet heads 5 are each provided with a head chip 50, an ink supply unit (not shown) for coupling the ink circulation mechanism 6 and the head chip 50 to each other, and a control unit (not shown) for applying drive voltages to the head chip 50.

<Head Chip 50>

Figure 3:
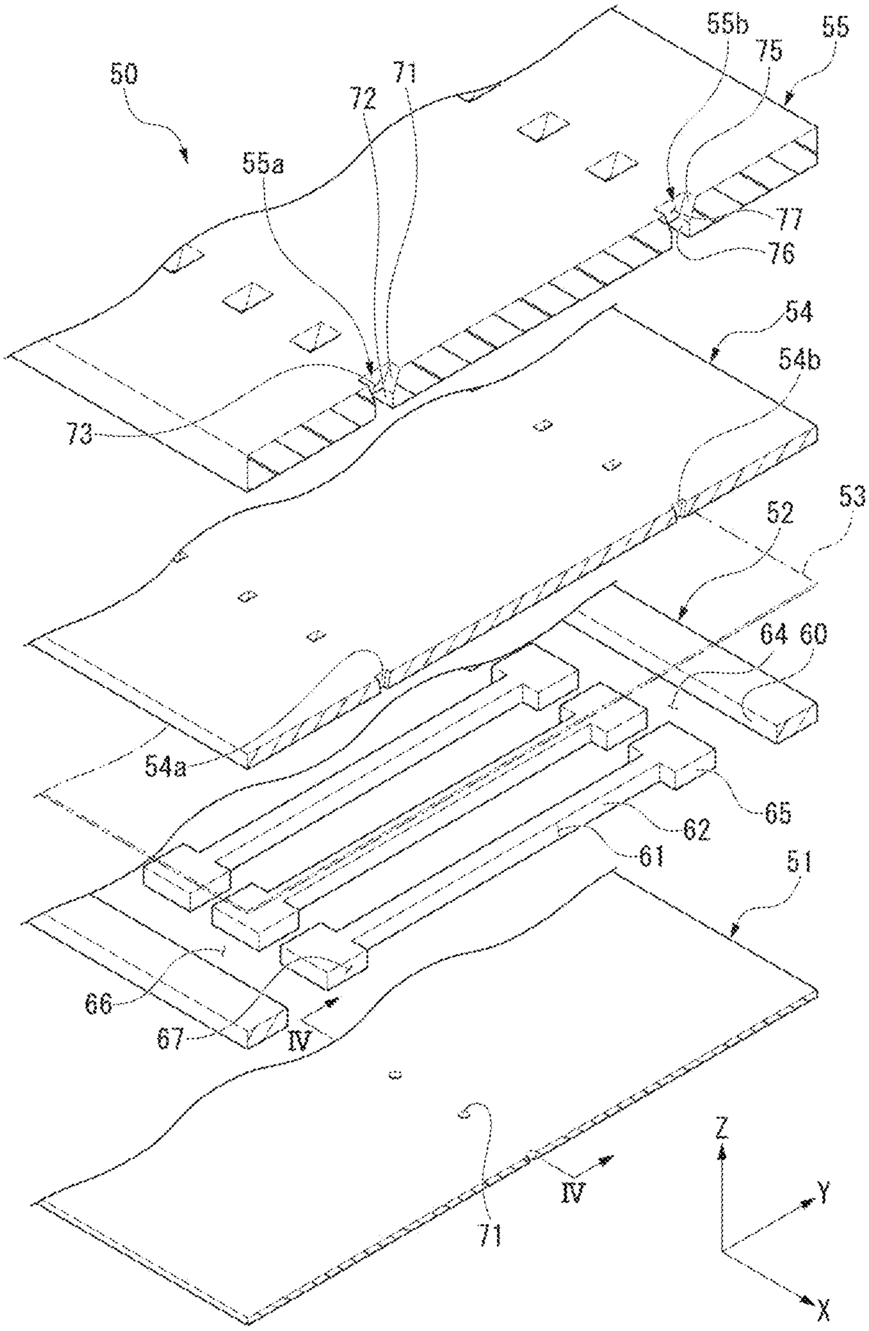
FIG. 3 is an exploded perspective view of a head chip according to the first embodiment.
Figure 4:
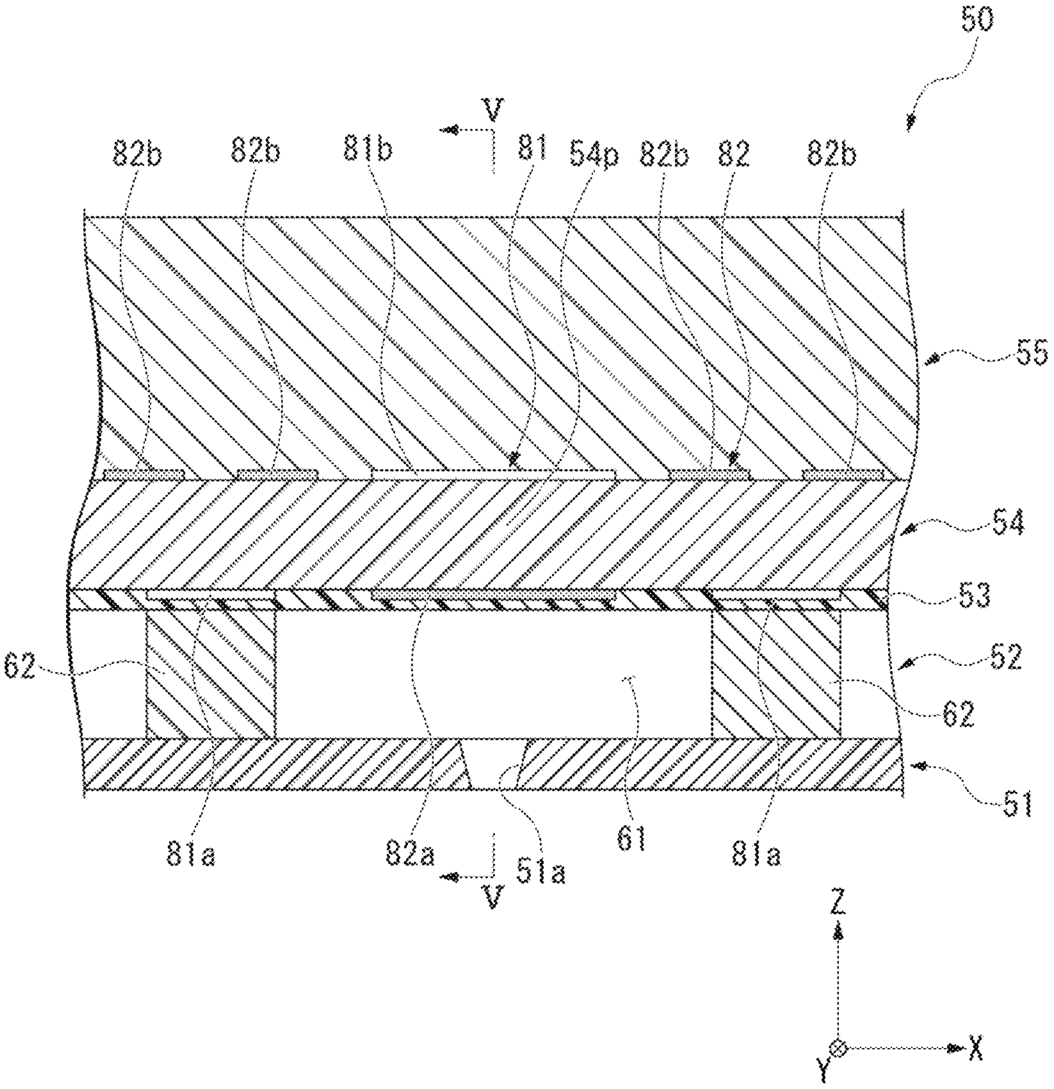
FIG. 4 is a cross-sectional view corresponding to the line IV-IV shown in FIG. 3.
Figure 5:
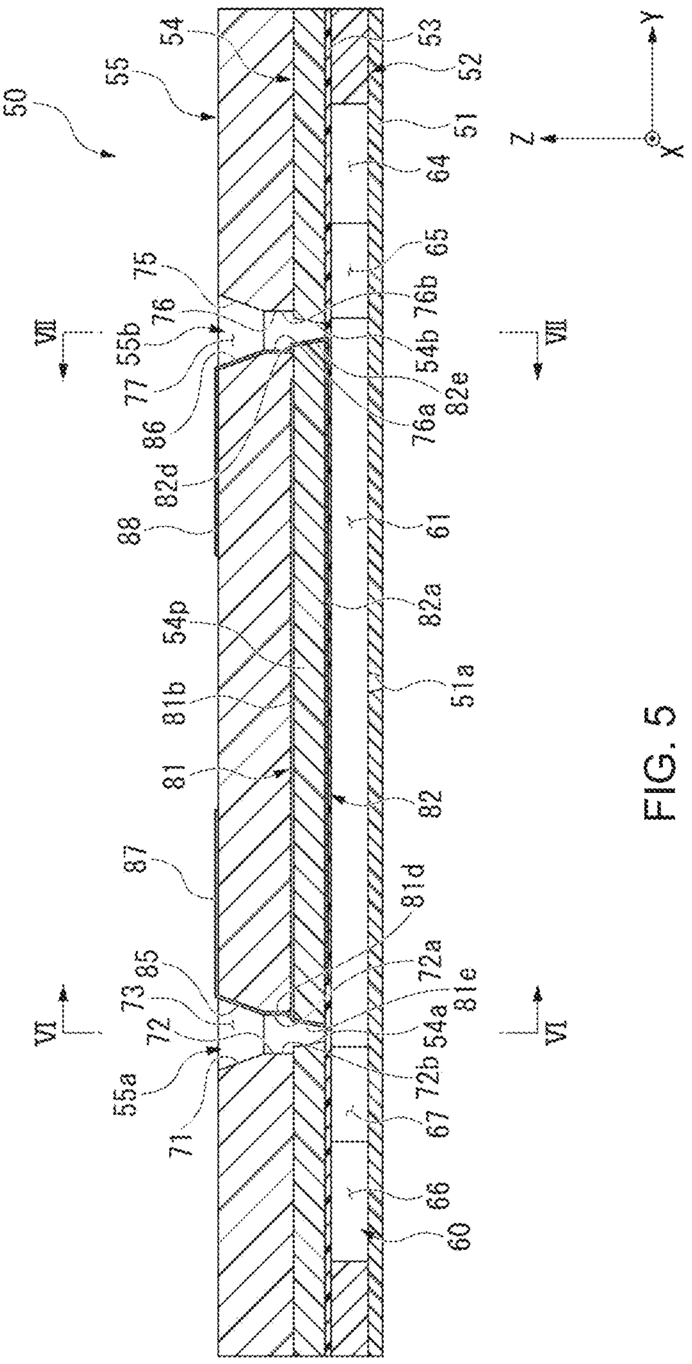
FIG. 5 is a cross-sectional view corresponding to the line V-V shown in FIG. 4.

FIG. 3 is an exploded perspective view of the head chip 50. FIG. 4 is a cross-sectional view of the head chip 50 corresponding to the line IV-IV shown in FIG. 3. FIG. 5 is a cross-sectional view of the head chip 50 corresponding to the line V-V shown in FIG. 4.

The head chip 50 shown in FIG. 3 through FIG. 5 is a so-called recirculating side-shoot type head chip 50 which circulates the ink with the ink tank 4, and at the same time, ejects the ink from a central portion in the extending direction (the Y direction) in a pressure chamber 61 described later. The head chip 50 is provided with a nozzle plate 51, a flow channel member 52, a film 53, an actuator plate (a first member) 54, and a cover plate (a second member) 55. In the following explanation, the description is presented in some cases defining a direction (+Z side) from the nozzle plate 51 toward the cover plate 55 along the Z direction as an upper side, and a direction (−Z side) from the cover plate 55 toward the nozzle plate 51 along the Z direction as a lower side.

<Flow Channel Member 52>

As shown in FIG. 3, the flow channel member 52 is shaped like a plate with the thickness direction set to the Z direction. The flow channel member 52 is formed of a material having ink resistance. As such a material, it is possible to adopt, for example, metal, metal oxide, glass, resin, and ceramics. The flow channel member 52 is provided with a flow channel 60 through which the ink circulates, and a plurality of pressure chambers 61 which is communicated with the flow channel 60, and which contains the ink. The flow channel 60 and the pressure chambers 61 penetrate the flow channel member 52 in the Z direction.

The pressure chambers 61 are arranged in the X direction at intervals. Therefore, in the flow channel member 52, a portion located between the pressure chambers 61 adjacent to each other constitutes a partition wall 62 for partitioning the pressure chambers 61 adjacent to each other in the X direction. The pressure chambers 61 are each formed like a groove linearly extending in the Y direction. The pressure chambers 61 each penetrate the flow channel member 52 throughout the entire length in the Y direction. It should be noted that it is possible for the pressure chamber 61 to penetrate the flow channel member 52 in a part in the Y direction. The configuration in which the channel extension direction coincides with the Y direction will be described in the first embodiment, but the channel extension direction may cross the Y direction. A planar shape of the pressure chamber 61 is not limited to a rectangular shape (a shape the longitudinal direction of which is set to either one of the X direction and the Y direction, and the transverse direction of which is set to the other thereof). The planar shape of the pressure chamber 61 may be a polygonal shape such as a square shape or a triangular shape, a circular shape, an elliptical shape, or the like.

The flow channel 60 includes an entrance-side common flow channel 64, entrance-side communication channels 65, an exit-side common flow channel 66, and exit-side communication channels 67.

The entrance-side common flow channel 64 extends in the X direction in a portion of the flow channel member 52, the portion being located at the +Y side of the pressure chambers 61. A −X-side end portion in the entrance-side common flow channel 64 is coupled to an entrance port (not shown). The entrance port is directly or indirectly coupled to the ink supply tube 21 (see FIG. 2). In other words, the ink flowing through the ink supply tube 21 is supplied to the entrance-side common flow channel 64 through the entrance port.

The entrance-side communication channels 65 respectively couple the entrance-side common flow channel 64 and the pressure chambers 61 to each other. Specifically, the entrance-side communication channels 65 are each branched toward the −Y side from a portion of the entrance-side common flow channel 64, the portion overlapping the pressure chamber 61 when viewed from the X direction. A −Y-side end portion in the entrance-side communication channel 65 is coupled to the pressure chamber 61.

The exit-side common flow channel 66 extends in the X direction in a portion of the flow channel member 52, the portion being located at the −Y side with respect to each of the pressure chambers 61. A +X-side end portion in the exit-side common flow channel 66 is coupled to an exit port (not shown). The exit port is directly or indirectly coupled to the ink discharge tube 22 (see FIG. 2). In other words, the ink flowing through the exit-side common flow channel 66 is supplied to the ink discharge tube 22 through the exit port.

The exit-side communication channels 67 respectively couple the exit-side common flow channel 66 and the pressure chambers 61 to each other. Specifically, the exit-side communication channels 67 are each branched toward the +Y side from a portion of the exit-side common flow channel 66, the portion overlapping the pressure chamber 61 when viewed from the X direction. A +Y-side end portion in the exit-side communication channel 67 is coupled to the pressure chamber 61.

<Nozzle Plate 51>

As shown in FIG. 4 and FIG. 5, the nozzle plate 51 is fixed to the lower surface of the flow channel member 52 with bonding or the like. The nozzle plate 51 closes a lower end opening part of each of the flow channel 60 and the pressure chambers 61. In the first embodiment, the nozzle plate 51 is formed of a metal material such as SUS or Ni—Pd. It should be noted that it is possible for the nozzle plate 51 to have a single layer structure or a laminate structure with a resin material (e.g., polyimide), glass, silicone, or the like besides the metal material.

The nozzle plate 51 is provided with a plurality of nozzle holes 51*a* penetrating the nozzle plate 51 in the Z direction. The nozzle holes 51*a* are arranged at intervals in the X direction. The nozzle holes 51*a* are each communicated with corresponding one of the pressure chambers 61 in a central portion in the X direction and the Y direction. In the first embodiment, each of the nozzle holes 51*a* is formed to have, for example, a taper shape having an inner diameter gradually decreasing in a direction from the upper side toward the lower side.

<Film 53>

The film 53 is fixed to an upper surface of the flow channel member 52 with bonding or the like. The film 53 is arranged throughout the entire area of the upper surface of the flow channel member 52. Thus, the film 53 closes an upper end opening part of each of the flow channel 60 and the pressure chambers 61. The film 53 is formed of a material which has an insulating property and ink resistance, and which is elastically deformable. As such a material, the first film 53 is formed of, for example, a resin material (a polyimide type, an epoxy type, a polypropylene type, and so on).

<Actuator Plate 54>

The actuator plate 54 is fixed to an upper surface of the film 53 with bonding or the like with the thickness direction set to the Z direction. The actuator plate 54 is opposed to the pressure chambers 61 in the Z direction across the film 53.

It should be noted that the actuator plate 54 is not limited to the configuration of covering the pressure chambers 61 in a lump, but can individually be disposed for each of the pressure chambers 61. In the first embodiment, a portion of the actuator plate 54 opposed to the pressure chambers 61 forms a drive unit 54*p* (see FIG. 4).

The actuator plate 54 is formed of a piezoelectric material such as PZT (lead zirconate titanate). The actuator plate 54 is set so that the polarization direction faces to one direction toward the +Z side.

Figure 6:
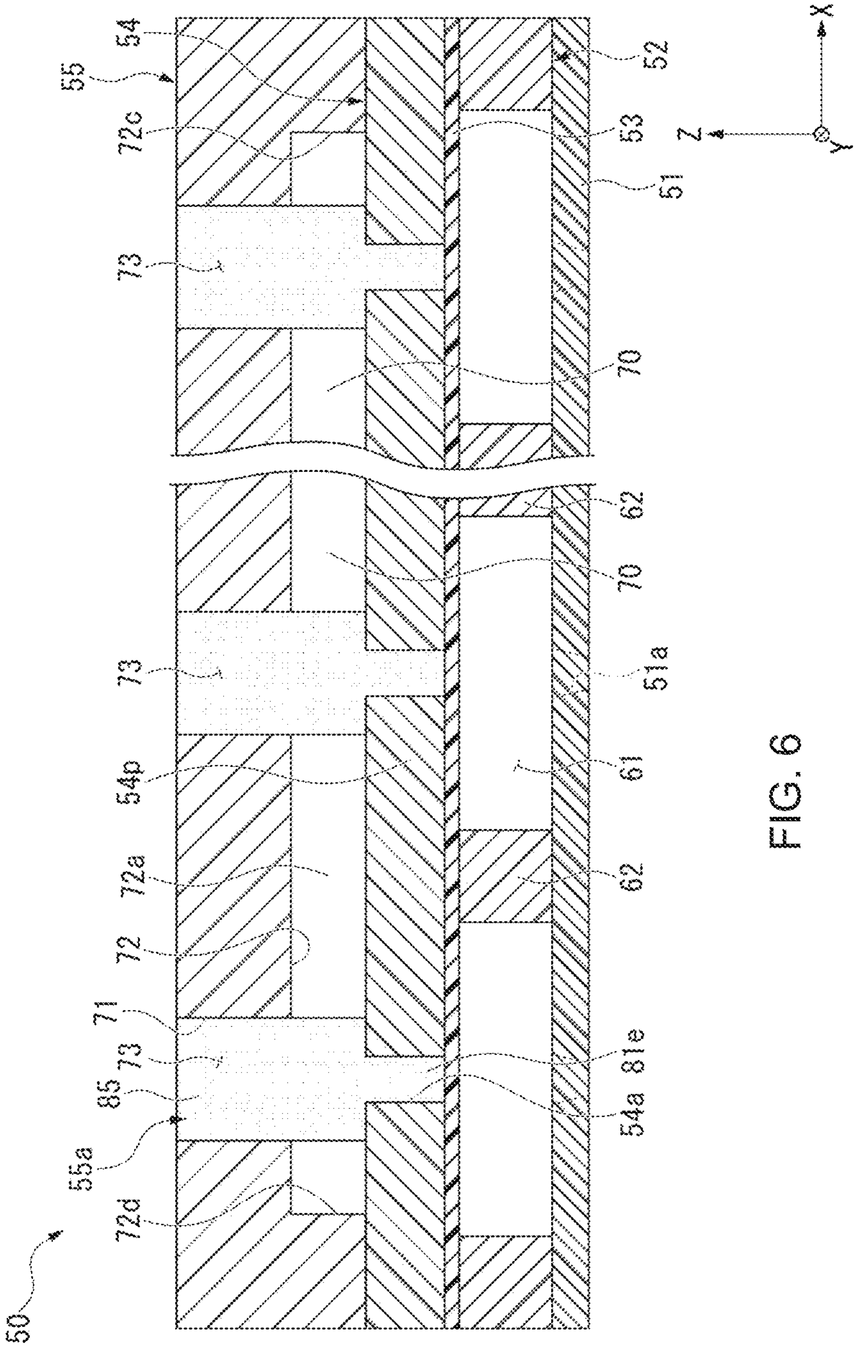
FIG. 6 is a cross-sectional view corresponding to the line VI-VI shown in FIG. 5.

FIG. 6 is a cross-sectional view corresponding to the line VI-VI shown in FIG. 5.

As shown FIG. 5 and FIG. 6, the actuator plate 54 is provided with first penetrating holes 54*a* and second penetrating holes 54*b*. Each of the penetrating holes 54*a*, 54*b* is formed to have a taper shape having an inner diameter (an inner size) in at least the Y direction gradually decreasing in a direction from the upper side toward the lower side. It should be noted that it is possible for the inner diameter of each of the penetrating holes 54*a*, 54*b* to be uniform throughout the entire length in the Z direction. Further, a planar shape of each of the penetrating holes 54*a*, 54*b* can appropriately be changed to a circular shape, an elliptical shape, a polygonal shape, and so on. The penetrating holes 54*a*, 54*b* may be the same shape as each other, or may also be different in shape from each other.

The first penetrating holes 54*a* each penetrate a portion of the actuator plate 54, the portion overlapping the −Y-side end portion of the pressure chamber 61 in a plan view.

The second penetrating holes 54*b* each penetrate a portion of the actuator plate 54, the portion overlapping the +Y-side end portion of the pressure chamber 61 in the plan view. The first penetrating hole 54*a* and the second penetrating hole 54*b* corresponding to each other are formed at positions opposed in the Y direction to each other. It should be noted that the first penetrating hole 54*a* and the second penetrating hole 54*b* may be disposed at respective positions shifted in the X direction from the pressure chamber 61 in the plan view. Further, the first penetrating hole 54*a* and the second penetrating hole 54*b* corresponding to each other may be disposed so as not to be opposed in the Y direction to each other (at respective positions shifted in the X direction from each other).

<Cover Plate 55>

The cover plate 55 is fixed to an upper surface of the actuator plate 54 with bonding or the like with the thickness direction set to the Z direction. The cover plate 55 is thicker in thickness in the Z direction than the actuator plate 54, the flow channel member 52, and the film 53. In the first embodiment, the cover plate 55 is formed of a material (e.g., metal oxide, glass, resin, or ceramics) having an insulating property.

The cover plate 55 is provided with first conduction parts 55*a* and second conduction parts 55*b*. The first conduction parts 55*a* are disposed in the −Y-side end portion of the cover plate 55. The second conduction parts 55*b* are disposed in the +Y-side end portion of the cover plate 55.

The first conduction parts 55*a* are each provided with an upper recessed part (a first recessed part) 71 and a lower recessed part (a second recessed part) 72.

The upper recessed parts 71 are respectively formed in portions of the cover plate 55 each at least partially overlapping the first penetrating hole 54*a* in the plan view. In other words, a plurality of the upper recessed parts 71 is formed at intervals in the X direction so as to correspond to the first penetrating holes 54*a*. It should be noted that the upper recessed part 71 (the first conduction part 55*a*) may be arranged so as to be shifted from the first penetrating hole 54*a* in the plan view. When the first conduction part 55*a* and the first penetrating hole 54*a* are arranged so as to overlap each other, the reliability of the conduction between the first conduction part 55*a* and the first penetrating hole 54*a* is easily ensured. In contrast, when the first conduction part 55*a* and the first penetrating hole 54*a* are arranged so as to be shifted from each other, the strength of the head chip 50 is easily ensured.

The upper recessed part 71 opens on the upper surface of the cover plate 55. Specifically, the upper recessed part 71 forms an upper end opening part of the first conduction part 55*a*. The upper recessed part 71 is formed to have a rectangular shape (or an elliptical shape) with the long axis direction set to the Y direction in the plan view. The upper recessed part 71 is formed to have a taper shape having an inner diameter (an inner size) in at least the Y direction gradually decreasing in a direction from the upper side toward the lower side in a cross-sectional view. It should be noted that the planar shape of the upper recessed part 71 can appropriately be changed to a true circular shape, a polygonal shape, and so on.

The lower recessed part 72 opens on the lower surface of the cover plate 55. Specifically, the lower recessed part 72 forms a lower end opening part of the first conduction part 55*a*. The lower recessed part 72 is formed like a groove extending in the X direction so as to straddle all of the upper recessed parts 71. The lower recessed part 72 is communicated with the inside of the upper recessed part 71 through the portion overlapping the upper recessed part 71 in the plan view. In the first conduction part 55*a*, a portion communicated with the upper recessed part 71 and the lower recessed part 72 forms a first penetrating part 73 penetrating the cover plate 55 in the Z direction. It should be noted that the lower recessed part 72 is not limited to when straddling all of the upper recessed parts 71, but is only required to straddle at least the upper recessed parts 71 adjacent to each other.

The dimension in the Y direction of the lower recessed part 72 is made equivalent to the dimension in the Y direction in the lower end opening part of the upper recessed part 71. In the illustrated example, the dimension in the Y direction in the lower recessed part 72 is uniform throughout the entire length in the Z direction. As shown in FIG. 5, out of the pair of inner surfaces opposed in the Y direction to each other in the lower recessed part 72, a +Y-side inner surface (a first inner surface part) 72*a* continues (is arranged at the same position in the plan view) from the same position in the plan view as the position of a portion (hereinafter referred to as a +Y-side opening edge) located at the +Y side out of the lower end opening edge of the upper recessed part 71 without a step. Therefore, the +Y-side inner surface 72*a* is located within a dimensional range of the lower end opening part of the upper recessed part 71 viewed from the Z direction, and continuously extends with respect to the inner surface of the upper recessed part 71.

Out of the pair of inner surfaces opposed in the Y direction to each other in the lower recessed part 72, a −Y-side inner surface (the first inner surface part) 72*b* continues (is arranged at the same position in the plan view) from a portion (hereinafter referred to as a −Y-side opening edge) located at the −Y side out of the lower end opening edge of the upper recessed part 71 without a step. Therefore, the −Y-side inner surface 72*b* is located within a dimensional range of the lower end opening part of the upper recessed part 71 viewed from the Z direction, and continuously extends with respect to the inner surface of the upper recessed part 71.

In the first embodiment, the dimension in the Y direction of the lower recessed part 72 is larger than the dimension in the Y direction in the first penetrating hole 54*a*. Therefore, the +Y-side inner surface 72*a* and the −Y-side inner surface 72*b* are located outside in the Y direction with respect to the first penetrating hole 54*a*. It should be noted that the +Y-side inner surface 72*a* and the −Y-side inner surface 72*b* may be disposed at the same positions as the positions of the upper end opening edges of the first penetrating hole 54*a*. Further, when the first conduction part 55*a* and the first penetrating hole 54*a* are arranged so as to be shifted from each other, the dimension in the Y direction of the lower recessed part 72 may be smaller than the dimension of the first penetrating hole 54*a*.

As shown in FIG. 6, the +X-side end portion in the lower recessed part 72 is located at the +X side with respect to the upper recessed part 71 located at the extreme +X side of the upper recessed parts 71. In other words, the +X-side inner surface (a second inner surface part) 72*c* out of the inner surfaces of the lower recessed part 72 is located at the +X side with respect to any of the upper recessed parts 71.

The −X-side end portion in the lower recessed part 72 is located at the −X side with respect to the upper recessed part 71 located at the extreme −X side of the upper recessed parts 71. In other words, the −X-side inner surface (the second inner surface part) 72*d* out of the inner surfaces of the lower recessed part 72 is located at the −X side with respect to any of the upper recessed parts 71. It should be noted that the lower recessed parts 72 may individually be disposed respectively to the upper recessed parts 71. The lower recessed part 72 may be disposed so as to straddle any two or more of all of the upper recessed parts 71.

As shown in FIG. 5, the second conduction part 55*b* is provided with an upper recessed part 75 and a lower recessed part 76. The configuration of the second conduction part 55*b* is substantially the same as the configuration of the first conduction part 55*a*. Therefore, in the following description, the description of a portion of the second conduction part 55*b* corresponding to the first conduction part 55*a* (the upper recessed part 71 and the lower recessed part 72) is omitted as appropriate.

The upper recessed parts 75 are respectively formed in portions of the cover plate 55 each at least partially overlapping the second penetrating hole 54*b* in the plan view.

The lower recessed part 76 is formed like a groove extending in the X direction so as to straddle all of the upper recessed parts 75. In other words, the lower recessed part 76 is communicated with the inside of the upper recessed part 75 through the portion overlapping the upper recessed part 75 in the plan view. In the second conduction part 55*b*, a portion communicated with the upper recessed part 75 and the lower recessed part 76 forms a second penetrating part 77 penetrating the cover plate 55 in the Z direction. As shown in FIG. 5, out of the pair of inner surfaces opposed in the Y direction to each other in the lower recessed part 76, a −Y-side inner surface (a first inner surface part) 76*a* continues (is arranged at the same position in the plan view) from the same position in the plan view as the position of a portion (hereinafter referred to as a −Y-side opening edge) located at the −Y side out of the lower end opening edge of the upper recessed part 75 without a step. Therefore, the −Y-side inner surface 76*a* is located within a dimensional range of the lower end opening part of the upper recessed part 75 viewed from the Z direction, and continuously extends with respect to the inner surface of the upper recessed part 75.

Out of the pair of inner surfaces opposed in the Y direction to each other in the lower recessed part 76, a +Y-side inner surface (the first inner surface part) 76*b* continues (is arranged at the same position in the plan view) from the same position in the plan view as the position of a portion (hereinafter referred to as a +Y-side opening edge) located at the +Y side out of the lower end opening edge of the upper recessed part 75 without a step. Therefore, the +Y-side inner surface 76*b* is located within a dimensional range of the lower end opening part of the upper recessed part 75 viewed from the Z direction, and continuously extends with respect to the inner surface of the upper recessed part 75.

Figure 7:
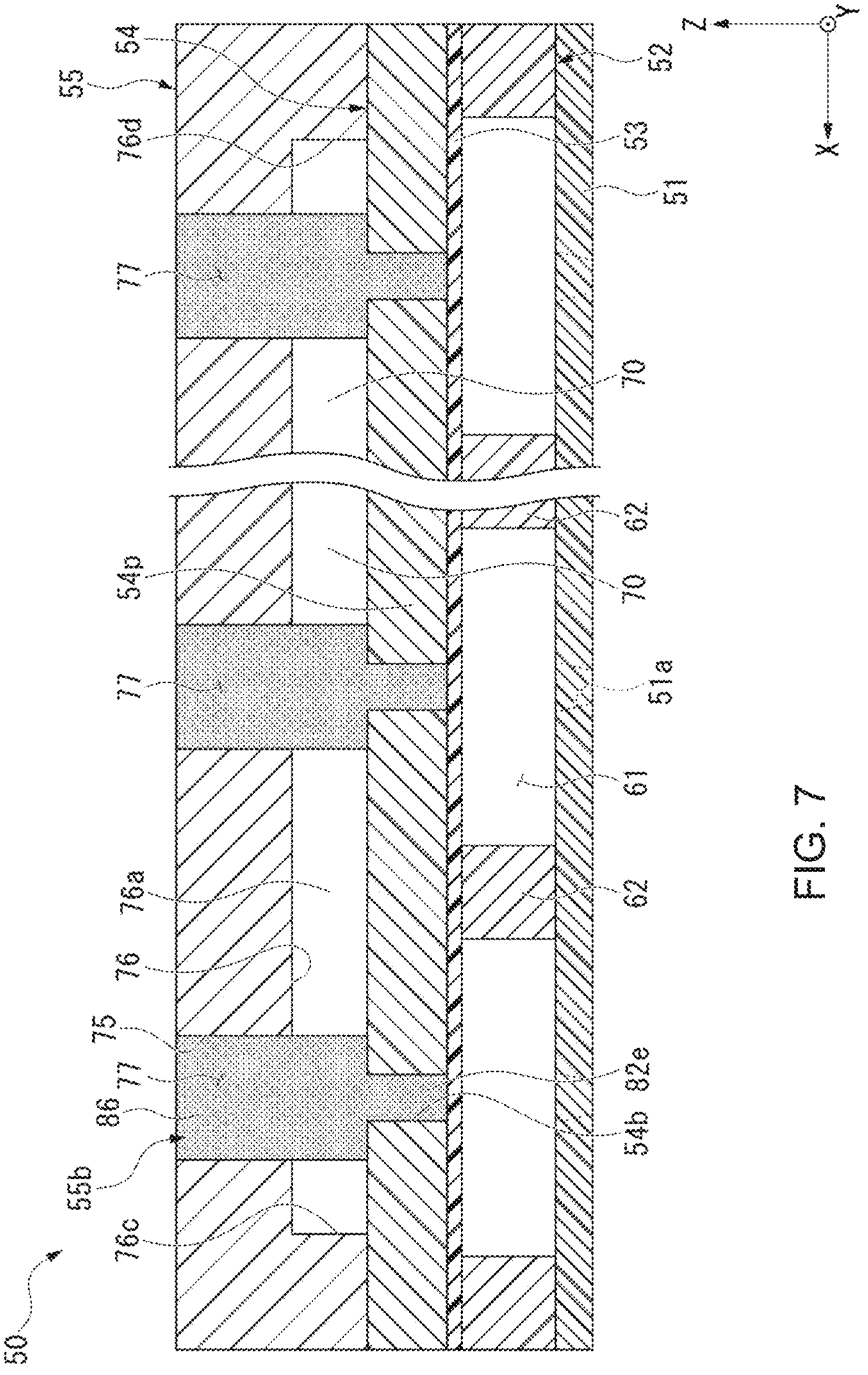
FIG. 7 is a cross-sectional view corresponding to the line VII-VII shown in FIG. 5.

FIG. 7 is a cross-sectional view corresponding to the line VII-VII shown in FIG. 5.

As shown in FIG. 7, the +X-side end portion in the lower recessed part 76 is located at the +X side with respect to the upper recessed part 75 located at the extreme +X side of the upper recessed parts 75. In other words, the +X-side inner surface (a second inner surface part) 72*c* out of the inner surfaces of the lower recessed part 76 is located at the +X side with respect to any of the upper recessed parts 75.

The −X-side end portion in the lower recessed part 76 is located at the −X side with respect to the upper recessed part 75 located at the extreme −X side of the upper recessed parts 75. In other words, the −X-side inner surface (the second inner surface part) 76*d* out of the inner surfaces of the lower recessed part 76 is located at the −X side with respect to any of the lower recessed parts 76.

As shown in FIG. 5, in the first embodiment, the dimension in the Z direction in the upper recessed parts 71, 75 is larger than the dimension in the Z direction in the lower recessed parts 72, 76. Further, the opening area of the lower end opening part in the lower recessed parts 72, 76 is larger than the opening area of the upper end opening part in one of the upper recessed parts 71, 75. It should be noted that the opening area of the lower end opening part in the lower recessed parts 72, 76 may be no larger than the opening area of the upper end opening part in one of the upper recessed parts 71, 75. Further, although there is described when the first conduction part 55*a* and the second conduction part 55*b* are formed to have equivalent shapes in the first embodiment, this configuration is not a limitation. The first conduction part 55*a* and the second conduction part 55*b* may be formed to have respective shapes different from each other.

Then, a variety of interconnections provided to the head chip 50 will be described.

As shown in FIG. 4, the actuator plate 54 is provided with common interconnections 81 and individual interconnections 82 as drive interconnections.

The common interconnection 81 includes first common electrodes 81*a*, second common electrodes 81*b*, lower-surface routing interconnections 81*c* (see FIG. 8), upper-surface routing interconnections 81*d* (see FIG. 9), and first common penetrating interconnections 81*e* (see FIG. 5).

Figure 8:
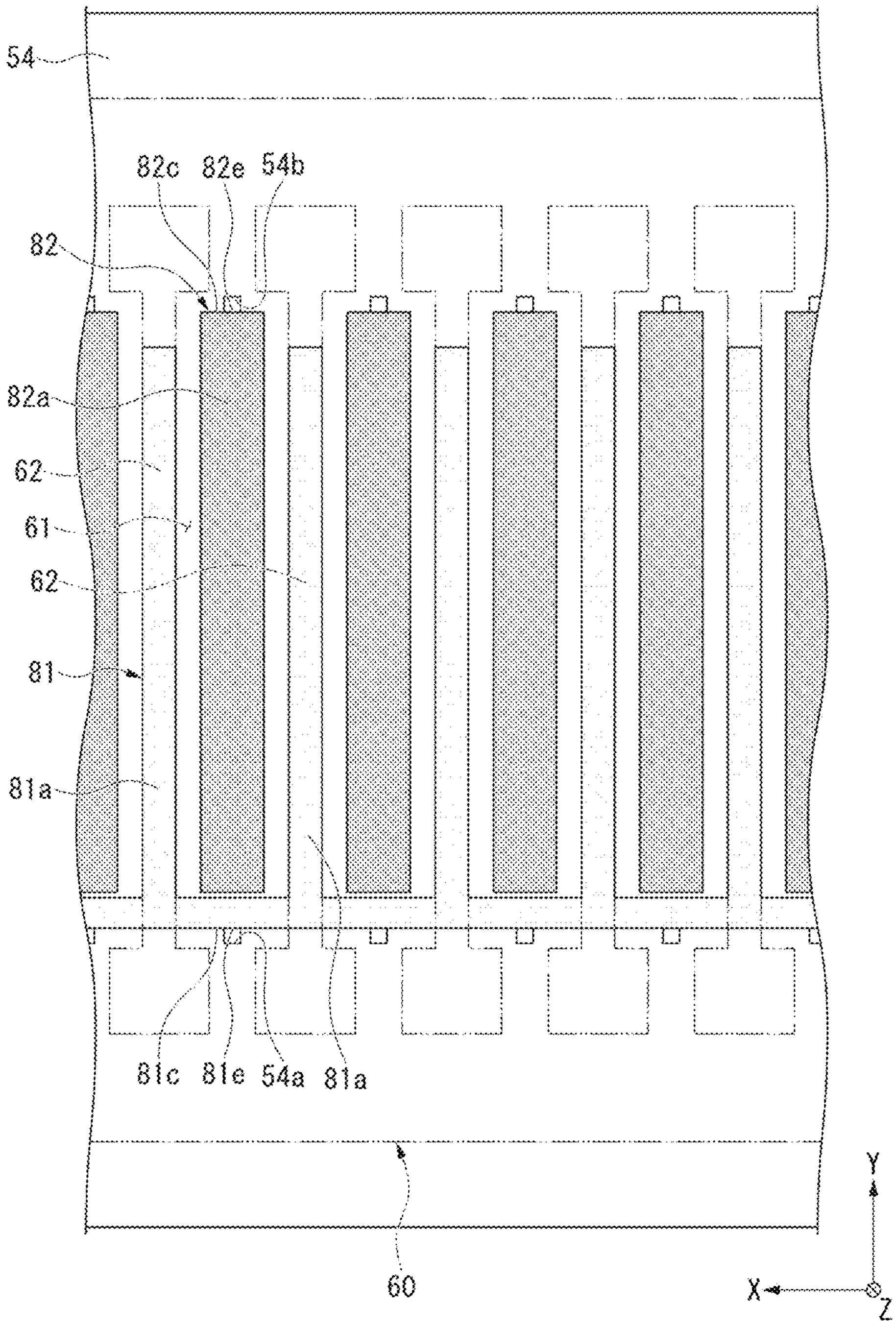
FIG. 8 is a bottom view of an actuator plate related to the first embodiment.

FIG. 8 is a bottom view of the actuator plate 54.

As shown in FIG. 4 and FIG. 8, the first common electrodes 81*a* are formed at positions overlapping the respective partition walls 62 when viewed from the Z direction on a lower surface of the actuator plate 54. In the first embodiment, the first common electrode 81*a* located at the +X side out of the first common electrodes 81*a* corresponding to one pressure chamber 61 is commonly used as the first common electrode 81*a* located at the −X side out of the first common electrodes 81*a* of another pressure chamber 61 adjacent at the +X side to the one pressure chamber 61. In contrast, the first common electrode 81*a* located at the −X side out of the first common electrodes 81*a* corresponding to the one pressure chamber 61 is commonly used as the first common electrode 81*a* located at the +X side out of the first common electrodes 81*a* corresponding to another pressure chamber 61 adjacent at the −X side to the one pressure chamber 61. It should be noted that between the pressure chambers 61, the first common electrodes 81*a* may be separated from each other.

Figure 9:
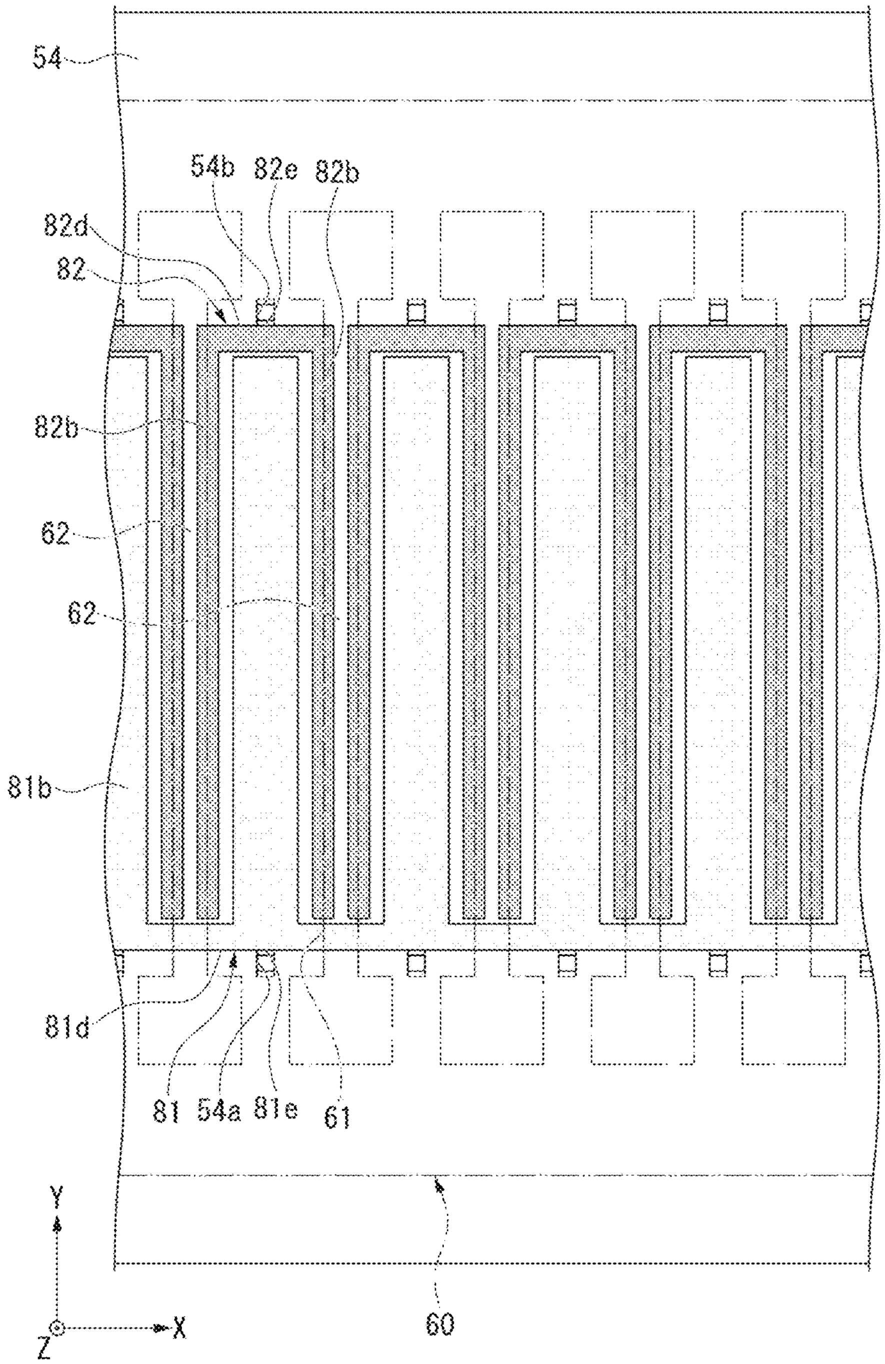
FIG. 9 is a plan view of the actuator plate related to the first embodiment.

FIG. 9 is a plan view of the actuator plate 54.

As shown in FIG. 4 and FIG. 9, the second common electrode 81*b* is arranged at a position which overlaps corresponding one of the pressure chambers 61 when viewed from the Z direction, and which fails to overlap the first common electrode 81*a* when viewed from the Z direction on the upper surface of the actuator plate 54. The second common electrode 81*b* linearly extends in the Y direction with a length equivalent to the length of the pressure chamber 61.

As shown in FIG. 8, the lower-surface routing interconnection (a first interconnection) 81*c* is coupled to the first common electrodes 81*a* in a lump on the lower surface of the actuator plate 54. The lower-surface routing interconnection 81*c* extends in the X direction in a state of being coupled to the −Y-side end portion in each of the first common electrodes 81*a*.

As shown in FIG. 9, the upper-surface routing interconnection 81*d* is coupled to the second common electrode 81*b* on the upper surface of the actuator plate 54. The upper-surface routing interconnection 81*d* extends in the X direction in a state of being coupled to the −Y-side end portion in each of the second common electrodes 81*b*.

As shown in FIG. 5, the first common penetrating interconnection 81*e* couples the lower-surface routing interconnection 81*c* and the upper-surface routing interconnection 81*d* to each other. The first common penetrating interconnection 81*e* is formed throughout the entire length in the Z direction on at least a portion facing to the −Y side on the inner surface of the first penetrating hole 54*a*. A lower end edge of the first common penetrating interconnection 81*e* is coupled to the lower-surface routing interconnection 81*c* at the lower end opening edge of the first penetrating hole 54*a*. An upper end edge of the first common penetrating interconnection 81*e* is coupled to the upper-surface routing interconnection 81*d* at the upper end opening edge of the first penetrating hole 54*a*. It should be noted that the first common penetrating interconnection 81*e* is not required to be formed on the entire circumference of the inner surface of the first penetrating hole 54*a* as long as the first common penetrating interconnection 81*e* couples the lower-surface routing interconnection 81*c* and the upper-surface routing interconnection 81*d* to each other.

As shown in FIG. 4, the individual interconnection 82 is provided with first individual electrodes 82*a*, second individual electrodes 82*b*, lower-surface routing interconnections 82*c* (see FIG. 8), upper-surface routing interconnections 82*d* (see FIG. 9), and first individual penetrating interconnections 82*e* (see FIG. 5).

As shown in FIG. 4 and FIG. 8, the first individual electrode 82*a* generates a potential difference from the first common electrode 81*a*, and at the same time, generates a potential difference from the second common electrode 81*b*. The first individual electrode 82*a* is formed between the first common electrodes 81*a* on the lower surface of the actuator plate 54. The first individual electrode 82*a* extends in the Y direction in a state at a distance in the X direction from each of the first common electrodes 81*a*. The whole of the first individual electrode 82*a* overlaps the corresponding pressure chamber 61 when viewed from the Z direction. On this occasion, at least a part of the first individual electrode 82*a* overlaps the second common electrode 81*b* when viewed from the Z direction.

As shown in FIG. 4 and FIG. 9, the second individual electrode 82*b* generates a potential difference from the second common electrode 81*b*, and at the same time, generates a potential difference from the first common electrode 81*a*. The second individual electrodes 82*b* are respectively formed in portions on the upper surface of the actuator plate 54, the portions being located at both sides in the X direction with respect to the second common electrode 81*b*. The second individual electrodes 82*b* each extend in the Y direction in a state at a distance in the X direction from the second common electrode 81*b*. It should be noted that between the pressure chambers 61 adjacent to each other, the individual electrode 82*b* located at the +X side out of the individual electrodes 82*b* corresponding to one of the pressure chambers 61 and the individual electrode 82*b* located at the −X side out of the individual electrodes 82*b* corresponding to the other of the pressure chambers 61 are located at a distance in the X direction on the partition wall 62.

As shown in FIG. 8, the lower-surface routing interconnection 82*c* is coupled to the first individual electrode 82*a* on the lower surface of the actuator plate 54. The lower-surface routing interconnection 82*c* extends from the +Y-side end portion in the first individual electrode 82*a* toward both sides in the X direction. The lower-surface routing interconnections 82*c* corresponding to the pressure chambers 61 adjacent to each other are separated from each other.

As shown in FIG. 9, the upper-surface routing interconnection 82*d* couples the +Y-side end portions of the respective second individual electrodes 82*b* to each other on the upper surface of the actuator plate 54.

As shown in FIG. 5 and FIG. 7, the first individual penetrating interconnection 82*e* couples the lower-surface routing interconnection 82*c* and the upper-surface routing interconnection 82*d* to each other. The first individual penetrating interconnection 82*e* is formed throughout the entire length in the Z direction on at least a portion facing to the +Y side on the inner surface of the second penetrating hole 54*b*. It should be noted that the first individual penetrating interconnection 82*e* is not required to be formed on the entire circumference of the inner surface of the second penetrating hole 54*b* as long as the first individual penetrating interconnection 82*e* couples the lower-surface routing interconnection 82*c* and the upper-surface routing interconnection 82*d* to each other.

Figure 10:
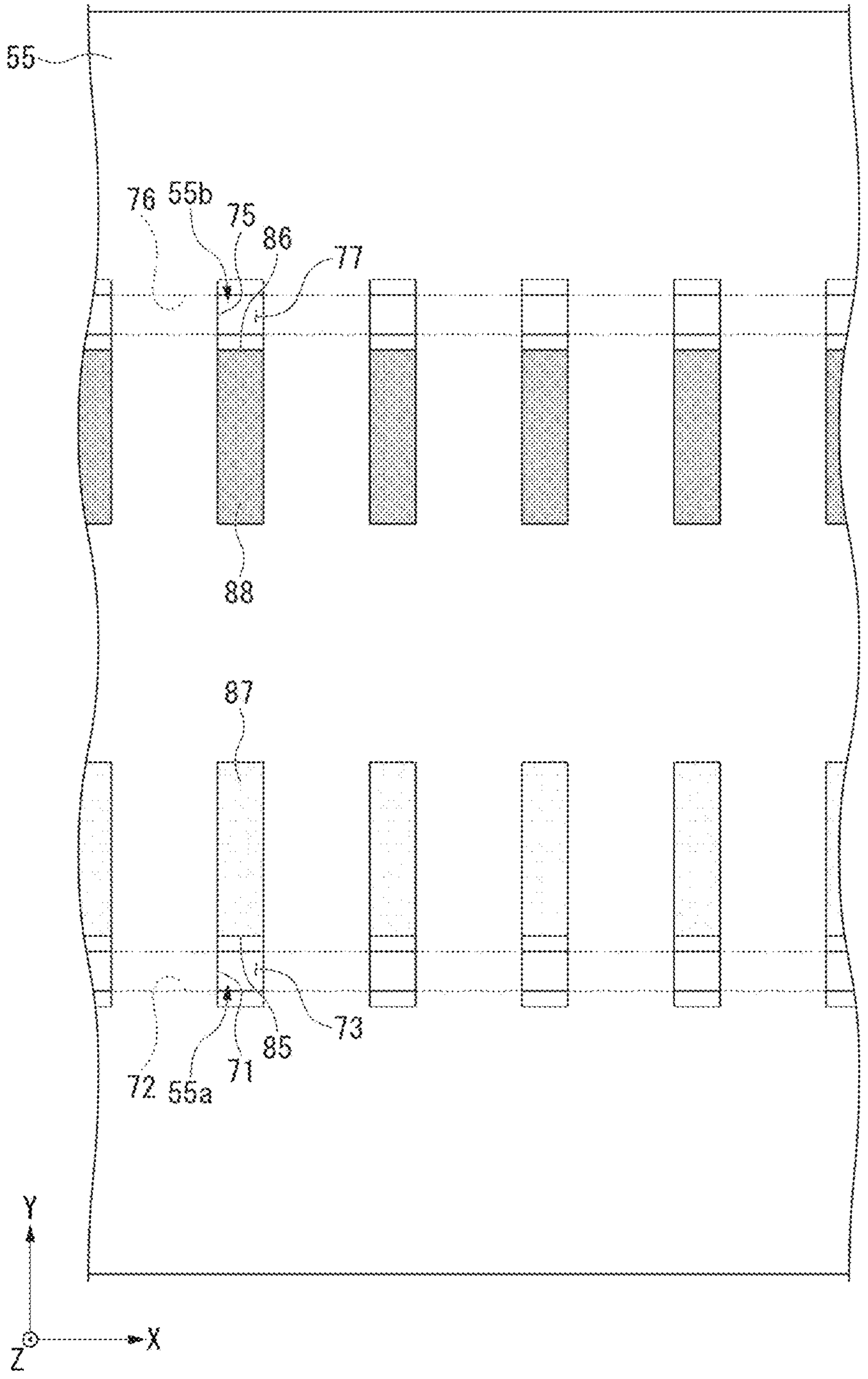
FIG. 10 is a plan view of a cover plate related to the first embodiment.

FIG. 10 is a plan view of the cover plate 55.

As shown in FIG. 5 and FIG. 10, the cover plate 55 is provided with second common penetrating interconnections 85 and second individual penetrating interconnections 86 as coupling interconnections (second interconnections), and common pads 87 and individual pads 88 as terminal interconnections (the second interconnections).

The second common penetrating interconnection 85 couples the first common penetrating interconnection 81*e* and the common pad 87 to each other. The second common penetrating interconnection 85 is formed throughout the entire length in the Z direction on the inner surface of each of the first penetrating parts 73. Specifically, an upper half of the second common penetrating interconnection 85 is formed in at least a portion located at the +Y side of the inner surface of the upper recessed part 71. An upper end edge of the second common penetrating interconnection 85 is located at an upper end opening edge of the upper recessed part 71 (the first penetrating part 73). A lower half of the second common penetrating interconnection 85 is formed on a +Y-side inner surface 72*a* of the inner surface of the lower recessed part 72. The upper half and the lower half of the second common penetrating interconnection 85 are coupled to each other in a boundary portion between the upper recessed part 71 and the lower recessed part 72. A lower end edge of the second common penetrating interconnection 85 is located at a lower end opening edge of the lower recessed part 72 (the first penetrating part 73). The lower end edge of the second common penetrating interconnection 85 is directly or indirectly coupled to an upper end edge of the first common penetrating interconnection 81*e* in a boundary portion between the first penetrating hole 54*a* and the first penetrating part 73. In the first embodiment, the first common penetrating interconnection 81*e* and the second common penetrating interconnection 85 are indirectly coupled to each other through the upper-surface routing interconnection 81*d* formed in a portion of the upper surface of the actuator plate 54, the portion being exposed through the first penetrating part 73.

As shown in FIG. 6, the second common penetrating interconnection 85 is not formed in a portion of the lower recessed part 72, the portion being located between the first penetrating parts 73. In other words, the second common penetrating interconnections 85 adjacent to each other are divided by a portion of the lower recessed part 72, the portion being located between the first penetrating parts 73. It should be noted that the second common penetrating interconnection 85 may be formed, for example, throughout the entire circumference of the first penetrating part 73 as long as the second common penetrating interconnection 85 has a configuration of coupling the first common penetrating interconnection 81*e* and the common pad 87 to each other.

As shown in FIG. 5 and FIG. 10, the common pad 87 is formed on the upper surface of the cover plate 55. The common pad 87 extends in the Y direction on a portion of the upper surface of the cover plate 55, the portion overlapping the pressure chamber 61 when viewed from the Z direction. The common pad 87 is coupled to an upper end edge of the second common penetrating interconnection 85 at the upper end opening edge of the first penetrating part 73.

As shown in FIG. 5 and FIG. 7, the second individual penetrating interconnection 86 couples the first individual interconnection 82*e* and the individual pad 88 to each other. The second individual penetrating interconnection 86 is formed throughout the entire length in the Z direction on the inner surface of each of the second penetrating parts 77. Specifically, an upper half of the second individual penetrating interconnection 86 is formed in at least a portion located at the −Y side of the inner surface of the upper recessed part 75. An upper end edge of the second individual penetrating interconnection 86 is located at an upper end opening edge of the upper recessed part 75 (the second penetrating part 77). A lower half of the second individual penetrating interconnection 86 is formed on a −Y-side inner surface 76*a* of the inner surface of the lower recessed part 76. The upper half and the lower half of the second individual penetrating interconnection 86 are coupled to each other in a boundary portion between the upper recessed part 75 and the lower recessed part 76. A lower end edge of the second individual penetrating interconnection 86 is located at a lower end opening edge of the lower recessed part 76 (the second penetrating part 77). The lower end edge of the second individual penetrating interconnection 86 is directly or indirectly coupled to an upper end edge of the first individual penetrating interconnection 82*e* in a boundary portion between the second penetrating hole 54*b* and the second penetrating part 77. In the first embodiment, the first individual penetrating interconnection 82*e* and the second individual penetrating interconnection 86 are coupled to each other through the upper-surface routing interconnection 82*d* formed in a portion of the upper surface of the actuator plate 54, the portion being exposed through the second penetrating part 77.

As shown in FIG. 7, the second individual penetrating interconnection 86 is not formed in a portion of the lower recessed part 76, the portion being located between the second penetrating parts 77. In other words, the second individual penetrating interconnections 86 adjacent to each other are divided by a portion of the lower recessed part 76, the portion being located between the second penetrating parts 77. It should be noted that the second individual penetrating interconnection 86 may be formed, for example, throughout the entire circumference of the second penetrating part 77 as long as the second individual penetrating interconnection 86 has a configuration of coupling the first individual penetrating interconnection 82*e* and the individual pad 88 to each other.

As shown in FIG. 10, the individual pads 88 are formed on the upper surface of the cover plate 55. The individual pads 88 each extend in the Y direction on a portion of the upper surface of the cover plate 55, the portion overlapping the pressure chamber 61 when viewed from the Z direction. The individual pad 88 is coupled to an upper end edge of the second individual penetrating interconnection 86 at the upper end opening edge of the second penetrating part 77.

To the upper surface of the cover plate 55, there is pressure-bonded a flexible printed board (not shown) as external interconnections. The flexible printed board is mounted on the common pads 87 and the individual pads 88 on the upper surface of the cover plate 55.

[Operation Method of Printer 1]

Then, there will hereinafter be described when recording a character, a figure, or the like on the recording target medium P using the printer 1 configured as described above.

It should be noted that it is assumed that as an initial state, the sufficient ink having colors different from each other is respectively encapsulated in the four ink tanks 4 shown in FIG. 1. Further, there is provided a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. Further, by the carriage 29 moving in the Y direction at the same time, the inkjet heads 5 mounted on the carriage 29 reciprocate in the Y direction.

While the inkjet heads 5 make the reciprocal motion, the ink is appropriately ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the first embodiment, first, by making the pressure pump 24 and the suction pump 25 shown in FIG. 2 operate, the ink is circulated in the circulation flow channel 23. In this case, the ink circulating through the ink supply tube 21 is supplied to the inside of each of the pressure chambers 61 through the entrance-side common flow channel 64 and the entrance-side communication channels 65. The ink supplied to the inside of each of the pressure chambers 61 circulates through that pressure chamber 61 in the Y direction. Subsequently, the ink is discharged to the exit-side common flow channel 66 through the exit-side communication channels 67, and is then returned to the ink tank 4 through the ink discharge tube 22. Thus, it is possible to circulate the ink between the inkjet head 5 and the ink tank 4.

Then, when the reciprocation of the inkjet heads 5 is started due to the translation of the carriage 29 (see FIG. 1), the drive voltages are applied between the common electrodes 81*a*, 81*b* and the individual electrodes 82*a*, 82*b* via the flexible printed boards. On this occasion, the common electrodes 81*a*, 81*b* are set at a reference potential GND, and the individual electrodes 82*a*, 82*b* are set at a drive potential Vdd to apply the drive voltage.

Due to the application of the drive voltage, the potential difference occurs in the X direction between the first common electrodes 81*a* and the first individual electrode 82*a*, and between the second common electrode 81*b* and the second individual electrodes 82*b*. Due to the potential difference generated in the X direction, the thickness-shear deformation occurs in the actuator plate 54 in the Z direction in the shear mode. Specifically, between the first common electrodes 81*a* and the first individual electrode 82*a*, there occurs the electric field in a direction of getting away from each other in the X direction. Further, on the upper surface of the actuator plate 54, between the second common electrode 81*b* and the second individual electrodes 82*b*, there occurs the electric field in a direction of coming closer to each other in the X direction. As a result, in the actuator plate 54, a shear deformation occurs upward in a direction from the both end portions toward the central portion in the X direction in a portion corresponding to each of the pressure chambers 61.

Meanwhile, the potential difference occurs in the Z direction between the first common electrodes 81*a* and the second individual electrodes 82*b*, and between the first individual electrode 82*a* and the second common electrode 81*b*. Due to the potential difference having occurred in the Z direction, an electric field occurs in the actuator plate 54 in a direction parallel to the polarization direction (the Z direction). As a result, a stretch deformation occurs in the actuator plate 54 in the Z direction in a bend mode. In other words, in the head chip 50 according to the first embodiment, it results in that both of the deformation caused by the shear mode and the deformation caused by the bend mode in the actuator plate 54 occur in the Z direction. Specifically, due to the application of the drive voltage, the actuator plate 54 deforms in a direction of getting away from the pressure chamber 61. Thus, the volume in the pressure chamber 61 expands. Subsequently, when making the drive voltage zero, the actuator plate 54 is restored to thereby urge the volume in the pressure chamber 61 to be restored. In the process in which the actuator plate 54 is restored, the pressure in the pressure chamber 61 increases, and thus, the ink in the pressure chamber 61 is ejected outside through the nozzle hole 51*a*. By the ink ejected outside landing on the recording target medium P, print information is recorded on the recording target medium P.

<Method of Manufacturing Head Chip 50>

Figure 11:
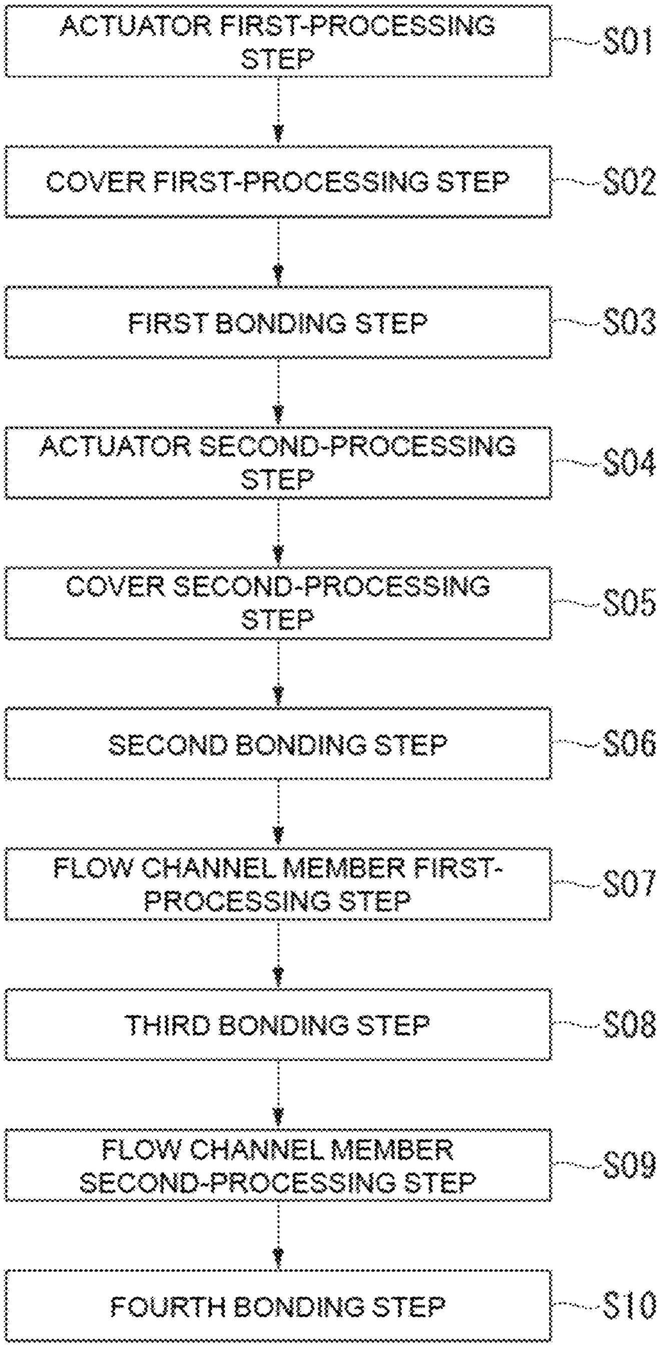
FIG. 11 is a flowchart illustrating a method of manufacturing the head chip according to the first embodiment.

Then, a method of manufacturing the head chip 50 described above will be described. FIG. 11 is a flowchart illustrating the method of manufacturing the head chip 50. FIG. 12 through FIG. 23 are each a process diagram illustrating the method of manufacturing the head chip 50, and are each a cross-sectional view corresponding to FIG. 4 and FIG. 5. In the following description, there is described when manufacturing the head chip 50 chip by chip as an example for the sake of convenience.

As shown in FIG. 11, the method of manufacturing the head chip 50 is provided with an actuator first-processing step S01, a cover first-processing step S02, a first bonding step S03, an actuator second-processing step S04, a cover second-processing step S05, a second bonding step S06, a flow channel member first-processing step S07, a third bonding step S08, a flow channel member second-processing step S09, and a fourth bonding step S10.

Figure 12:
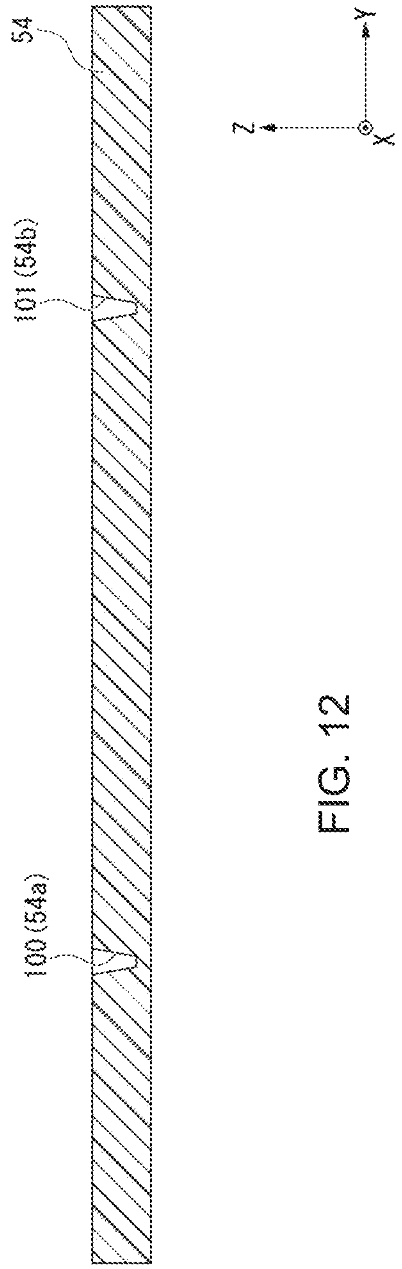
FIG. 12 is a process diagram illustrating the method of manufacturing the head chip according to the first embodiment.

As shown in FIG. 12, in the actuator first-processing step S01, first, recessed parts 100, 101 forming the first penetrating hole 54*a* and the second penetrating hole 54*b* are formed (a recessed part formation step). Specifically, a mask pattern in which formation areas of the first penetrating hole 54*a* and the second penetrating hole 54*b* open is formed on the upper surface of the actuator plate 54. Subsequently, sandblasting and so on are performed on the upper surface of the actuator plate 54 through the mask pattern. Thus, the recessed parts 100, 101 recessed from the upper surface are provided to the actuator plate 54. It should be noted that the recessed parts 100, 101 may be formed by dicing processing, precision drill processing, etching processing, or the like.

Figure 13:
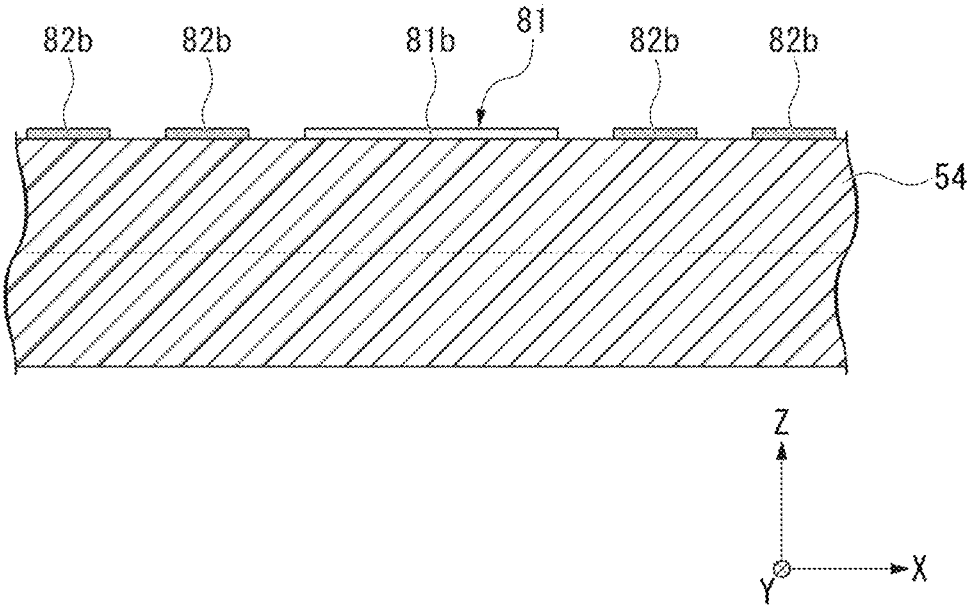
FIG. 13 is a process diagram illustrating the method of manufacturing the head chip according to the first embodiment.

Then, as shown in FIG. 13, in the actuator first-processing step S01, there are formed portions of a variety of interconnections, the portions being located on the upper surface of the actuator plate 54 (a first interconnection formation step). In the first interconnection formation step, first, a mask pattern in which formation areas of the interconnections open is formed on the upper surface of the actuator plate 54. Then, an electrode material is deposited on the actuator plate 54 using, for example, oblique vapor deposition. The electrode material is deposited on the actuator plate 54 through the opening parts of the mask pattern. Thus, the variety of interconnections are formed on the upper surface of the actuator plate 54, and inner surfaces of the recessed parts 100, 101.

In the cover first-processing step S02, the first conduction part 55*a* and the second conduction part 55*b* are provided to the cover plate 55. The cover first-processing step S02 includes an upper recessed part formation step and a lower recessed part formation step.

Figure 14:
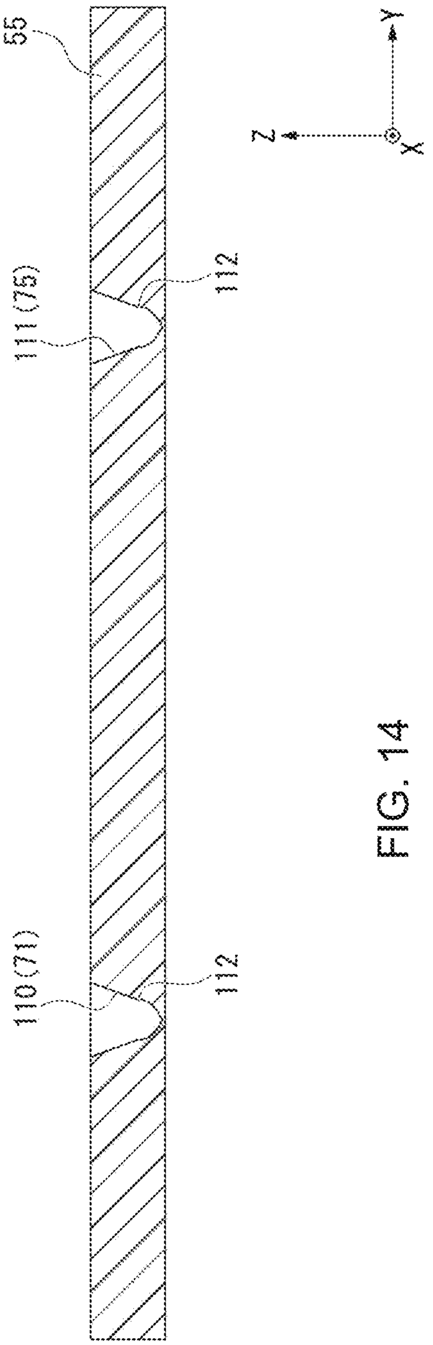
FIG. 14 is a process diagram illustrating the method of manufacturing the head chip according to the first embodiment.

As shown in FIG. 14, in the upper recessed part formation step, a mask pattern in which formation areas of the upper recessed parts 71, 75 open is formed on the upper surface of the cover plate 55. Subsequently, sandblasting is performed on the upper surface of the cover plate 55 through the mask pattern. Thus, blast marks 110, 111 recessed from the upper surface are provided to the cover plate 55.

Here, when forming the upper recessed parts 71, 75 with the sandblasting, the blast marks 110, 111 are each provided with a taper shape having the inner diameter gradually decreasing from the upper end opening part in the Z direction within a predetermined range. However, when the depth (the dimension in the Z direction) of the blast marks 110, 111 exceeds a predetermined range, there is a possibility that there occurs a phenomenon that the inner diameter once increases, and then decreases once again. As a result, a constricted portion 112 is formed in particular in a portion opposed in the Y direction in a midway portion in the Z direction in the blast marks 110, 111. When the constricted portion 112 is formed, it is difficult for the electrode material to go around to a portion located below the constricted portion 112 of the blast marks 110, 111 when depositing the electrode material on the inner surfaces of the blast marks 110, 111. Therefore, there is a possibility that the yield ratio decreases.

Figure 15:
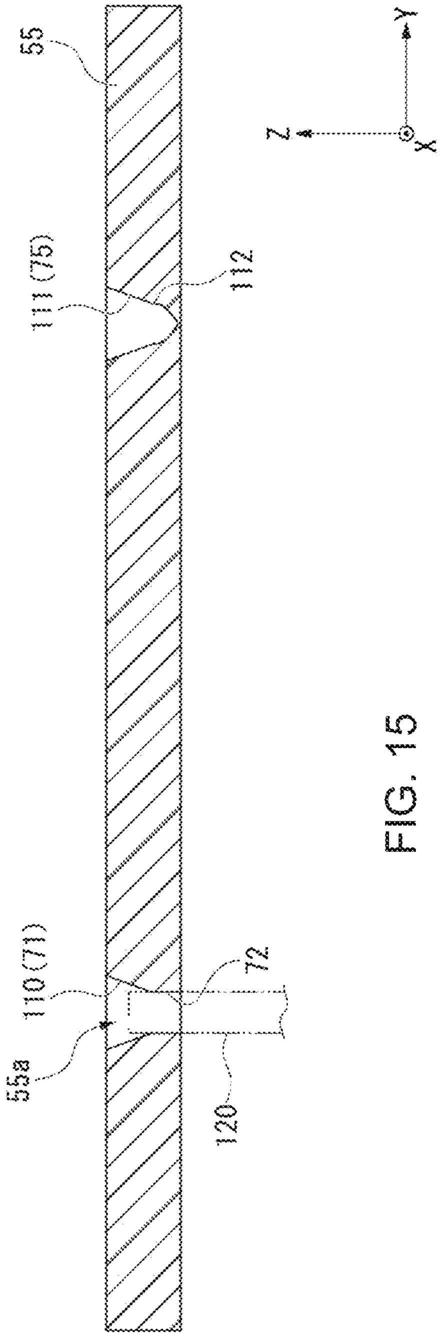
FIG. 15 is a process diagram illustrating the method of manufacturing the head chip according to the first embodiment.

Then, in the cover first-processing step S02, the lower recessed part formation step is performed after the upper recessed part formation step as shown in FIG. 15. In the lower recessed part formation step, dicing processing is performed on the lower surface of the cover plate 55. The width of a dicer 120 used in the lower recessed part formation step is set to be equal to or larger than the dimension of the constricted portion 112. When forming the lower recessed part 72, the dicer 120 is made to enter the blast mark 110 of the lower surface of the cover plate 55 so that the rotational axis line coincides with the Y direction with respect to a position overlapping at least one of the constricted portions 112 opposed in the Y direction to each other in a plan view. Further, the dicer 120 is made to run in the X direction so as to traverse the each of the blast marks 110. On this occasion, the dicing processing is performed in a state in which the dicer 120 is made to enter the blast mark 110 to a position above the constricted portion 112. Thus, the first conduction part 55*a* is formed in a state in which the constricted portion 112 is removed. In other words, the portion processed by the dicer 120 in the lower recessed part formation step forms the lower recessed part 72, and a portion of the blast mark 110 remaining after the lower recessed part formation step forms the upper recessed part 71. It should be noted that substantially the same processing as in the lower recessed part formation step described above is also performed on the blast mark 111. Thus, the portion processed by the dicer 120 forms the lower recessed part 76, and a portion of the blast mark 111 remaining after the lower recessed part formation step forms the upper recessed part 75.

Figure 16:
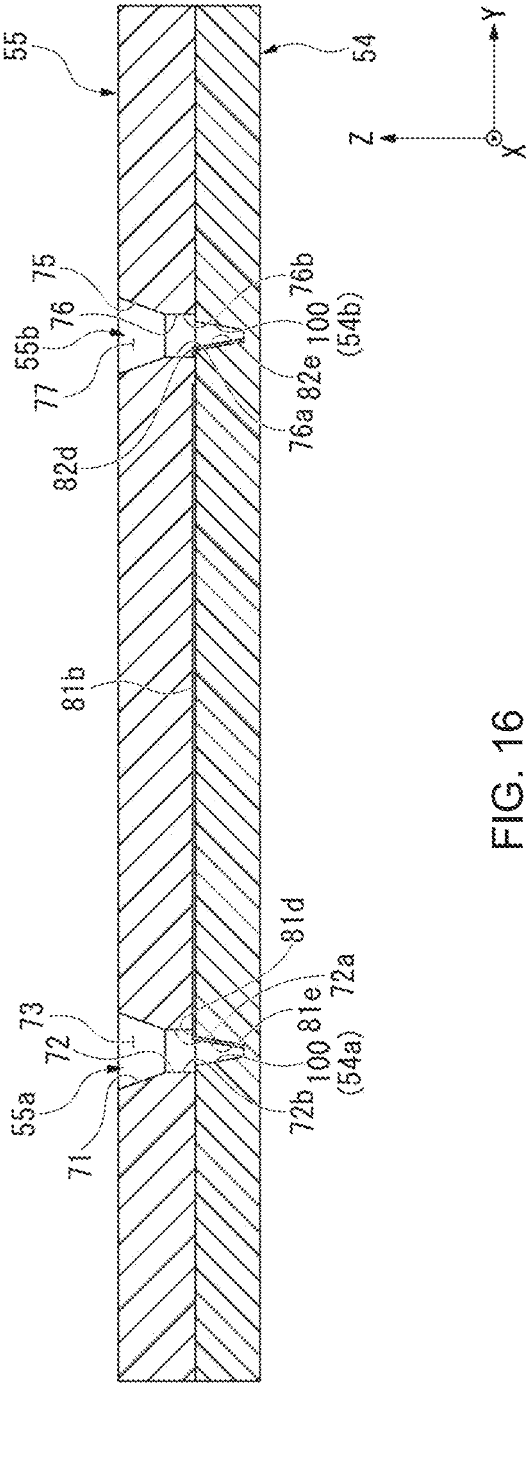
FIG. 16 is a process diagram illustrating the method of manufacturing the head chip according to the first embodiment.

As shown in FIG. 16, in the first bonding step S03, the cover plate 55 is attached to the upper surface of the actuator plate 54 with an adhesive or the like. Thus, the first conduction part 55*a* and the recessed part 100 are communicated with each other, and the second conduction part 55*b* and the recessed part 101 are communicated with each other. In the first bonding step S03, a surplus adhesive forced to flow when pressure-bonding the actuator plate 54 and the cover plate 55 to each other is retained in the lower recessed parts 72, 76. In other words, in the first embodiment, the lower recessed parts 72, 76 extend in the X direction so as to straddle all of the upper recessed parts 71, 75, respectively. Therefore, the surplus adhesive is evenly retained in the lower recessed parts 72, 76. Further, the opening areas of the lower recessed parts 72, 76 are easily ensured compared to when the lower recessed parts 72, 76 are communicated only with the upper recessed parts 71, 75, respectively. Thus, concentration of the inflow into the penetrating parts 73, 77 is prevented.

Figure 17:
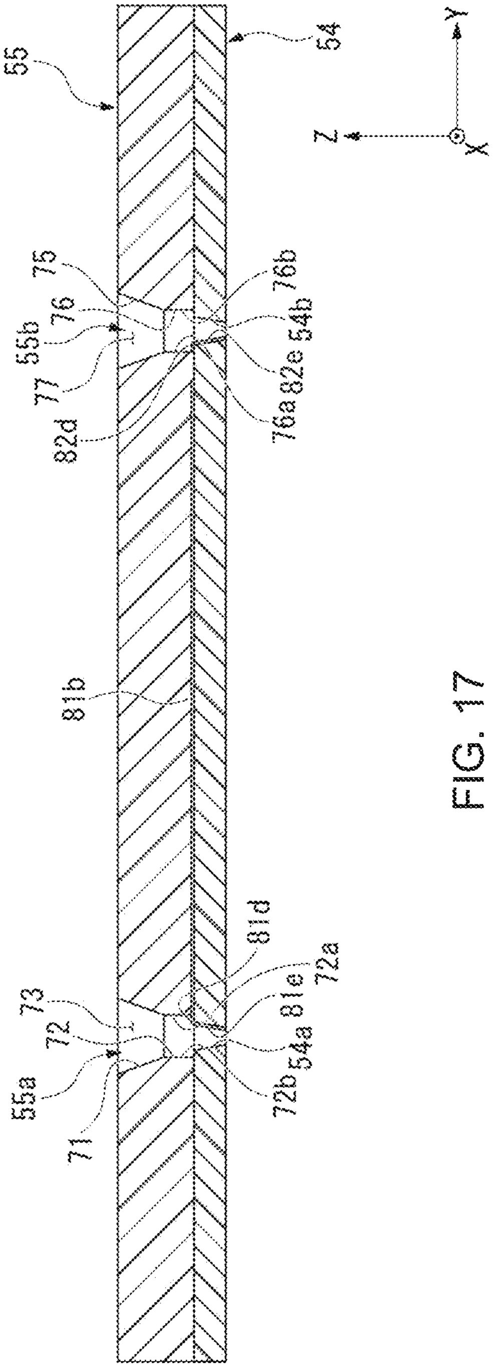
FIG. 17 is a process diagram illustrating the method of manufacturing the head chip according to the first embodiment.

As shown in FIG. 17, in the actuator second-processing step S04, grinding processing is performed on the lower surface of the actuator plate 54 (a grinding step). On this occasion, on the lower surface of the actuator plate 54, the actuator plate 54 is ground up to a position where the recessed parts 100, 101 open to thereby form the first penetrating hole 54*a* and the second penetrating hole 54*b*.

Figure 18:
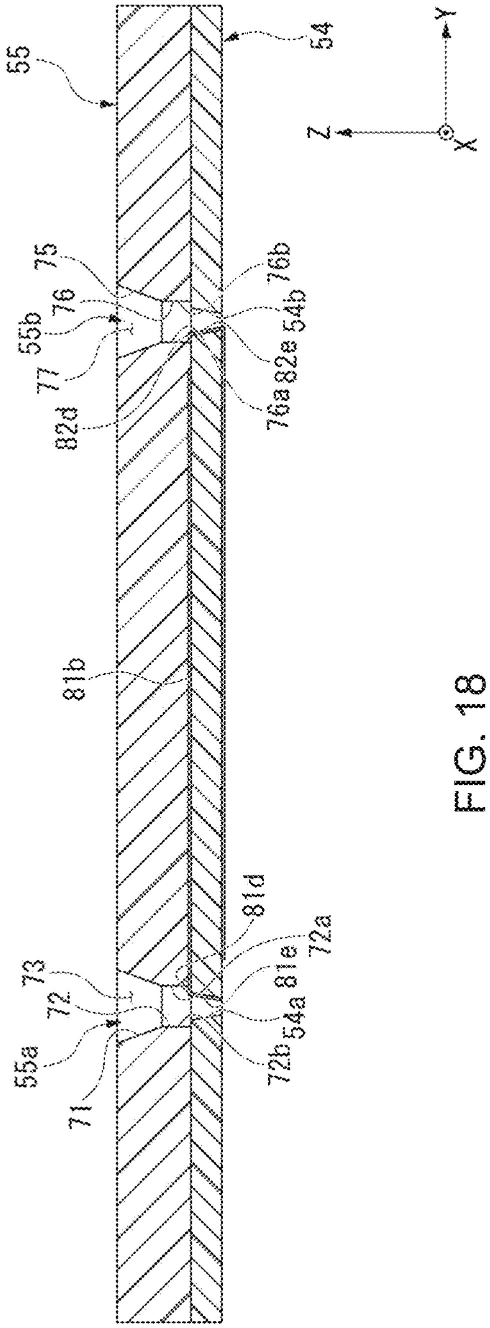
FIG. 18 is a process diagram illustrating the method of manufacturing the head chip according to the first embodiment.

As shown in FIG. 18, a variety of interconnections such as the first common electrode 81*a* and the first individual electrode 82*a* are formed (a second interconnection formation step) on the lower surface of the actuator plate 54. In the second interconnection formation step, first, a mask pattern in which formation areas of the interconnections open is formed on the lower surface of the actuator plate 54. Subsequently, an electrode material is deposited on the actuator plate 54 using, for example, vapor deposition. The electrode material is deposited on the actuator plate 54 through the opening parts of the mask pattern.

Figure 19:
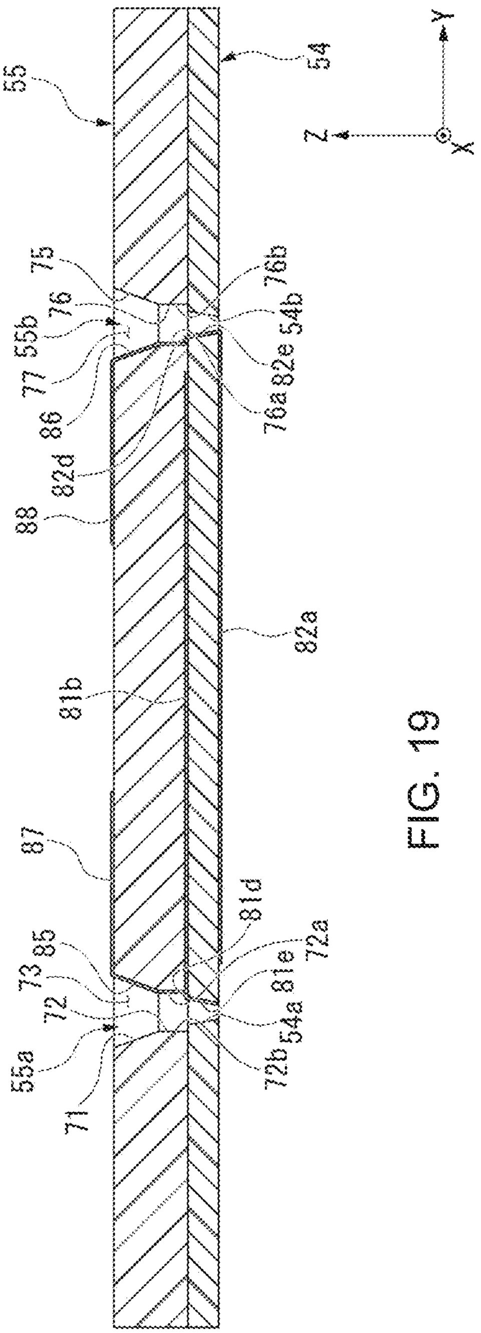
FIG. 19 is a process diagram illustrating the method of manufacturing the head chip according to the first embodiment.

Then, as shown in FIG. 19, in the cover second-processing step S05, the penetrating interconnections 85, 86 and the pads 87, 88 are provided (a third interconnection formation step) to the cover plate 55. Specifically, first, a mask pattern in which formation areas of the penetrating interconnections 85, 86 and the pads 87, 88 open is formed on the upper surface of the cover plate 55. Then, the electrode material is deposited on the cover plate 55 using, for example, oblique vapor deposition from the Y direction. A part of the electrode material is deposited on the upper surface of the cover plate 55 through the opening parts of the mask pattern. Thus, the pads 87, 88 are formed. Further, a part of the electrode material enters the inside of each of the conduction parts 55*a*, 55*b* through the opening parts of the mask pattern and the upper end opening part of each of the conduction parts 55*a*, 55*b* (the upper recessed parts 71, 75). The electrode material which enters each of the conduction parts 55*a*, 55*b* adheres to the inner surfaces of the penetrating parts 73, 77. Thus, the penetrating interconnections 85, 86 are formed on the inner surfaces of the penetrating parts 73, 77.

Here, in the first conduction part 55*a*, for example, the lower recessed part 72 extends in the X direction so as to straddle all of the upper recessed parts 71. Therefore, it has become difficult for the electrode material to go around to a portion of the lower recessed part 72, the portion being located between the upper recessed parts 71 adjacent to each other. Specifically, the portion of the cover plate 55 located between the upper recessed parts 71 adjacent to each other functions as a mask to a portion of the lower recessed part 72 located between the upper recessed parts 71 adjacent to each other. As a result, the second common penetrating interconnections 85 are formed in a state of being divided between the first penetrating parts 73 adjacent to each other. It should be noted that the second individual penetrating interconnections 86 are also formed in a state of being divided between the second penetrating parts 77 adjacent to each other similarly to the second common penetrating interconnections 85.

Figure 20:
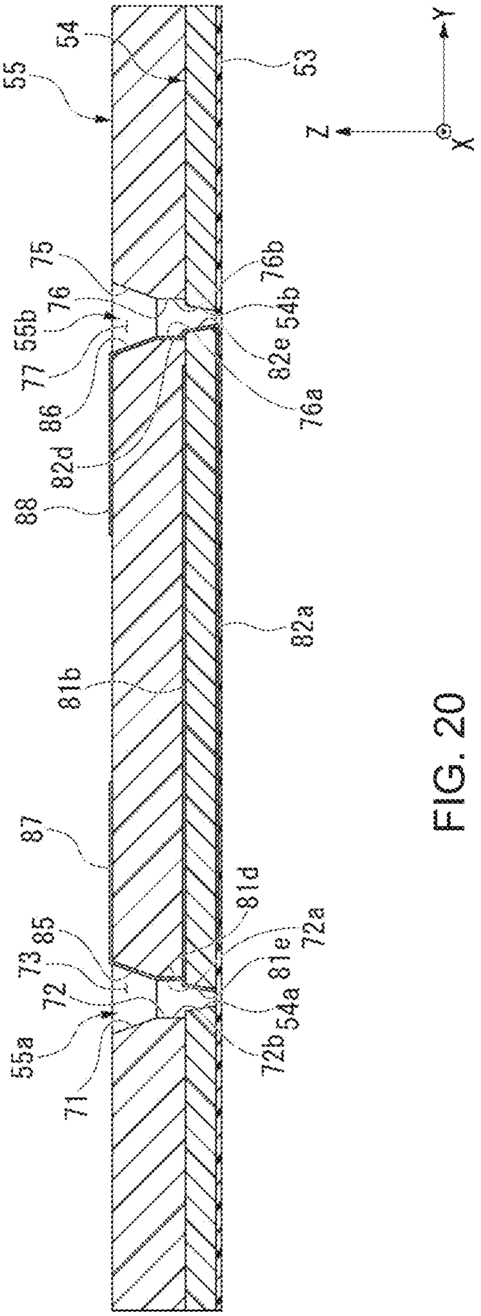
FIG. 20 is a process diagram illustrating the method of manufacturing the head chip according to the first embodiment.

As shown in FIG. 20, in the second bonding step S06, the film 53 is attached to the lower surface of the actuator plate 54 with an adhesive or the like.

Figure 21:
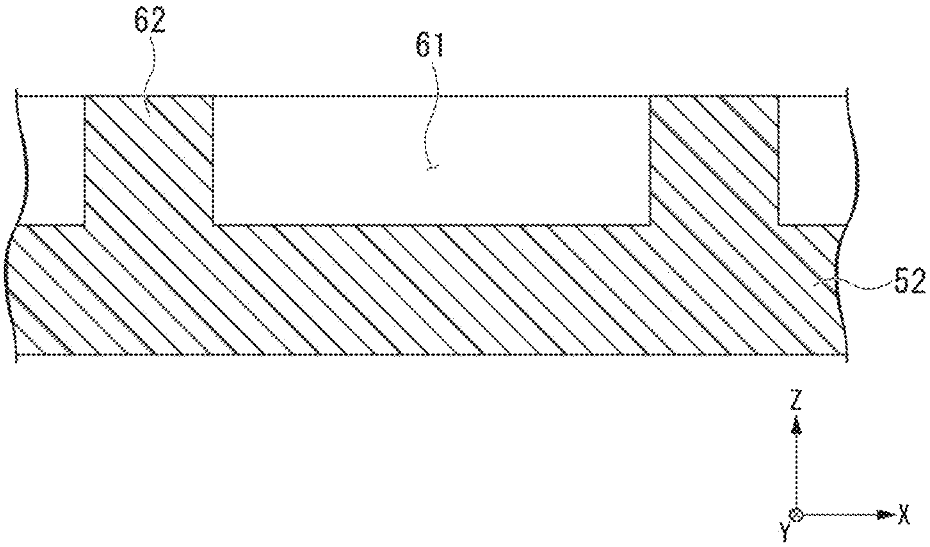
FIG. 21 is a process diagram illustrating the method of manufacturing the head chip according to the first embodiment.

As shown in FIG. 21, in the flow channel member first-processing step S07, the flow channels 60 (see FIG. 3) and the pressure chambers 61 are provided to the flow channel member 52. The flow channels 60 and the pressure chambers 61 are formed by performing, for example, dicing processing or sandblasting on the flow channel member 52. Then, a portion of the flow channel member 52, the portion partitioning the pressure chambers 61 adjacent to each other, remains as the partition wall 62.

Figure 22:
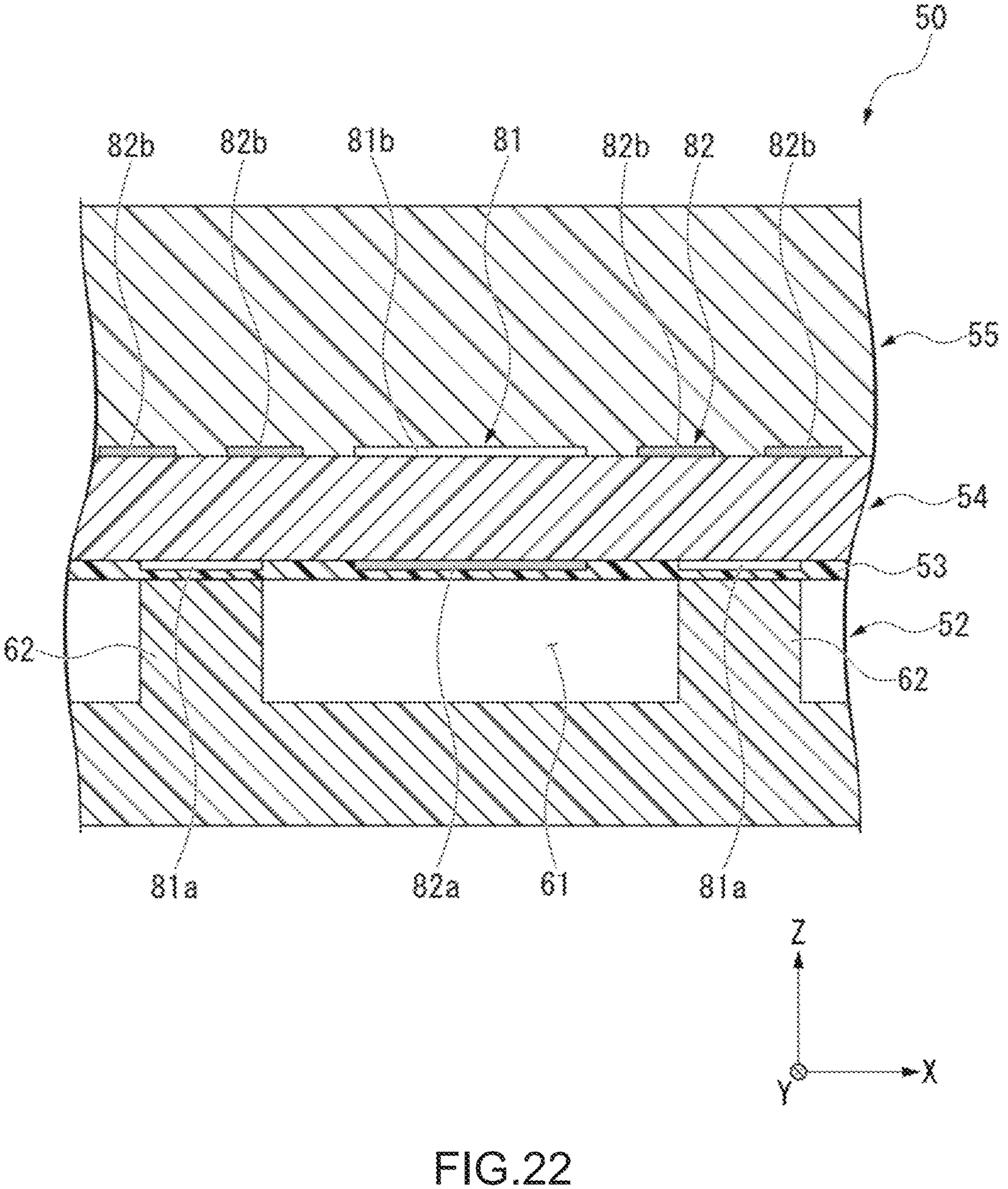
FIG. 22 is a process diagram illustrating the method of manufacturing the head chip according to the first embodiment.

As shown in FIG. 22, in the third bonding step S08, the flow channel member 52 is attached to the lower surface of the first film 53 with an adhesive or the like.

Figure 23:
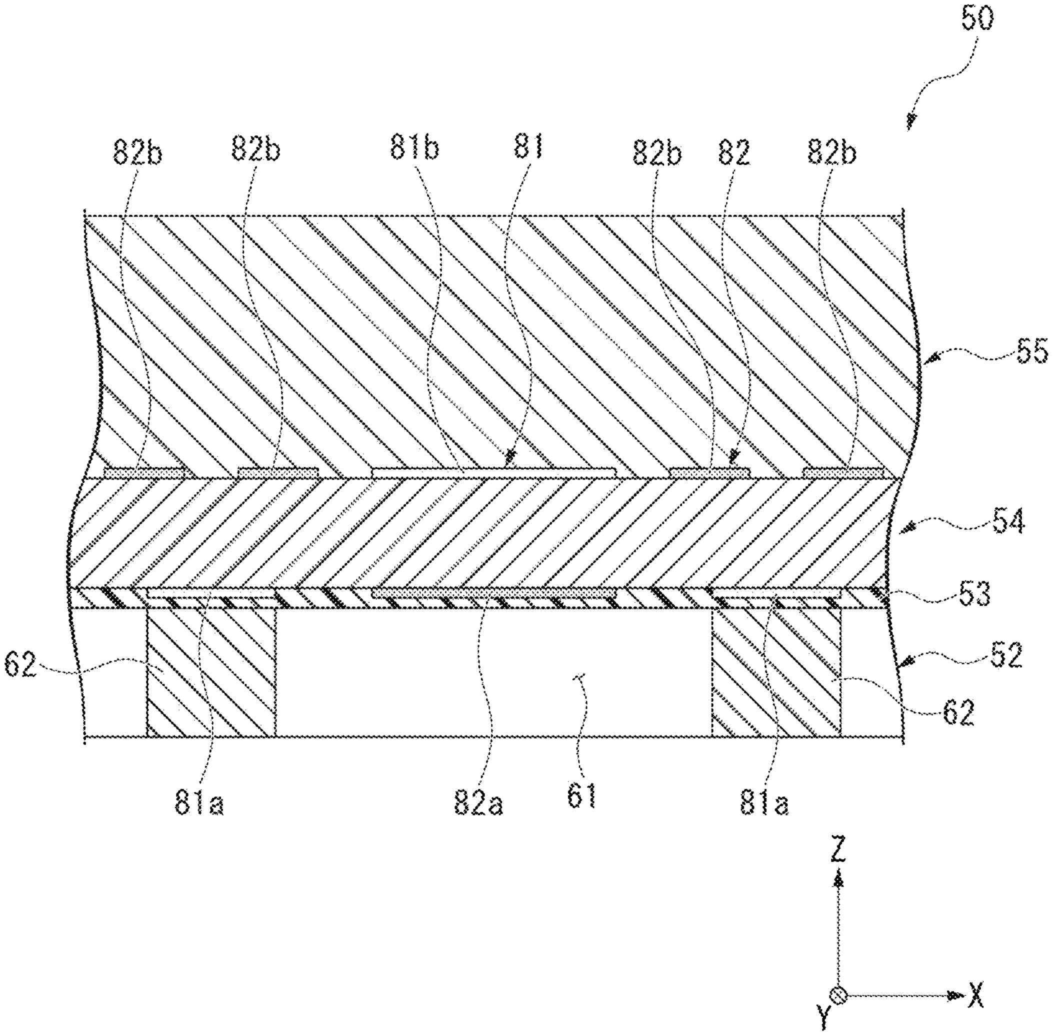
FIG. 23 is a process diagram illustrating the method of manufacturing the head chip according to the first embodiment.

As shown in FIG. 23, in the flow channel member second-processing step S09, grinding processing is performed on the lower surface of the flow channel member 52 (a grinding step). On this occasion, on the lower surface of the flow channel member 52, the flow channel member 52 is ground up to a position where the flow channels 60 and the pressure chambers 61 open.

In the fourth bonding step S10, the nozzle plate 51 is attached to the lower surface of the flow channel member 52 in a state in which the nozzle holes 51*a* and the pressure chambers 61 are aligned with each other.

Due to the steps described hereinabove, the head chip 50 is completed.

As described above, in the first embodiment, the cover plate (a second plate) 55 is provided with the upper recessed parts (first recessed parts) 71, 75 which open on the upper surface (a first surface facing to a first side in the thickness direction), and the lower recessed parts (second recessed parts) 72, 76 which open on the lower surface (a second surface facing to a second side in the thickness direction), and which are communicated with the upper recessed parts 71, 75. For example, the lower recessed part 72 is provided with the +Y-side inner surface (a first inner surface part) 72*a* and the −Y-side inner surface 72*b* which extend in the Z direction continuously to the lower end opening edge (an inner surface) of the upper recessed part 71 and the +X-side inner surface (a second inner surface part) 72*c* and the −X-side inner surface 72*d* which are located at the outer side in the X direction with respect to the inner surface of the upper recessed part 71, and which extend in the Z direction within a dimensional range of the lower end opening part of the upper recessed part 71 viewed from the Z direction. There is adopted the configuration in which the cover plate 55 is provided with the second common penetrating interconnections (the second interconnections) 85 which penetrate the cover plate 55 through the +Y-side inner surface 72*a* and the inner surface of the upper recessed part 71, and which couple the common interconnections (first interconnections) 81 provided to the actuator plate (a first plate) 54 and the flexible printed board (external interconnections) to each other.

According to this configuration, it is easy to continuously form the interconnections throughout the +Y-side inner surface 72*a* and the inner surface of the upper recessed part 71 when forming the second common penetrating interconnections 85 through the upper end opening part of the upper recessed part 71.

On that basis, since the lower recessed part 72 is provided with the +X-side inner surface 72*c* and the −X-side inner surface 72*d* located at the outer side in the X direction with respect to the inner surface of the upper recessed part 71, an outer flared part 70 is formed in a portion of the lower recessed part 72, the portion being located at the outer side in the X direction with respect to the upper recessed part 71. Therefore, when bonding the actuator plate 54 and the cover plate 55 to each other, the outer flared part 70 functions as an adhesive pool. In other words, compared to when forming the lower recessed part 72 so as to be equivalent in opening area to the upper recessed part 71, it is possible to retain the adhesive in a portion other than a communication portion (the first penetrating part 73) between the upper recessed part 71 and the lower recessed part 72. Thus, it is possible to prevent the conduction between the common interconnections 81 and the second common penetrating interconnections 85 from being blocked by the adhesive, and thus, it is possible to achieve the stability in the conduction between the common interconnections 81 and the second common penetrating interconnections 85. As a result, the yield ratio can be improved. It should be noted that substantially the same functions and advantages as described above are also applied to the individual interconnections 82 and the second individual penetrating interconnections 86 formed in the upper recessed part 75 and the lower recessed part 76.

In the head chip 50 according to the first embodiment, there is adopted the configuration in which the opening area of the lower end opening part in the lower recessed parts 72, 76 is larger than the opening area of the upper end opening part in one of the upper recessed parts 71, 75.

According to this configuration, it becomes easy to ensure the volume as the adhesive pool with respect to the lower recessed parts 72, 76, and it is possible to achieve the stability in conduction between the common interconnections 81 and the second common penetrating interconnections 85, and the conduction between the individual interconnections 82 and the second individual penetrating interconnections 86.

In the head chip 50 according to the first embodiment, the plurality of upper recessed parts 71, 75 is disposed at intervals in the X direction (the first direction), and the lower recessed parts 72, 76 extend in the X direction so as to straddle the upper recessed parts 71, 75 adjacent to each other out of the plurality of upper recessed parts 71, 75. For example, the Y-side inner surfaces 72*a*, 72*b* extend (are arranged at the same position in the plan view) in the Z direction continuously to the inner surface of the lower recessed part 72. The X-side inner surfaces 72*c*, 72*d* are included on the inner surface of the lower recessed part 72, and extend in the Z direction at the outer side in the X direction with respect to the inner surfaces of the upper recessed parts 71, 75.

According to this configuration, it is sufficient to dispose the single lower recessed part 72, 76 with respect to the plurality of upper recessed parts 71, 75, respectively. Therefore, compared to when forming the lower recessed parts 72, 76 separately so as to correspond respectively to the upper recessed parts 71, 75, it is possible to achieve an increase in manufacturing efficiency of the lower recessed parts 72, 76.

In the head chip 50 according to the first embodiment, there is adopted the configuration in which the upper recessed parts 71, 75 are each formed to have the taper shape having the inner diameter decreasing in the downward direction, and the dimension in the Z direction in the upper recessed parts 71, 75 is larger than the dimension in the Z direction in the lower recessed parts 72, 76.

According to this configuration, it is easy to continuously form the second common penetrating interconnections 85 and the second individual penetrating interconnections 86 on the inner surfaces of the penetrating parts 73, 77 when forming the second common penetrating interconnections 85 and the second individual penetrating interconnections 86 through the upper opening parts of the upper recessed parts 71, 75 using, for example, the oblique vapor deposition. As a result, it is possible to achieve the reduction in cost of the head chip 50.

Since the inkjet head 5 and the printer 1 according to the first embodiment are each provided with the head chip 50 described above, it is possible to provide the inkjet head 5 and the printer 1 which are excellent in reliability.

In the head chip 50 according to the first embodiment, there is adopted the configuration in which the upper recessed parts 71, 75 are formed by performing the sandblasting from the upper surface side of the cover plate 55, and the lower recessed parts 72, 76 are formed by performing the dicing processing from the lower surface side of the cover plate 55.

According to this configuration, by forming the lower recessed parts 72, 76 using the dicing processing, it is possible to penetrate the cover plate 55 with the upper recessed part 71 and the lower recessed part 72 and with the upper recessed part 75 and the lower recessed part 76 while removing the constricted portion 112 formed by the sandblasting. Therefore, unlike when grinding the cover plate 55 so as to remove the constricted portion 112 after forming the first recessed part 71 using the sandblasting as in the related art, it is possible to prevent the thickness of the cover plate 55 from changing between before and after the processing. In other words, since it is possible to perform the processing on the cover plate 55 while keeping the thickness of the cover plate 55, it is possible to prevent an occurrence of cracks and so on to improve the handling property. As a result, it is possible to increase the manufacturing efficiency.

Second Embodiment

Figure 24:
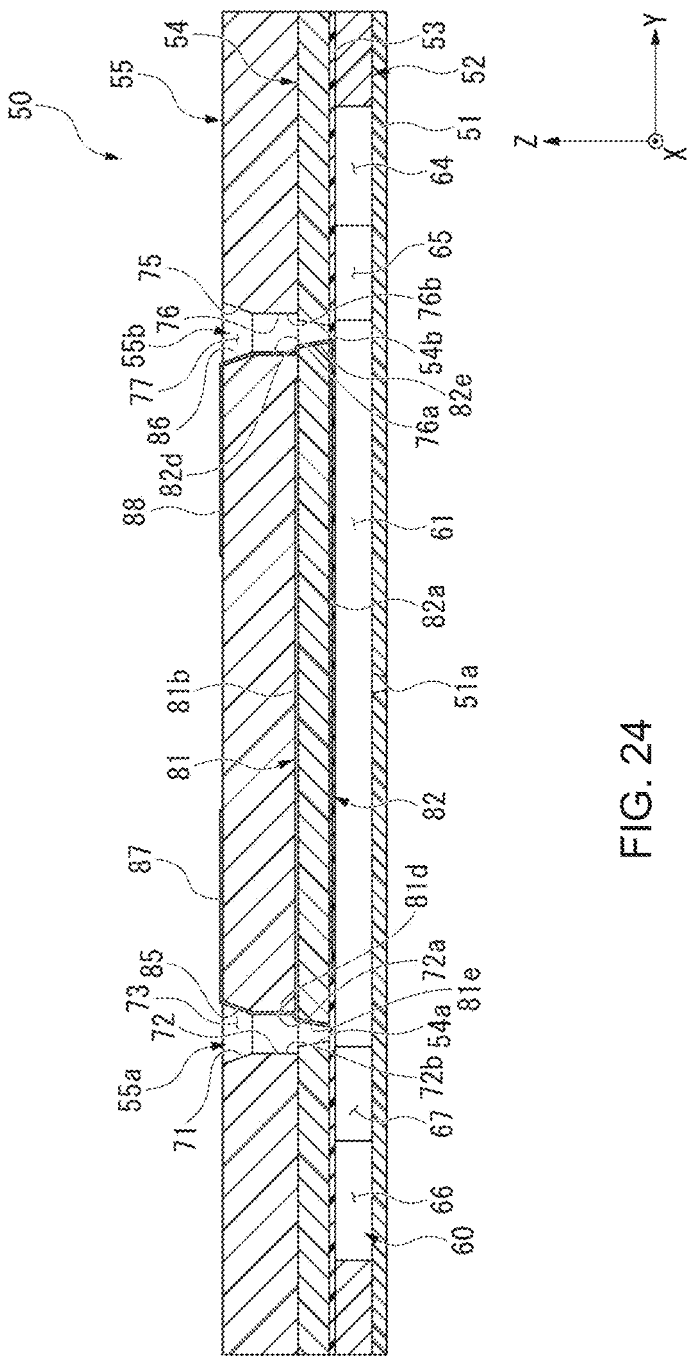
FIG. 24 is a cross-sectional view of a head chip according to a second embodiment.

FIG. 24 is a cross-sectional view corresponding to FIG. 5 of the head chip 50 according to a second embodiment.

In the head chip 50 shown in FIG. 24, the dimension in the Z direction in the upper recessed part 71 is made smaller than the dimension in the Z direction in the lower recessed part 72.

Here, the constricted portion 112 shown in FIG. 14 tends to be formed at a position (at the −Z side) where the blast mark 110 is deeper as the inner diameter of the upper end opening part in the blast mark 110 (the upper recessed part 71) increases.

Here, by making the dimension in the Z direction in the upper recessed part 71 smaller than the dimension in the Z direction in the lower recessed part 72 as in the second embodiment, it is possible to decrease the inner diameter of the upper end opening part in the upper recessed part 71. As a result, it is possible to achieve an increase in degree of design freedom, a reduction in pitch of the pressure chambers 61, and a reduction in size of the head chip 50.

The description is presented in the second embodiment citing the first conduction part 55*a* (the upper recessed part 71 and the lower recessed part 72) as an example, but this configuration is not a limitation. The same applies also to the second conduction part 55*b* (the upper recessed part 75 and the lower recessed part 76).

Third Embodiment

Figure 25:
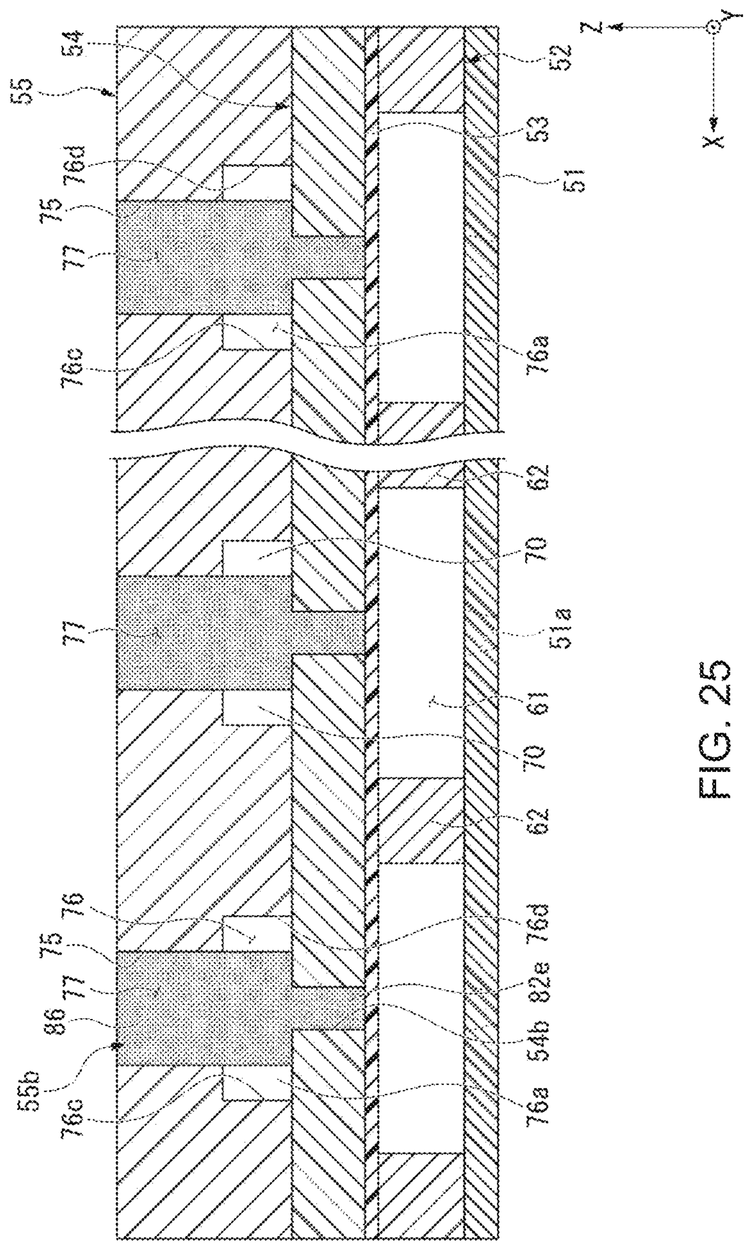
FIG. 25 is a cross-sectional view of a head chip according to a third embodiment.

FIG. 25 is a cross-sectional view corresponding to FIG. 7 of the head chip 50 according to a third embodiment.

In the head chip 50 shown in FIG. 25, the lower recessed part 76 is individually disposed so as to correspond to the upper recessed part 75. Both end portions in the X direction of the inner surface of the lower recessed part 76 are located at the outer side in the X direction with respect to the lower end opening edges of the upper recessed part 75. Specifically, the +X-side inner surface (the second inner surface part) 76*c* out of the inner surfaces of the lower recessed part 76 is located at the +X side with respect to the lower end opening edge of the upper recessed parts 75. The −X-side inner surface (the second inner surface part) 76*d* out of the inner surfaces of the lower recessed part 76 is located at the −X side with respect to the lower end opening edge of the upper recessed parts 75. It should be noted that it is sufficient for the +X-side inner surface 76*c* and the −X-side inner surface 76*d* to be located at the outer side with respect to at least the lower end opening edge of the inner surface of the upper recessed part 75. In this case, it is possible for the +X-side inner surface 76*c* and the −X-side inner surface 76*d* to be located at the outer side with respect to the upper end opening edge of the inner surface of, for example, the upper recessed part 75. Further, the opening area of the lower end opening part in the lower recessed part 76 may be larger than, or may also be smaller than, the opening area of the upper end opening part in the upper recessed part 75.

In the head chip 50 according to the third embodiment, since the upper recessed part 75 and the lower recessed part 76 are formed so as to individually correspond to each other, the stability of the conduction is easily ensured compared to when, for example, the second individual penetrating interconnections 86 adjacent to each other are formed in the same lower recessed part 76. It should be noted that although the description is presented in the third embodiment citing the second conduction part 55*b* as an example, it is possible to adopt substantially the same configuration in the first conduction part 55*a* (the upper recessed part 71 and the lower recessed part 72).

Fourth Embodiment

Figure 26:
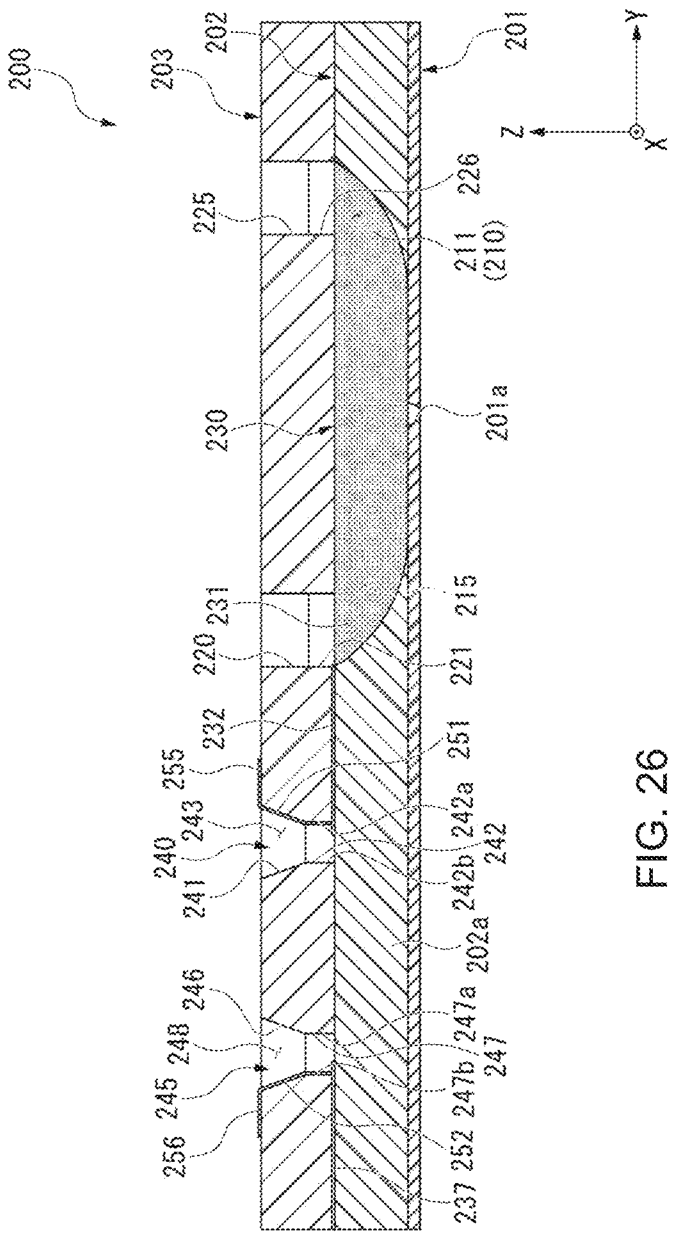
FIG. 26 is a cross-sectional view of a head chip according to a fourth embodiment.
Figure 27:
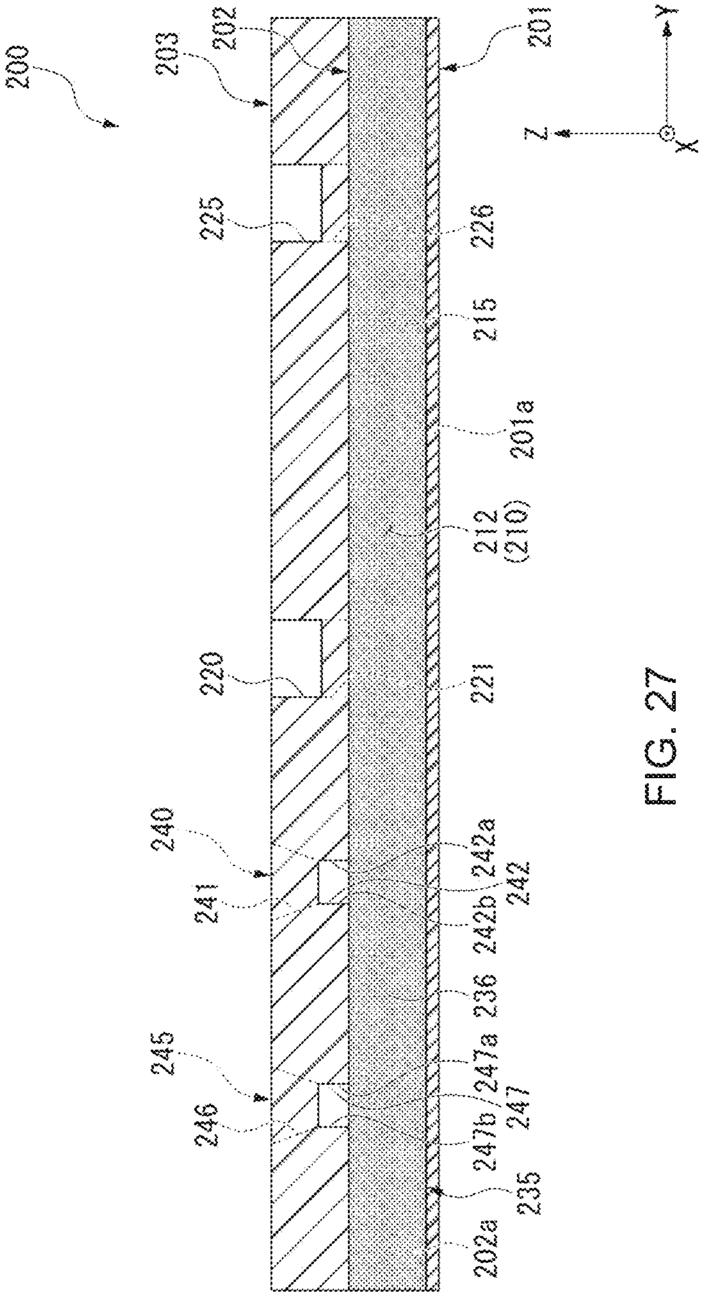
FIG. 27 is a cross-sectional view of the head chip according to the fourth embodiment.

FIG. 26 and FIG. 27 are cross-sectional views of a head chip 200 according to a fourth embodiment.

The head chip 200 shown in FIG. 26 and FIG. 27 is provided with a nozzle plate 201, an actuator plate 202, and a cover plate 203. The head chip 200 is provided with a configuration in which the nozzle plate 201, the actuator plate 202, and the cover plate 203 are stacked on one another in this order in the Z direction.

<Actuator Plate 202>

The actuator plate 202 is provided with a channel column 210. The channel column 210 includes ejection channels 211 filled with the ink, and non-ejection channels 212 not filled with the ink. The channels 211, 212 are alternately arranged at intervals in the X direction in the actuator plate 202.

As shown in FIG. 26, the ejection channel 211 is formed in a +Y-side portion in the actuator plate 202. The ejection channels 211 are each formed to have a circular arc shape convex downward when viewed from the X direction. The ejection channel 211 opens on each of an upper surface and a lower surface of the actuator plate 202. The dimension in the Y direction of the ejection channel 211 decreases in the downward direction.

As shown in FIG. 27, the non-ejection channel 212 linearly extends throughout the entire length in the Y direction in the actuator plate 202 in the state of penetrating the actuator plate 202 in the Z direction. In the actuator plate 202, portions located between the ejection channels 211 and the non-ejection channels 212 adjacent to each other each constitute a drive wall (a drive unit) 215 facing the ejection channel 211.

<Cover Plate 203>

As shown in FIG. 26 and FIG. 27, the cover plate 203 is stacked on an upper surface of the actuator plate 202 by bonding or the like so as to cover the upper end opening parts of the channels 211, 212. In the cover plate 203, at a position overlapping the −Y-side end portion of the ejection channel 211 in the plan view, there is formed an entrance common flow channel 220. The entrance common flow channel 220 extends in the X direction with a length sufficient for straddling, for example, the channel column 210, and at the same time, opens on the upper surface of the cover plate 203.

In the entrance common flow channel 220, at the positions overlapping the respective ejection channels 211 in the plan view, there are formed entrance slits 221. The entrance slits 221 each communicate the −Y-side end portion of corresponding one of the ejection channels 211 and the entrance common flow channel 220 with each other.

In the cover plate 203, at a position overlapping the +Y-side end portion of the ejection channel 211 in the plan view, there is formed an exit common flow channel 225. The exit common flow channel 225 extends in the X direction with a length sufficient for straddling, for example, the channel column 210, and at the same time, opens on the upper surface of the cover plate 203.

In the exit common flow channel 225, at the positions overlapping the respective non-ejection channels 212 in the plan view, there are formed exit slits 226. The exit slits 226 each communicate the +Y-side end portion of corresponding one of the ejection channels 211 and the exit common flow channel 225 with each other. Therefore, the entrance slits 221 and the exit slits 226 are communicated with the respective ejection channels 211 on the one hand, but are not communicated with the non-ejection channels 212 on the other hand.

<Nozzle Plate 201>

The nozzle plate 201 is stacked on the lower surface of the actuator plate 202 with bonding or the like. In the nozzle plate 201, at positions overlapping central portions in the Y direction of the respective ejection channels 211, there are formed nozzle holes 201*a*. It should be noted that it is possible to make an intermediate plate (not shown) intervene between the nozzle plate 201 and the actuator plate 202. In this case, the ejection channel 211 and the nozzle hole 201*a* are communicated with each other through a communication hole provided to the intermediate plate.

Figure 28:
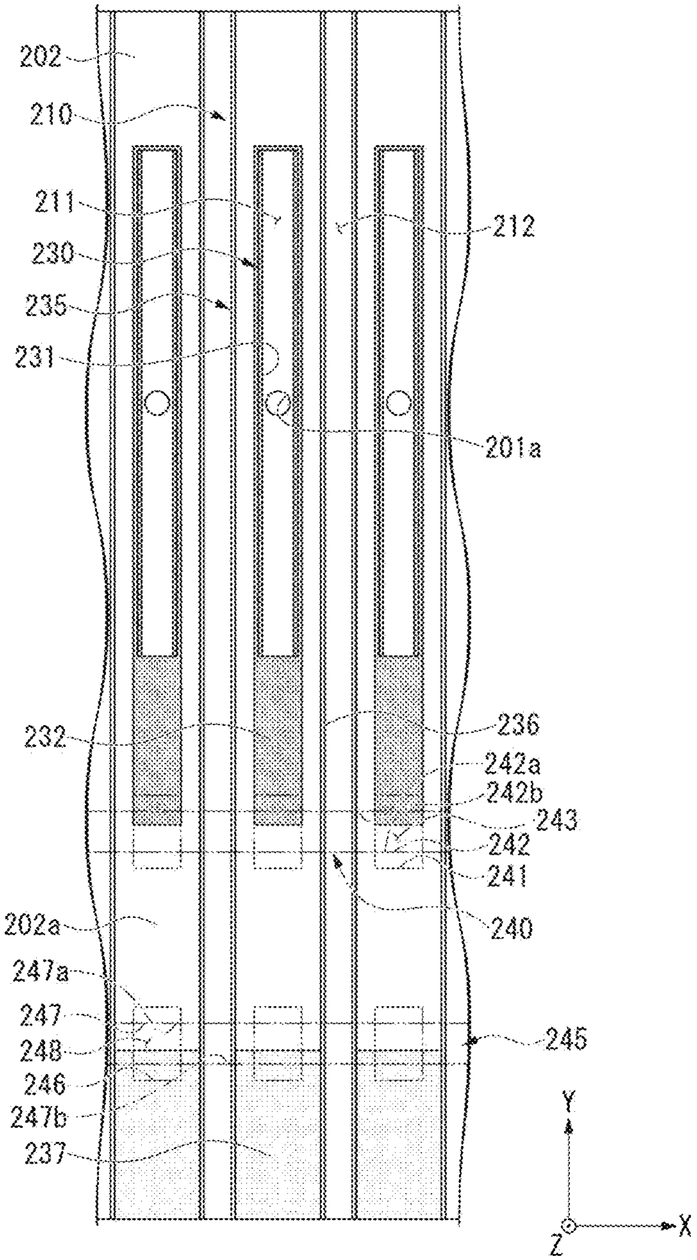
FIG. 28 is an enlarged plan view of an actuator plate related to the fourth embodiment.

Then, drive interconnections (common interconnections 230 and individual interconnections 235) provided to the actuator plate 202 will be described. FIG. 28 is an enlarged plan view of the actuator plate 202.

As shown in FIG. 26 and FIG. 28, the common interconnections 230 are each provided with a common electrode 231 and a common extraction interconnection 232.

The common electrode 231 is formed on at least inner side surfaces opposed to each other in the X direction out of the inner surfaces of the ejection channel 211.

The common extraction interconnection 232 is formed on an upper surface of a portion (hereinafter referred to as a tail part 202*a*) located at the −Y side of the ejection channel 211 in the actuator plate 202. The common extraction interconnection 232 is disposed on the upper surface of the tail part 202*a* so as to correspond to each of the ejection channels 211. The common extraction interconnections 232 each extend linearly in the Y direction with respect to corresponding one of the ejection channels 211. A +Y-side end portion in a common pad 255 is connected to the common electrode 231 in an upper end opening edge of the ejection channel 211.

As shown in FIG. 27 and FIG. 28, the individual interconnections 235 are each provided with individual electrodes 236, and an individual extraction interconnection 237.

The individual electrodes 236 are each formed on one of the inner side surfaces opposed to each other in the X direction out of the inner surfaces of each of the non-ejection channels 212.

The individual extraction interconnection 237 is formed in a portion located at the −Y side of the common extraction interconnection 232 on the upper surface of the tail part 202*a*. The individual extraction interconnection 237 is formed to have a strip shape extending in the X direction. The individual extraction interconnection 237 couples the individual electrodes 236 opposed to each other in the X direction across the ejection channel 211 to each other at the upper end opening edges of the non-ejection channels 212 which are opposed to each other in the X direction across the ejection channel 211.

Figure 29:
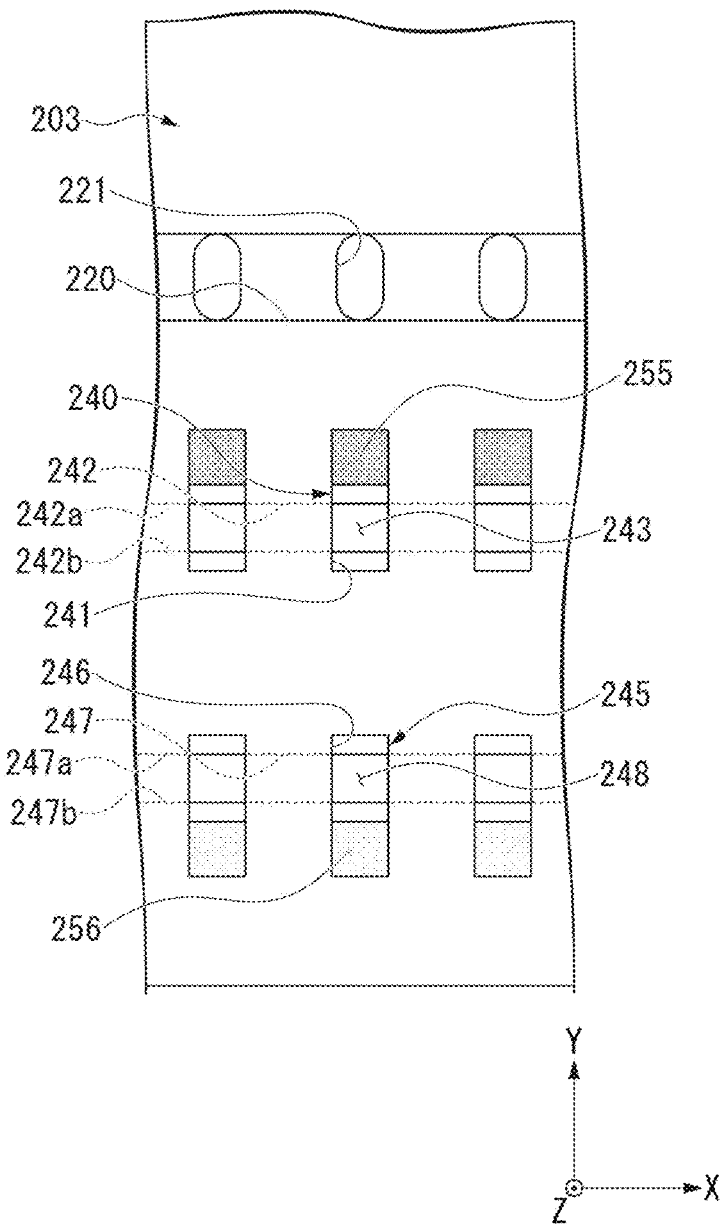
FIG. 29 is an enlarged plan view of a cover plate related to the fourth embodiment.

FIG. 29 is an enlarged plan view of the cover plate 203.

As shown in FIG. 26 and FIG. 29, the cover plate 203 is provided with first conduction parts 240 and second conduction parts 245.

The first conduction parts 240 are each provided with an upper recessed part 241 and a lower recessed part 242.

The upper recessed part 241 is provided to a portion of the cover plate 203, the portion overlapping the tail part 202*a* in the plan view. The plurality of upper recessed parts 241 is disposed at intervals in the X direction so as to correspond respectively to the ejection channels 211.

The upper recessed part 241 opens on the upper surface of the cover plate 203. Specifically, the upper recessed part 241 forms an upper end opening part of the first conduction part 240. The upper recessed part 241 is formed to have a taper shape having an inner diameter in at least the Y direction gradually decreasing in a direction from the upper side toward the lower side in a cross-sectional view.

The lower recessed part 242 opens on the lower surface of the cover plate 203. Specifically, the lower recessed part 242 forms a lower end opening part of the first conduction part 240. The lower recessed part 242 is formed like a groove extending in the X direction so as to straddle all of the upper recessed parts 241. The lower recessed part 242 is communicated with the inside of the upper recessed part 241 through the portion overlapping the upper recessed part 241 in the plan view. In the first conduction part 240, a portion communicated with the upper recessed part 241 and the lower recessed part 242 forms a first penetrating part 243 penetrating the cover plate 203 in the Z direction.

The dimension in the Y direction of the lower recessed part 242 is made equivalent to the dimension in the Y direction in the lower end opening part of the upper recessed part 241. In the illustrated example, the dimension in the Y direction in the lower recessed part 242 is uniform throughout the entire length in the Z direction. Out of the pair of inner surfaces opposed in the Y direction to each other in the lower recessed part 242, a +Y-side inner surface (the first inner surface part) 242*a* continues (is arranged at the same position in the plan view) from the same position in the plan view as the position of the +Y-side opening edge of the lower end opening edge of the upper recessed part 241 without a step. Therefore, the +Y-side inner surface 242*a* is located within a dimensional range of the lower end opening part of the upper recessed part 241 viewed from the Z direction, and continuously extends with respect to the inner surface of the upper recessed part 241.

Out of the pair of inner surfaces opposed in the Y direction to each other in the lower recessed part 242, a −Y-side inner surface (the first inner surface part) 242*b* continues (is arranged at the same position in the plan view) from the same position in the plan view as the position of the −Y-side opening edge of the lower end opening edge of the upper recessed part 241 without a step. Therefore, the −Y-side inner surface 242*b* is located within a dimensional range of the lower end opening part of the upper recessed part 241 viewed from the Z direction, and continuously extends with respect to the inner surface of the upper recessed part 241.

It should be noted that the +X-side end portion in the lower recessed part 242 is located at the +X side with respect to the upper recessed part 241 located at the extreme +X side of the upper recessed parts 241. The −X-side end portion in the lower recessed part 242 is located at the −X side with respect to the upper recessed part 241 located at the extreme −X side of the upper recessed parts 241.

The second conduction part 245 is provided to a portion of the cover plate 203, the portion being located at the −Y side with respect to the first conduction part 240. The second conduction parts 245 are each provided with an upper recessed part 246 and a lower recessed part 247.

The plurality of upper recessed parts 246 is disposed at intervals in the X direction so as to correspond respectively to the ejection channels 211 in the cover plate 203.

The lower recessed part 247 is formed like a groove extending in the X direction so as to straddle all of the upper recessed parts 246. In other words, the lower recessed part 247 is communicated with the inside of the upper recessed part 246 through the portion overlapping the upper recessed part 246 in the plan view. In the second conduction part 245, a portion communicated with the upper recessed part 246 and the lower recessed part 247 forms a second penetrating part 248 penetrating the cover plate 203 in the Z direction. Out of the pair of inner surfaces opposed in the Y direction to each other in the lower recessed part 247, a +Y-side inner surface (the first inner surface part) 247*a* continues (is arranged at the same position in the plan view) from the same position in the plan view as the position of the +Y-side opening edge of the lower end opening edge of the upper recessed part 246 without a step.

Out of the pair of inner surfaces opposed in the Y direction to each other in the lower recessed part 247, a −Y-side inner surface (the first inner surface part) 247*b* continues (is arranged at the same position in the plan view) from the same position in the plan view as the position of the −Y-side opening edge of the lower end opening edge of the upper recessed part 246 without a step.

It should be noted that the +X-side end portion in the lower recessed part 247 is located at the +X side with respect to the upper recessed part 246 located at the extreme +X side of the upper recessed parts 246. The −X-side end portion in the lower recessed part 247 is located at the −X side with respect to the upper recessed part 246 located at the extreme −X side of the upper recessed parts 246.

The cover plate 203 is provided with common penetrating interconnections 251 and individual penetrating interconnections 252 as coupling interconnections (the second interconnections), and the common pads 255 and individual pads 256 as terminal interconnections (the second interconnections).

The common penetrating interconnection 251 couples the common extraction interconnection 232 and the common pad 255 to each other. The common penetrating interconnection 251 is formed throughout the entire length in the Z direction on the inner surface of each of the first penetrating parts 243. Specifically, an upper half of the common penetrating interconnection 251 is formed in at least a portion located at the +Y side of the inner surface of the upper recessed part 241. An upper end edge of the common penetrating interconnection 251 is located at an upper end opening edge of the upper recessed part 241 (the first penetrating part 243). A lower half of the common penetrating interconnection 251 is formed on a +Y-side inner surface 242*a* of the inner surface of the lower recessed part 242. The upper half and the lower half of the common penetrating interconnection 251 are coupled to each other in a boundary portion between the upper recessed part 241 and the lower recessed part 242. A lower end edge of the common penetrating interconnection 251 is located at a lower end opening edge of the lower recessed part 242 (the first penetrating part 243). The lower end edge of the common penetrating interconnection 251 is coupled to the common extraction interconnection 232 on the upper surface of the tail part 202*a*. As shown in FIG. 27, the common penetrating interconnections 251 adjacent to each other are divided by a portion of the lower recessed part 242, the portion being located between the first penetrating parts 243.

As shown in FIG. 26 and FIG. 29, the common pad 255 is formed on the upper surface of the cover plate 203. The common pad 255 extends in the Y direction on the upper surface of the cover plate 203. The −Y-side end portion of the common pad 255 is coupled to an upper end edge of the common penetrating interconnection 251 at the upper end opening edge of the first penetrating part 243.

The individual penetrating interconnection 252 couples the individual extraction interconnection 237 and the individual pad 256 to each other. The individual penetrating interconnection 252 is formed throughout the entire length in the Z direction on the inner surface of each of the second penetrating parts 248. Specifically, an upper half of the individual penetrating interconnection 252 is formed in at least a portion located at the −Y side of the inner surface of the upper recessed part 246. An upper end edge of the individual penetrating interconnection 252 is located at an upper end opening edge of the upper recessed part 246 (the second penetrating part 248). A lower half of the individual penetrating interconnection 252 is formed on a −Y-side inner surface 247*b* of the inner surface of the lower recessed part 247. The upper half and the lower half of the individual penetrating interconnection 252 are coupled to each other in a boundary portion between the upper recessed part 246 and the lower recessed part 247. A lower end edge of the individual penetrating interconnection 252 is located at a lower end opening edge of the lower recessed part 247 (the second penetrating part 248). The lower end edge of the individual penetrating interconnection 252 is coupled to the individual extraction interconnection 237 on the upper surface of the tail part 202*a*. As shown in FIG. 27, the individual penetrating interconnections 252 adjacent to each other are divided by a portion of the lower recessed part 247, the portion being located between the second penetrating parts 248.

As shown in FIG. 29, the individual pads 256 are formed on the upper surface of the cover plate 203. The individual pad 256 extends in the Y direction on the upper surface of the cover plate 203. The +Y-side end portion of the individual pad 256 is coupled to an upper end edge of the individual penetrating interconnection 252 at the upper end opening edge of the second penetrating part 248. It should be noted that a flexible printed board (not shown) is pressure-bonded to the upper surface of the cover plate 203.

In the head chip 200 according to the fourth embodiment, there is adopted the configuration in which the actuator plate 202 is provided with the ejection channels (jet channels) 211 and the non-ejection channels (non-jet channels) 212, and the common extraction interconnections 232 and the individual extraction interconnections 237 are formed on the upper surface of the actuator plate 202.

According to this configuration, it becomes easy to route the common electrodes 231 formed on the inner surfaces of the ejection channels 211 to the common penetrating interconnections 251, and at the same time, it is easy to route the individual electrodes 236 formed on the inner surfaces of the non-ejection channels 212 to the individual penetrating interconnections 252.

Moreover, compared to the configuration in which the flexible printed board is pressure-bonded to the actuator plate 202, it is possible to ensure the thickness of the portion of the head chip 200 to which the flexible printed board is pressure-bonded. Therefore, it becomes easy to perform the pressure-bonding operation of the flexible printed board, and thus, it is possible to achieve an increase in the manufacturing efficiency or the yield ratio.

Fifth Embodiment

Figure 30:
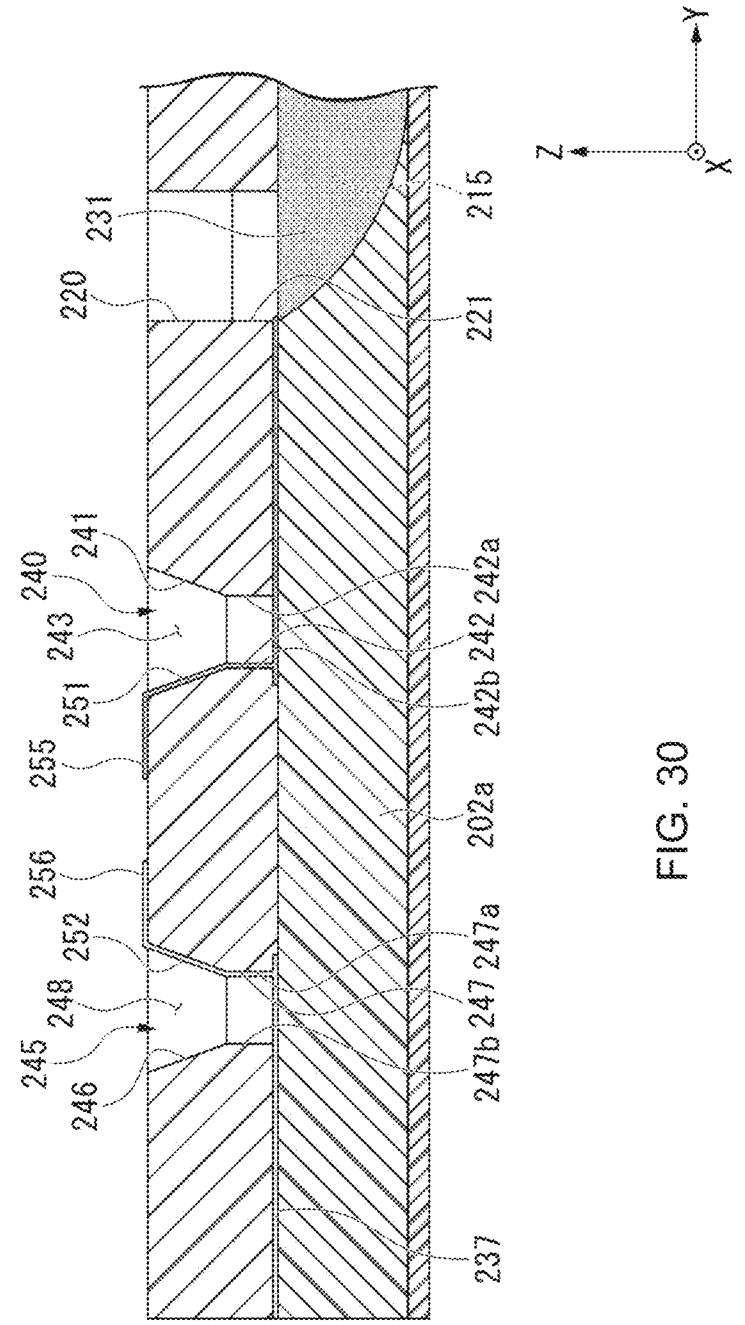
FIG. 30 is a cross-sectional view of a head chip according to a fifth embodiment.

FIG. 30 is a cross-sectional view corresponding to FIG. 26 in the head chip 200 according to a fifth embodiment.

In the fourth embodiment described above, there is described when the common penetrating interconnection 251 and the individual penetrating interconnection 252 are formed on a surface (e.g., the +Y-side inner surface 242*a* or the −Y-side inner surface 247*b*) far in the Y direction out of the inner surfaces of the corresponding to the penetrating parts 243, 248, but this configuration is not a limitation. For example, in the head chip 200 shown in FIG. 30, the common penetrating interconnections 251 and the individual penetrating interconnections 252 may be formed on a surface close in the Y direction out of the inner surfaces of the corresponding penetrating parts 243, 248.

Specifically, the common penetrating interconnection 251 is formed in a portion located at the −Y side on the inner surface of the first penetrating part 243. The common pad 255 extends from the upper-end opening edge of the first penetrating part 243 toward the −Y side on the upper surface of the cover plate 203.

The individual penetrating interconnection 252 is formed in a portion located at the +Y side on the inner surface of the second penetrating part 248. The individual pad 256 extends from the upper end opening edge of the second penetrating part 248 toward the +Y side on the upper surface of the cover plate 203. Therefore, the common pads 255 and the individual pads 256 are arranged in portions of the upper surface of the cover plate 203, the portions being located between the conduction parts 240, 245, respectively.

According to the configuration of the fifth embodiment, it is possible to make the common pads 255 and the individual pads 256 close to each other while suppressing the wiring length of the common pads 255 and the individual pads 256 on the upper surface of the cover plate 203. Thus, it is possible to reduce the capacitance of the head chip 200. As a result, it is possible to improve the responsiveness of the head chip 200, and at the same time, it is possible to suppress the heat generation in the head chip 200.

Sixth Embodiment

Figure 31:
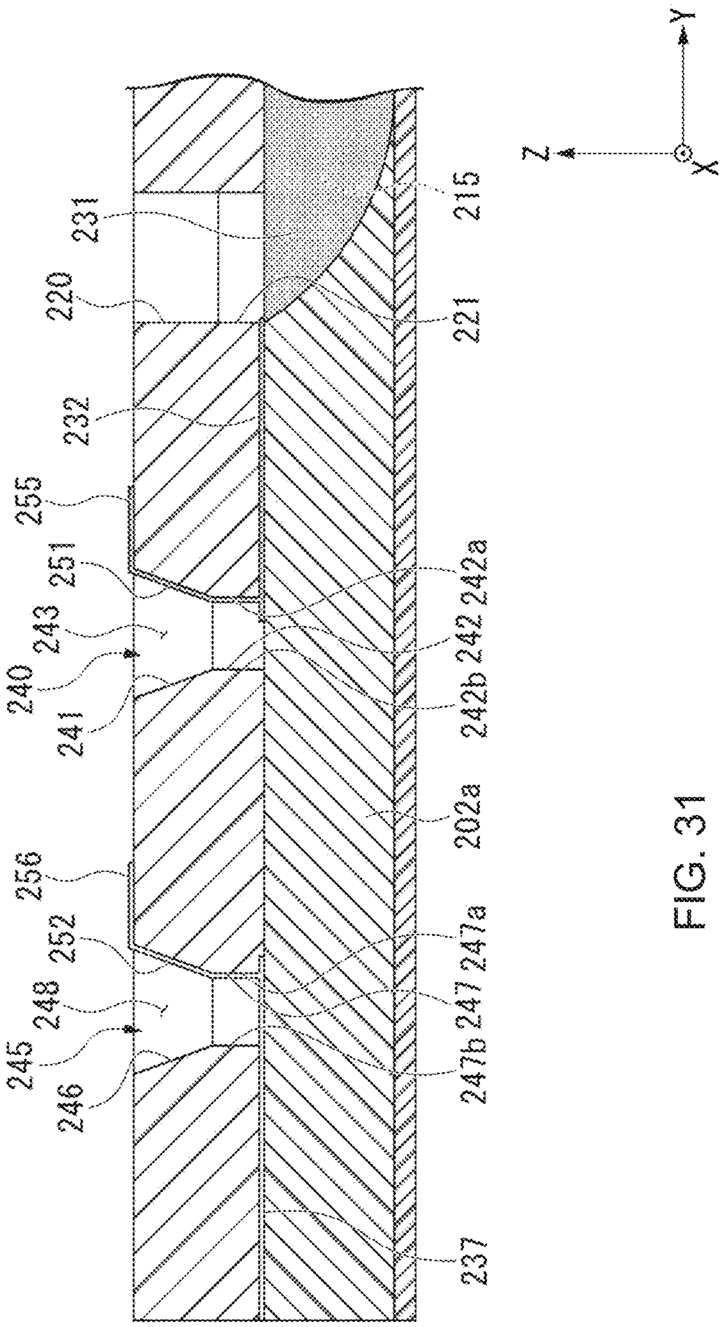
FIG. 31 is a cross-sectional view of a head chip according to a sixth embodiment.

FIG. 31 is a cross-sectional view corresponding to FIG. 26 in the head chip 200 according to the sixth embodiment.

The sixth embodiment is different from the embodiments described above in that the common penetrating interconnections 251 and the individual penetrating interconnections 252 are formed on a surface facing to the same direction out of the inner surfaces of the corresponding penetrating parts 243, 248.

Specifically, in the head chip 200 shown in FIG. 31, the common penetrating interconnection 251 is formed in a portion located at the +Y side on the inner surface of the first penetrating part 243. The common pad 255 extends from the upper end opening edge of the first penetrating part 243 toward the +Y side on the upper surface of the cover plate 203.

The individual penetrating interconnection 252 is formed in a portion located at the +Y side on the inner surface of the second penetrating part 248. The individual pad 256 extends from the upper end opening edge of the second penetrating part 248 toward the +Y side on the upper surface of the cover plate 203.

According to the configuration of the sixth embodiment, when forming the common penetrating interconnections 251 and the individual penetrating interconnections 252 using, for example, the oblique vapor deposition, it is possible to perform the deposition from the same direction (e.g., the −Y direction). Therefore, it is possible to achieve an increase in manufacturing efficiency.

Seventh Embodiment

Figure 32:
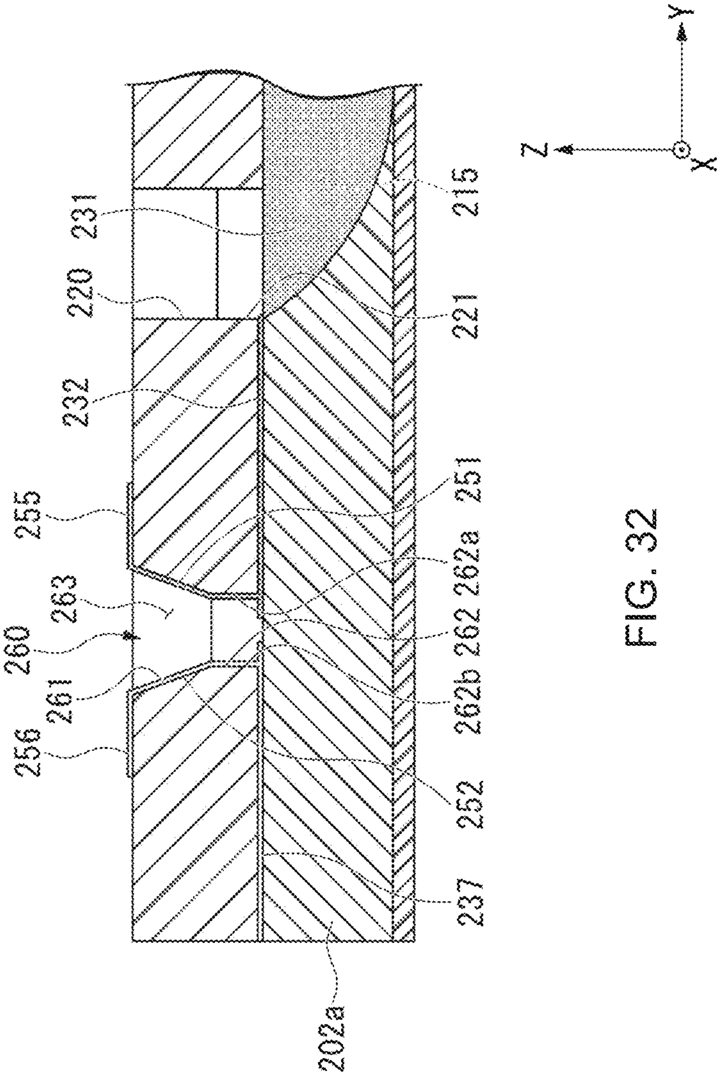
FIG. 32 is a cross-sectional view of a head chip according to a seventh embodiment.
Figure 33:
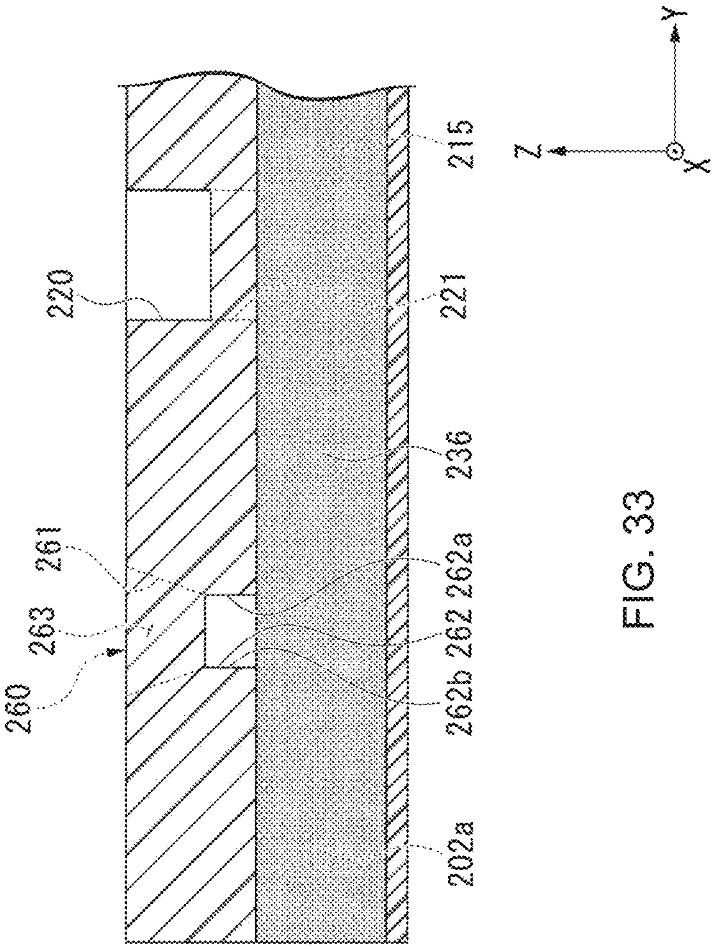
FIG. 33 is a cross-sectional view of the head chip according to the seventh embodiment.

FIG. 32 and FIG. 33 are cross-sectional views of a head chip 200 according to a seventh embodiment. The seventh embodiment is different from the embodiments described above in that two wiring systems are formed in a single penetrating part.

In the head chip 200 shown in FIG. 32 and FIG. 33, a conduction part 260 is provided with an upper recessed part 261 and a lower recessed part 262.

The upper recessed part 261 is formed to have a taper shape having an inner diameter in at least the Y direction gradually decreasing in a direction from the upper side toward the lower side in a cross-sectional view.

The lower recessed part 262 is formed like a groove extending in the X direction so as to straddle all of the upper recessed parts 261. The lower recessed part 262 is communicated with the inside of the upper recessed part 261 through the portion overlapping the upper recessed part 261 in the plan view. In the first conduction part 260, a portion communicated with the upper recessed part 261 and the lower recessed part 262 forms a penetrating part 263 penetrating the cover plate 203 in the Z direction.

Out of the pair of inner surfaces opposed in the Y direction to each other in the lower recessed part 262, a +Y-side inner surface (the first inner surface part) 262*a* continues (is arranged at the same position in the plan view) from the same position in the plan view as the position of the +Y-side opening edge of the lower end opening edge of the upper recessed part 261 without a step. Therefore, the +Y-side inner surface 262*a* is located within a dimensional range of the lower end opening part of the upper recessed part 261 viewed from the Z direction, and continuously extends with respect to the inner surface of the upper recessed part 261.

Out of the pair of inner surfaces opposed in the Y direction to each other in the lower recessed part 262, a −Y-side inner surface (the first inner surface part) 262*b* continues (is arranged at the same position in the plan view) from the same position in the plan view as the position of the −Y-side opening edge of the lower end opening edge of the upper recessed part 261 without a step. Therefore, the −Y-side inner surface 262*b* is located within a dimensional range of the lower end opening part of the upper recessed part 261 viewed from the Z direction, and continuously extends with respect to the inner surface of the upper recessed part 261. It should be noted that the +X-side end portion in the lower recessed part 262 is located at the +X side with respect to the upper recessed part 261 located at the extreme +X side of the upper recessed parts 261. The −X-side end portion in the lower recessed part 262 is located at the −X side with respect to the upper recessed part 261 located at the extreme −X side of the upper recessed parts 261.

As shown in FIG. 32, the common penetrating interconnection 251 is formed throughout the entire length in the Z direction in a portion of the inner surface of the penetrating part 263, the portion being located at the +Y side. Specifically, an upper half of the common penetrating interconnection 251 is formed in at least a portion located at the +Y side of the inner surface of the upper recessed part 261. An upper end edge of the common penetrating interconnection 251 is located at an upper end opening edge of the upper recessed part 261 (the penetrating part 263). A lower half of the common penetrating interconnection 251 is formed on a +Y-side inner surface 262*a* of the inner surface of the lower recessed part 262. The upper half and the lower half of the common penetrating interconnection 251 are coupled to each other in a boundary portion between the upper recessed part 261 and the lower recessed part 262. A lower end edge of the common penetrating interconnection 251 is located at a lower end opening edge of the lower recessed part 262 (the penetrating part 263).

Figure 34:
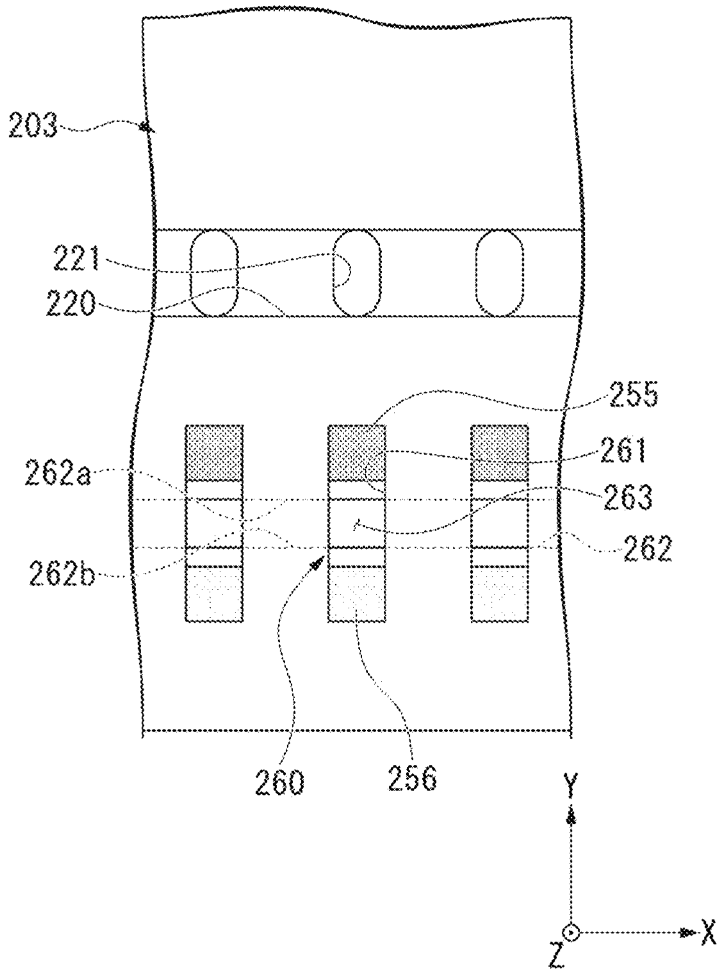
FIG. 34 is a plan view of a cover plate related to the seventh embodiment.

FIG. 34 is a plan view of the cover plate 203.

As shown in FIG. 32 and FIG. 34, the common pad 255 extends from the upper end opening edge of the penetrating part 263 toward the +Y side on the upper surface of the cover plate 203.

As shown in FIG. 32, the individual penetrating interconnection 252 is formed throughout the entire length in the Z direction in a portion of the inner surface of the penetrating part 263, the portion being located at the −Y side. Specifically, an upper half of the individual penetrating interconnection 252 is formed in at least a portion located at the −Y side of the inner surface of the upper recessed part 261. An upper end edge of the individual penetrating interconnection 252 is located at an upper end opening edge of the upper recessed part 261 (the penetrating part 263). A lower half of the individual penetrating interconnection 252 is formed on a −Y-side inner surface 262*b* of the inner surface of the lower recessed part 262. The upper half and the lower half of the individual penetrating interconnection 252 are coupled to each other in a boundary portion between the upper recessed part 261 and the lower recessed part 262. A lower end edge of the individual penetrating interconnection 252 is located at a lower end opening edge of the lower recessed part 262 (the penetrating part 263).

The common penetrating interconnection 251 and the individual penetrating interconnection 252 are divided from each other in the penetrating part 263. Specifically, the common penetrating interconnection 251 and the individual penetrating interconnection 252 are not formed on the inner surface facing to the X direction out of the inner surfaces of the upper recessed part 261. Therefore, the upper halves of the common penetrating interconnection 251 and the individual penetrating interconnection 252 are separated from each other with the inner surface facing to the X direction out of the inner surfaces of the upper recessed part 261.

In contrast, the lower recessed part 262 extends toward the outer side in the X direction with respect to the lower end opening edge of one of the upper recessed parts 261. Therefore, the lower halves of the common penetrating interconnection 251 and the individual penetrating interconnection 252 are divided from each other with the lower recessed part 262. It should be noted that it is possible to form a dividing groove or the like in the penetrating part 263 in order to divide the common penetrating interconnection 251 and the individual penetrating interconnection 252 from each other.

As shown in FIG. 32 and FIG. 34, the individual pad 256 extends from the upper end opening edge of the penetrating part 263 toward the −Y side on the upper surface of the cover plate 203.

In the seventh embodiment, both of the common penetrating interconnection 251 and the individual penetrating interconnection 252 are formed in the penetrating part 263 formed of the upper recessed part 261 and the lower recessed part 262 communicated with each other. Therefore, it is possible to reduce the number of the penetrating parts compared to when separately forming the penetrating parts respectively for the common penetrating interconnection 251 and the individual penetrating interconnection 252. As a result, it is possible to achieve an increase in degree of design freedom, a reduction in pitch of the channels, and a reduction in size of the head chip 200.

Further, it is easy to ensure the opening area of the upper end opening part of the penetrating part 263 compared to when separately forming the penetrating parts respectively for the common penetrating interconnection 251 and the individual penetrating interconnection 252. Therefore, it is possible to effectively introduce the electrode material into the penetrating part 263, and thus it is possible to increase the yield ratio.

Eighth Embodiment

Figure 35:
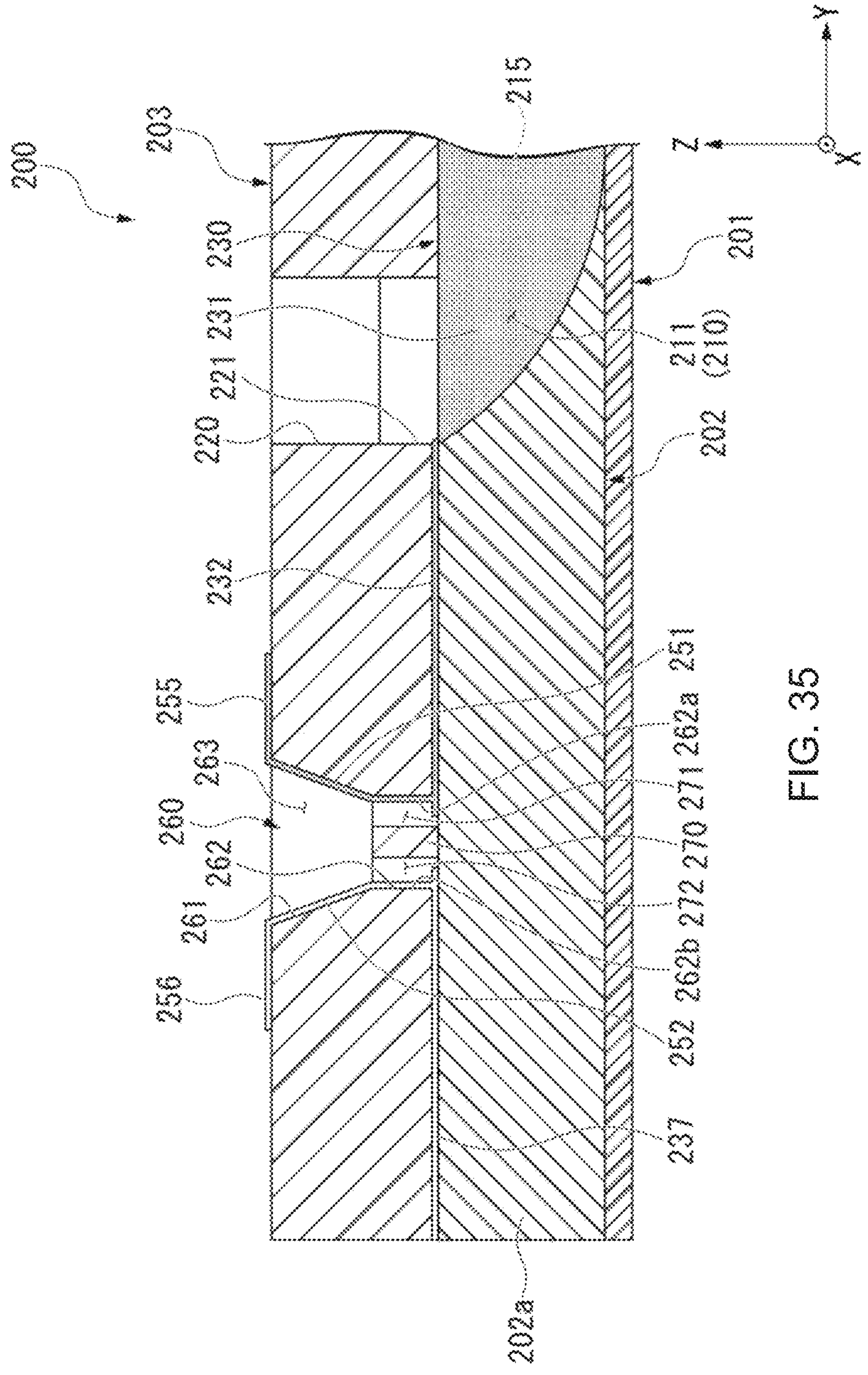
FIG. 35 is a cross-sectional view of a head chip according to an eighth embodiment.

FIG. 35 is a cross-sectional view of a head chip 200 according to an eighth embodiment.

The eighth embodiment is different from the embodiments described above in that the partition wall 270 for partitioning the lower recessed part 262 in the Y direction is provided with respect to the conduction part 260.

In the head chip 200 shown in FIG. 35, the lower recessed part 262 is provided with a common-use recessed part 271 located at the +Y side of the partition wall 270, and an individual-use recessed part 272 located at the −Y side of the partition wall 270. It should be noted that the common-use recessed part 271 and the individual-use recessed part 272 are formed by performing the dicing processing in two columns using a dicer smaller than the dimension of the constricted portion 112 in the lower recessed part formation step.

A lower half of the common penetrating interconnection 251 is formed on the inner surface (the +Y-side inner surface 262*a* of the lower recessed part 262) located at the +Y side out of the inner surfaces of the common-use recessed part 271.

A lower half of the individual penetrating interconnection 252 is formed on the inner surface (the −Y-side inner surface 262*b* of the lower recessed part 262) located at the −Y side out of the inner surfaces of the individual-use recessed part 272.

In the eighth embodiment, similarly to the seventh embodiment described above, it is easy to ensure the opening area of the upper end opening part of the penetrating part 263 compared to when separately forming the penetrating parts respectively for the common penetrating interconnection 251 and the individual penetrating interconnection 252. On that basis, by partitioning the lower recessed part 262 with the partition wall 270, it is possible to reduce the area of a portion of the actuator plate 202, the portion being exposed through the penetrating part 263. Therefore, it is possible to prevent the interconnections of respective systems different from each other from being coupled to each other on the upper surface of the actuator plate 202. It should be noted that when there is a possibility that the interconnections of the respective systems different from each other are coupled to each other on the upper surface of the partition wall 270, the electrode material to be formed on the upper surface of the partition wall 270 may appropriately be removed.

Figure 36:
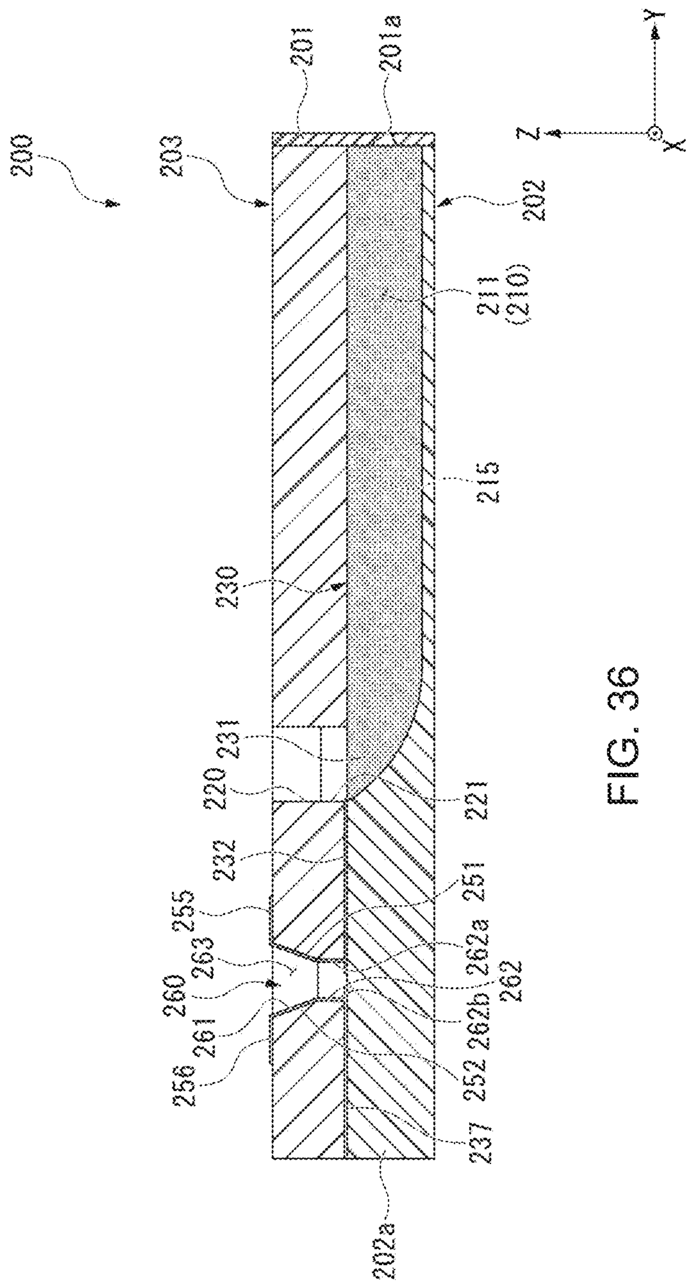
FIG. 36 is a cross-sectional view of a head chip according to the eighth embodiment.

In the fourth embodiment through the eighth embodiment described above, the description is presented citing the head chip 200 of a side-shoot type as an example, but this configuration is not a limitation. For example, as shown in FIG. 36, it is possible to adopt the configuration related to the present disclosure as the head chip 200 of a so-called edge-shoot type in which the ink is ejected from an end portion in an extending direction (the Y direction) in the ejection channel 211.

Ninth Embodiment

Figure 37:
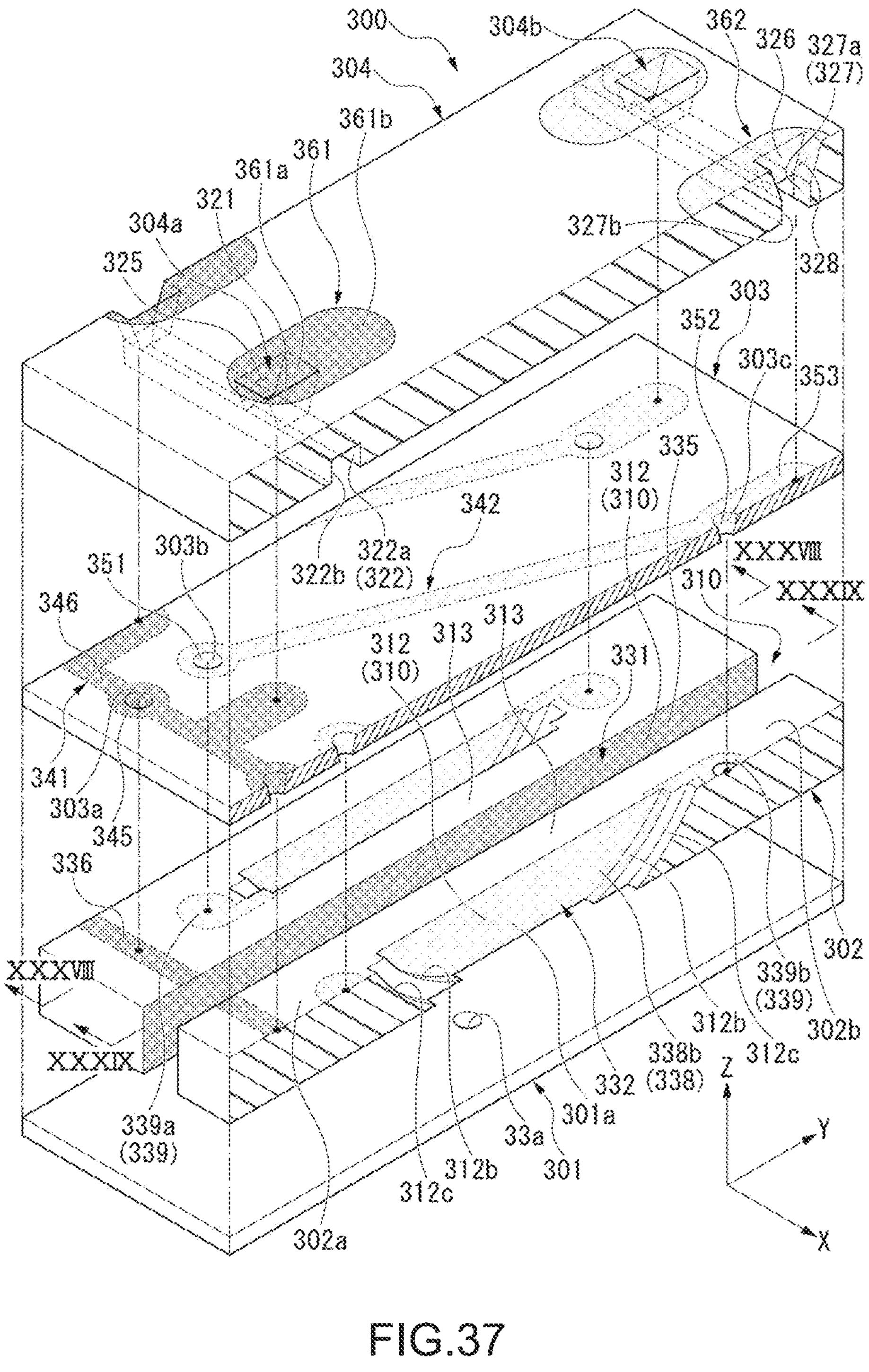
FIG. 37 is an exploded perspective view of a head chip according to a ninth embodiment.
Figure 38:
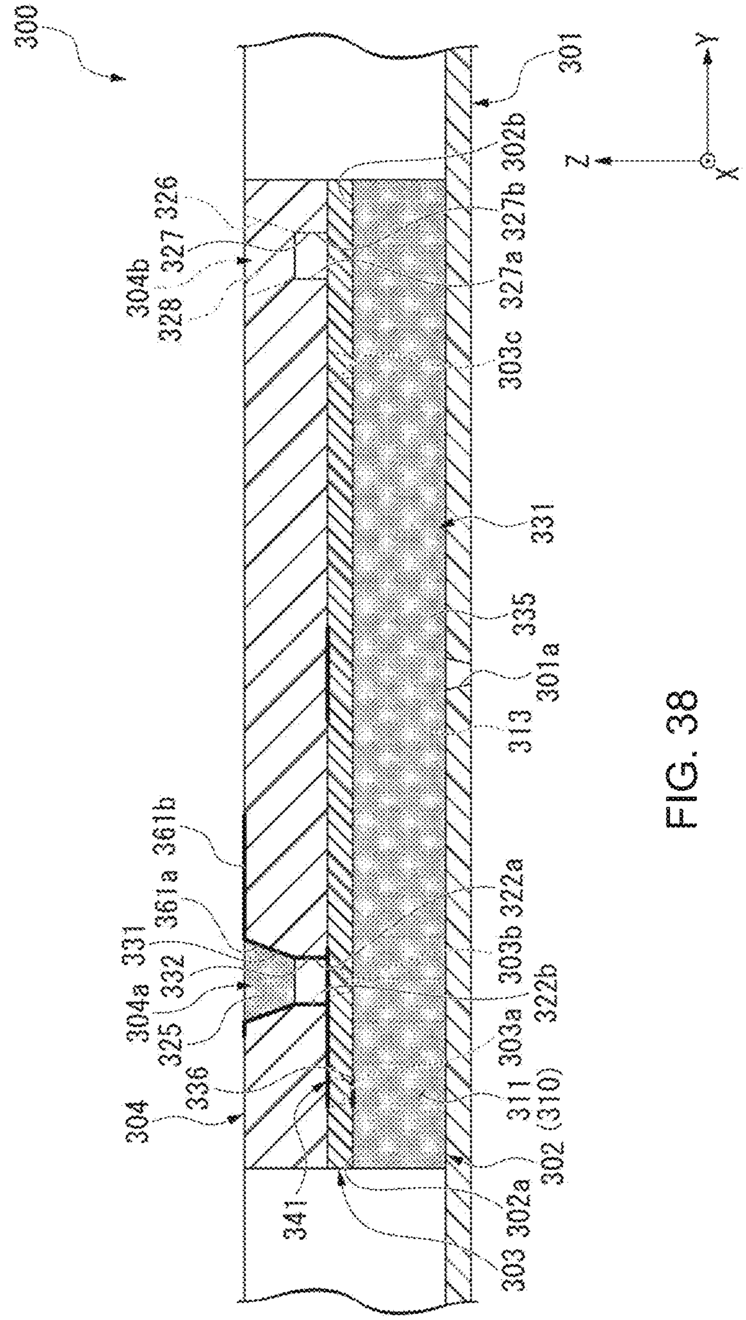
FIG. 38 is a cross-sectional view corresponding to the line XXXVIII-XXXVIII shown in FIG. 37.
Figure 39:
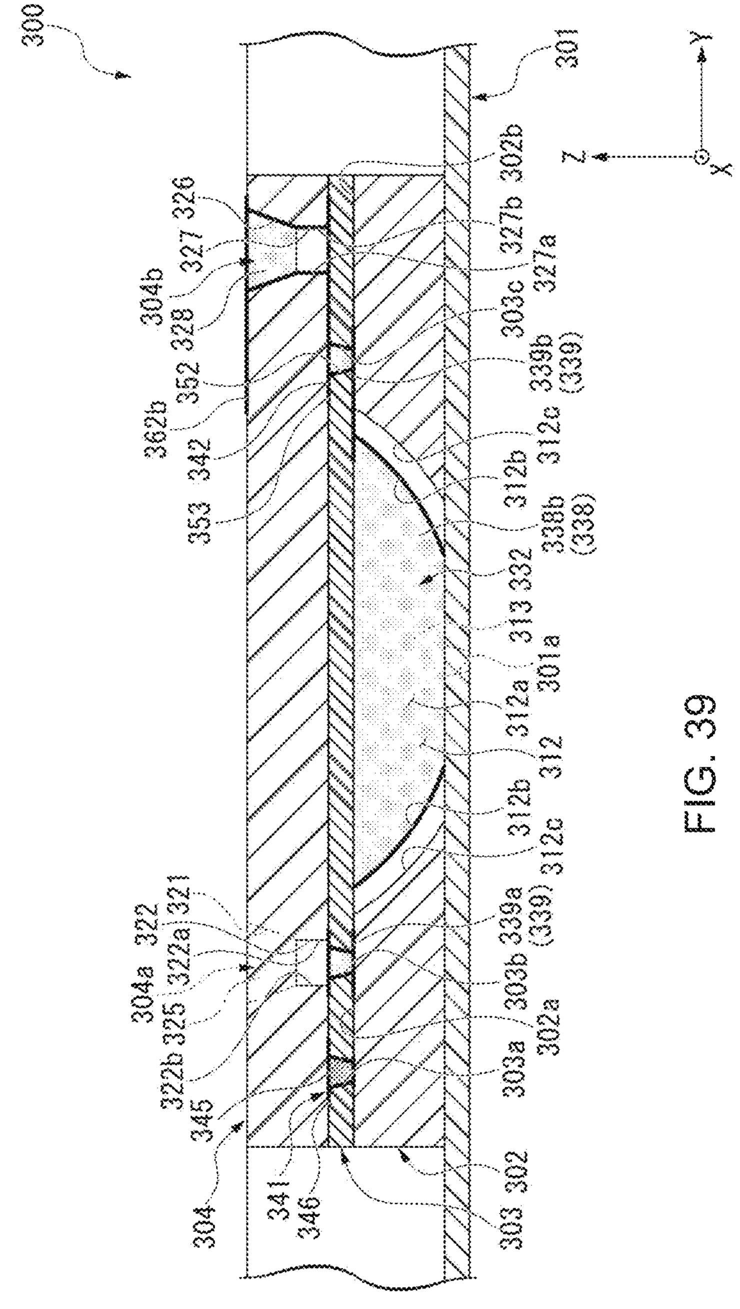
FIG. 39 is a cross-sectional view corresponding to the line XXXIX-XXXIX shown in FIG. 37.

FIG. 37 is an exploded perspective view of a head chip 300 according to a ninth embodiment. FIG. 38 is a cross-sectional view corresponding to the line XXXVIII-XXXVIII shown in FIG. 37. FIG. 39 is a cross-sectional view corresponding to the line XXXIX-XXXIX shown in FIG. 37.

In each of the embodiments described above, there is described the configuration in which the actuator plate corresponds to the first plate related to the present disclosure, and the cover plate corresponds to the second plate related to the present disclosure, but this configuration is not a limitation. The ninth embodiment is different from the embodiments described above in that an intermediate plate corresponding to the first plate and an obverse-side plate corresponding to the second plate are provided.

As shown in FIG. 37 through FIG. 39, the head chip 300 is provided with a nozzle plate 301, an actuator plate 302, the intermediate plate (the first plate) 303, and the obverse-side plate (the second plate) 304. In the head chip 300, the nozzle plate 301, the actuator plate 302, the intermediate plate 303, and the obverse-side plate 304 are stacked in this order in the Z direction.

The actuator plate 302 is provided with a channel column 310. The channel column 310 includes ejection channels 311 filled with the ink, and non-ejection channels 312 not filled with the ink.

As shown in FIG. 37 and FIG. 38, the ejection channel 311 penetrates the actuator plate 302 in the Z direction, and linearly extends throughout the entire length in the Y direction of the actuator plate 302. The +Y-side opening part in each of the ejection channels 311 is communicated with the entrance common flow channel (not shown). Meanwhile, the −Y-side opening part in each of the ejection channels 311 is communicated with the exit common flow channel (not shown). In other words, the entrance common flow channel and the exit common flow channel are communicated with each other through each of the ejection channels 311.

As shown in FIG. 37 and FIG. 39, the non-ejection channel 312 linearly extends in the Y direction in a portion of the actuator plate 302, the portion being located between the ejection channels 311 adjacent to each other. Portions of the actuator plate 302, the portions each being located between the ejection channel 311 and the non-ejection channel 312 adjacent to each other forms a drive wall (a drive unit) 313.

Both end portions in the Y direction in the non-ejection channel 312 terminate in the actuator plate 302. Therefore, the non-ejection channel 312 is not communicated with the entrance common flow channel and the exit common flow channel. The non-ejection channel 312 is formed to have a circular arc shape convex downward when viewed from the X direction. Specifically, the non-ejection channel 312 is provided with a penetrating part 312*a* located in a central portion in the Y direction, and uprise parts 312*b* connected to both sides in the Y direction to the penetrating part 312*a*.

The penetrating part 312*a* penetrates the actuator plate 302 in the Z direction.

The uprise parts 312*b* each open on the upper surface of the actuator plate 302, and at the same time, the dimension in the Z direction of the uprise part 312*b* gradually decreases as getting away in the Y direction from the penetrating part 312*a*. In other words, an upper end opening part of the non-ejection channel 312 is formed of the penetrating part 312*a* and the uprise part 312*b*. In contrast, a lower end opening part of the non-ejection channel 312 is formed of the penetrating part 312*a*. A dividing groove 312*c* is formed in a central portion in the X direction on the bottom surface of each of the uprise parts 312*b*.

In the following description, a portion of the actuator plate 302 which is located between the ejection channels 311 adjacent to each other, and which is located at the −Y side with respect to the non-ejection channel 312 is referred to as a first tail part 302*a*. A portion of the actuator plate 302 which is located between the ejection channels 311 adjacent to each other, and which is located at the +Y side with respect to the non-ejection channel 312 is referred to as a second tail part 302*b*.

<Intermediate Plate 303>

As shown in FIG. 37 through FIG. 39, the intermediate plate 303 functions as a coupling board for the variety of drive interconnections provided to the actuator plate 302 and the variety of terminal interconnections provided to the obverse-side plate 304. The intermediate plate 303 is a plate member formed of piezoelectric material such as PZT, a resin material such as polyimide, or other nonconductive materials. The intermediate plate 303 has a planar outer shape equivalent to that of the actuator plate 302, and is stacked on the entire area of the upper surface of the actuator plate 302. The intermediate plate 303 is bonded to the upper surface of the actuator plate 302 with an adhesive or the like.

As shown in FIG. 37 and FIG. 39, the intermediate plate 303 is provided with intermediate common holes 303*a*, first intermediate individual holes 303*b*, and second intermediate individual holes 303*c*. The intermediate holes 303*a* through 303*c* are each formed to have a taper shape having the inner diameter gradually decreasing along a direction from the upper side toward the lower side.

The intermediate common hole 303*a* penetrates a portion of the intermediate plate 303 in the Z direction, the portion overlapping the first tail part 302*a* in the plan view. In other words, the intermediate common hole 303*a* is disposed between the ejection channels 311 adjacent to each other.

The first intermediate individual hole 303*b* and the second intermediate individual hole 303*c* are formed separately at both sides in the Y direction with respect to the non-ejection channel 312. Specifically, the first intermediate individual hole 303*b* penetrates a portion of the intermediate plate 303 in the Z direction, the portion overlapping the first tail part 302*a* in the plan view, and the portion being located at the +Y side of the intermediate common hole 303*a*. The second intermediate individual hole 303*c* penetrates a portion of the intermediate plate 303 in the Z direction, the portion overlapping the second tail part 302*b* in the plan view. In other words, the first intermediate individual hole 303*b* and the second intermediate individual hole 303*c* are disposed for each of the non-ejection channels 312.

<Obverse-Side Plate 304>

The obverse-side plate 304 is used for coupling the head chip 300 and the flexible printed board (external interconnections) to each other. The obverse-side plate 304 is a plate member formed of piezoelectric material such as PZT, a resin material such as polyimide, or other nonconductive materials. In this case, the intermediate plate 303 and the obverse-side plate 304 may be formed of materials of the same type, or may be formed of respective materials different in type from each other.

The obverse-side plate 304 has a planar outer shape equivalent to that of the intermediate plate 303, and is stacked on the entire area of the upper surface of the intermediate plate 303. The obverse-side plate 304 is bonded to the upper surface of the intermediate plate 303 with an adhesive or the like.

As shown FIG. 37 and FIG. 38, the obverse-side plate 304 is provided with obverse-side common holes 304*a* and obverse-side individual holes 304*b*.

The obverse-side common hole 304*a* penetrates a portion of the obverse-side plate 304 in the Z direction, the portion (the portion located between the first tail parts 302*a* adjacent to each other) overlapping the −Y-side end portion in the ejection channel 311 in the plan view. In other words, the obverse-side common hole 304*a* is disposed so as to correspond to each of the ejection channels 311. The obverse-side common holes 304*a* are arranged so as to be shifted in the X direction from the intermediate common holes 303*a* in the plan view. Meanwhile, in a side view, the lower end opening part of the obverse-side common hole 304*a* is located at the +Y side with respect to the intermediate common hole 303*a*.

The obverse-side common hole 304*a* is provided with the upper recessed part 321 and the lower recessed part 322 similarly to the embodiments described above. The obverse-side common hole 304*a* opens on the upper surface of the obverse-side plate 304. Specifically, the upper recessed part 321 forms an upper end opening part of the obverse-side common hole 304*a*. The upper recessed part 321 is formed to have a taper shape having an inner diameter in at least the Y direction gradually decreasing in a direction from the upper side toward the lower side in a cross-sectional view.

The lower recessed part 322 opens on the lower surface of the obverse-side plate 304. Specifically, the lower recessed part 322 forms a lower end opening part of the obverse-side common hole 304*a*. The lower recessed part 322 is formed like a groove extending in the X direction so as to straddle all of the upper recessed parts 321. The lower recessed part 322 is communicated with the inside of the upper recessed part 321 through a portion overlapping the upper recessed part 321 in the plan view. In the obverse-side common hole 304*a*, a portion communicated with the upper recessed part 321 and the lower recessed part 322 forms a first penetrating part 325 penetrating the obverse-side plate 304 in the Z direction.

The dimension in the Y direction of the lower recessed part 322 is made equivalent to the dimension in the Y direction in the lower end opening part of the upper recessed part 321. In the illustrated example, the dimension in the Y direction in the lower recessed part 322 is uniform throughout the entire length in the Z direction. Out of the pair of inner surfaces opposed in the Y direction to each other in the lower recessed part 322, a +Y-side inner surface (the first inner surface part) 322*a* continues (is arranged at the same position in the plan view) from the same position in the plan view as the position of the +Y-side opening edge of the lower end opening edge of the upper recessed part 321 without a step. Therefore, the +Y-side inner surface 322*a* is located within a dimensional range of the lower end opening part of the upper recessed part 321 viewed from the Z direction, and continuously extends with respect to the inner surface of the upper recessed part 321.

Out of the pair of inner surfaces opposed in the Y direction to each other in the lower recessed part 322, a −Y-side inner surface (the first inner surface part) 322*b* continues (is arranged at the same position in the plan view) from the same position in the plan view as the position of the −Y-side opening edge of the lower end opening edge of the upper recessed part 321 without a step. Therefore, the −Y-side inner surface 322*b* is located within a dimensional range of the lower end opening part of the upper recessed part 321 viewed from the Z direction, and continuously extends with respect to the inner surface of the upper recessed part 321.

It should be noted that the +X-side end portion in the lower recessed part 322 is located at the +X side with respect to the upper recessed part 321 located at the extreme +X side of the upper recessed parts 321. The −X-side end portion in the lower recessed part 322 is located at the −X side with respect to the upper recessed part 321 located at the extreme −X side of the upper recessed parts 321.

As shown in FIG. 37 and FIG. 39, the obverse-side individual hole 304*b* penetrates a portion of the obverse-side plate 304 in the Z direction, the portion (the portion located on each of the second tail parts 302*b*) overlapping the +Y-side end portion in the non-ejection channel 312 in the plan view. In other words, the obverse-side individual hole 304*b* is disposed so as to correspond to each of the non-ejection channels 312. The obverse-side individual hole 304*b*, and the intermediate individual holes 303*b*, 303*c* are lineally arranged in the Y direction. Specifically, the lower end opening part of the obverse-side individual hole 304*b* is located at the +Y side with respect to the second intermediate individual hole 303*c*. It should be noted that the lower end opening part of the obverse-side individual hole 304*b* may be disposed at the −Y side with respect to the second intermediate individual hole 303*c*, or may be formed at the position overlapping the first tail part 302*a* in the plan view.

The obverse-side individual hole 304*b* is provided with an upper recessed part 326 and a lower recessed part 327.

The plurality of upper recessed parts 326 is disposed at intervals in the X direction in the obverse-side plate 304.

The lower recessed part 327 is formed like a groove extending in the X direction so as to straddle all of the upper recessed parts 326. In other words, the lower recessed part 327 is communicated with the inside of the upper recessed part 326 through the portion overlapping the upper recessed part 326 in the plan view. In the obverse-side individual hole 304*b*, a portion communicated with the upper recessed part 326 and the lower recessed part 327 forms a second penetrating part 328 penetrating the obverse-side plate 304 in the Z direction. Out of the pair of inner surfaces opposed in the Y direction to each other in the lower recessed part 327, a +Y-side inner surface (the first inner surface part) 327*a* continues (is arranged at the same position in the plan view) from the same position in the plan view as the position of the +Y-side opening edge of the lower end opening edge of the upper recessed part 326 without a step. Therefore, the +Y-side inner surface 327*a* is located within a dimensional range of the lower end opening part of the upper recessed part 326 viewed from the Z direction, and continuously extends with respect to the inner surface of the upper recessed part 326.

Out of the pair of inner surfaces opposed in the Y direction to each other in the lower recessed part 327, a −Y-side inner surface (the first inner surface part) 327*b* continues (is arranged at the same position in the plan view) from the same position in the plan view as the position of the −Y-side opening edge of the lower end opening edge of the upper recessed part 326 without a step. Therefore, the −Y-side inner surface 327*b* is located within a dimensional range of the lower end opening part of the upper recessed part 326 viewed from the Z direction, and continuously extends with respect to the inner surface of the upper recessed part 326.

It should be noted that the +X-side end portion in the lower recessed part 327 is located at the +X side with respect to the upper recessed part 326 located at the extreme +X side of the upper recessed parts 326. The −X-side end portion in the lower recessed part 327 is located at the −X side with respect to the upper recessed part 326 located at the extreme −X side of the upper recessed parts 326.

Then, a variety of interconnections provided to the head chip 300 will be described.

As shown in FIG. 37 through FIG. 39, the actuator plate 302 is provided with common interconnections 331 and individual interconnections 332 as drive interconnections.

The common interconnections 331 include common electrodes 335 and common extraction interconnections 336.

The common electrodes 335 are respectively formed on inner side surfaces opposed in the X direction to each other out of the inner surfaces of the ejection channel 311. The common electrodes 335 are each formed throughout the entire area in the Y direction and the Z direction on the inner side surface of the ejection channel 311.

As shown in FIG. 37, the common extraction interconnection 336 extends like a strip in the X direction on the upper surface of the first tail part 302*a*. The common extraction interconnection 336 couples the common electrodes 335 opposed in the X direction to each other across the non-ejection channel 312 to each other at the upper end opening edges of the ejection channels 311 which are opposed in the X direction to each other across the non-ejection channel 312.

As shown in FIG. 37 and FIG. 39, the individual interconnections 332 are each provided with individual electrodes 338, and an individual extraction interconnection 339.

The individual electrodes 338 include a first individual electrode 338*a* formed on an inner side surface facing to the −X side and a second individual electrode 338*b* formed on an inner side surface facing to the +X side out of the inner surfaces of the non-ejection channel 312. The individual electrodes 338 are each formed throughout the entire area in the Y direction and the Z direction on the inner side surface of the non-ejection channel 312. The first individual electrode 338*a* and the second individual electrode 338*b* formed in the same non-ejection channel 312 are divided from each other with a dividing groove 312*c*.

The individual extraction interconnections 339 each include a first individual extraction interconnection 339*a* and a second individual extraction interconnection 339*b*.

The first individual extraction interconnection 339*a* extends in the Y direction on the upper surface of the first tail part 302*a*. The first individual extraction interconnection 339*a* is coupled to the first individual electrode 338*a* at the upper end opening edge of the non-ejection channel 312. It should be noted that the first individual extraction interconnection 339*a* is separated from the common extraction interconnection 336 on the obverse surface of the first tail part 302*a*.

The second individual extraction interconnection 339*b* extends in the Y direction on the upper surface of the second tail part 302*b*. The second individual extraction interconnection 339*b* is coupled to the second individual electrode 338*b* at the upper end opening edge of the non-ejection channel 312.

The intermediate plate 303 is provided with common coupling interconnections 341 and individual coupling interconnections 342 as coupling interconnections.

The common coupling interconnections 341 include common penetrating interconnections 345 and a common routing interconnection (the first interconnection) 346.

The common penetrating interconnection 345 is formed on an inner surface of the intermediate common hole 303*a*. Specifically, the common penetrating interconnection 345 is formed on the entire circumference of the inner surface of the intermediate common hole 303*a*, and is formed throughout the entire length in the Z direction. The common penetrating interconnection 345 is coupled to the common extraction interconnection 336 at a lower end opening edge of the intermediate common hole 303*a*.

The common routing interconnection 346 extends in the X direction on the upper surface of the intermediate plate 303 so as to traverse the intermediate common holes 303*a*. The common routing interconnection 346 is coupled to the common penetrating interconnections 345 at the upper end opening edges of the intermediate common holes 303*a*.

The individual coupling interconnections 342 include first individual penetrating interconnections 351, second individual penetrating interconnections 352, and individual routing interconnections (the first interconnections) 353.

The first individual penetrating interconnection 351 is formed throughout the entire length in the Z direction on the inner surface of the first intermediate individual hole 303*b*. The first individual penetrating interconnection 351 is coupled to the first individual extraction interconnection 339*a* at the lower end opening edge of the first intermediate individual hole 303*b*.

The second individual penetrating interconnection 352 is formed throughout the entire length in the Z direction on the inner surface of the second intermediate individual hole 303*c*. The second individual penetrating interconnection 352 is coupled to the second individual extraction interconnection 339*b* at the lower end opening edge of the second intermediate individual hole 303*c*.

The individual routing interconnection 353 is formed on the upper surface of the intermediate plate 303. The individual routing interconnection 353 individually couples the first individual penetrating interconnection 351 located at the −X side with respect to one of the ejection channels 311 and the second individual penetrating interconnection 352 located at the +X side with respect to one of the ejection channels 311 to each other. Thus, the individual electrodes 338*a*, 338*b* opposed in the X direction to each other across one of the ejection channels 311 (the second individual electrode 338*b* of the non-ejection channel 312 located at the +X side with respect to the one ejection channel 311 and the first individual electrode 338*a* of the non-ejection channel 312 located at the −X side with respect to the one ejection channel 311) are coupled to each other.

The obverse-side plate 304 is provided with common terminal interconnections 361 and individual terminal interconnections 362 as terminal interconnections (the second interconnections).

The common terminal interconnections 361 include obverse-side common interconnections 361*a* and common pads 361*b*.

The obverse-side common interconnection 361*a* is formed throughout the entire length in the Z direction on the inner surface of the obverse-side common hole 304*a*. Specifically, an upper half of the obverse-side common interconnection 361*a* is formed in at least a portion located at the +Y side of the inner surface of the upper recessed part 321. An upper end edge of the obverse-side common interconnection 361*a* is located at an upper end opening edge of the upper recessed part 321 (the first penetrating part 323). A lower half of the obverse-side common interconnection 361*a* is formed on at least a +Y-side inner surface 322*a* in the lower recessed part 322. The upper half and the lower half of the obverse-side common interconnection 361*a* are coupled to each other in a boundary portion between the upper recessed part 321 and the lower recessed part 322. A lower end edge of the obverse-side common interconnection 361*a* is located at a lower end opening edge of the lower recessed part 322 (the first penetrating part 323). The lower end edge of the obverse-side common interconnection 361*a* is coupled to the common routing interconnection 346 on the upper surface of the first tail part 302*a*. It should be noted that the obverse-side common interconnection 361*a* is not formed in a portion of the lower recessed part 322, the portion being located between the first penetrating parts 323. In other words, the obverse-side common interconnections 361*a* adjacent to each other are divided by a portion of the lower recessed part 322, the portion being located between the first penetrating parts 323.

The common pad 361*b* extends in the Y direction on the upper surface of the obverse-side plate 304. The −Y-side end portion of the common pad 361*b* is coupled to an upper end edge of the obverse-side common interconnection 361*a* at the upper end opening edge of the first penetrating part 323.

The individual terminal interconnections 362 include obverse-side individual interconnections 362*a* and individual pads 362*b*.

The obverse-side individual interconnection 362*a* is formed throughout the entire length in the Z direction on the inner surface of the obverse-side individual hole 304*b*. Specifically, an upper half of the obverse-side individual interconnection 362*a* is formed in at least a portion located at the −Y side of the inner surface of the upper recessed part 326. An upper end edge of the obverse-side individual interconnection 362*a* is located at an upper end opening edge of the upper recessed part 326 (the second penetrating part 328). A lower half of the obverse-side individual interconnection 362*a* is formed on at least a −Y-side inner surface 327*a* in the lower recessed part 327. The upper half and the lower half of the obverse-side individual interconnection 362*a* are coupled to each other in a boundary portion between the upper recessed part 326 and the lower recessed part 327. A lower end edge of the obverse-side individual interconnection 362*a* is located at a lower end opening edge of the lower recessed part 327 (the second penetrating part 328). The lower end edge of the obverse-side individual interconnection 362*a* is coupled to the individual routing interconnection 353 on the upper surface of the second tail part 302*b*. It should be noted that the obverse-side individual interconnection 362*a* is not formed in a portion of the lower recessed part 327, the portion being located between the second penetrating parts 328. In other words, the obverse-side individual interconnections 362*a* adjacent to each other are divided by a portion of the lower recessed part 327, the portion being located between the second penetrating parts 328.

The individual pad 362*b* extends in the Y direction on the upper surface of the obverse-side plate 304. The +Y-side end portion of the individual pad 362*b* is coupled to an upper end edge of the obverse-side individual interconnection 362*a* at the upper end opening edge of the second penetrating part 328. It should be noted that a flexible printed board (not shown) is pressure-bonded to the upper surface of the obverse-side plate 304.

<Nozzle Plate 301>

The nozzle plate 301 is bonded to the lower surface of the actuator plate 302 via an adhesive or the like. The nozzle plate 301 is provided with a plurality of nozzle holes 301*a* penetrating the nozzle plate 301 in the Z direction.

Also in the ninth embodiment, substantially the same functions and advantages as in the embodiments described above can be obtained.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording apparatus, but the liquid jet recording apparatus is not limited to the printer. For example, a facsimile machine, an on-demand printing machine, and so on can also be adopted.

In the embodiments described above, the description is presented citing the configuration (a so-called shuttle machine) in which the inkjet heads move with respect to the recording target medium when performing printing as an example, but this configuration is not a limitation. The configuration related to the present disclosure can be adopted as the configuration (a so-called stationary head machine) in which the recording target medium is moved with respect to the inkjet heads in the state in which the inkjet heads are fixed.

In the embodiments described above, there is explained when the recording target medium P is paper, but this configuration is not a limitation. The recording target medium P is not limited to paper, but can also be a metal material or a resin material, and can also be food or the like.

In the embodiments described above, there is explained the configuration in which the liquid jet heads are installed in the liquid jet recording apparatus, but this configuration is not a limitation. Specifically, the liquid to be jetted from the liquid jet heads is not limited to what is landed on the recording target medium, but can also be, for example, a medical solution to be blended during a dispensing process, a food additive such as seasoning or a spice to be added to food, or fragrance to be sprayed in the air.

In the embodiments described above, there is explained the configuration in which the Z direction coincides with the gravitational direction, but this configuration is not a limitation, and it is also possible to set the Z direction to a direction along the horizontal direction.

In the embodiments described above, there is described when the upper recessed parts are formed by the sandblasting, and the lower recessed parts are formed by dicing processing, but this configuration is not a limitation. The processing of the upper recessed parts and the processing of the lower recessed parts may appropriately be selected from a variety of processing methods such as the sandblasting, the dicing processing, and etching processing.

In each of the embodiments described above, the description is presented citing when the first plate is the actuator plate or the intermediate plate, and when the second plate is the cover plate or the obverse-side plate as an example, but this configuration is not a limitation.

In each of the embodiments described above, there is described the configuration in which the pads are provided to the second plate itself, but this configuration is not a limitation. The pads may be provided to another plate disposed at an opposite side to the first plate side with respect to the second plate.

Figure 40:
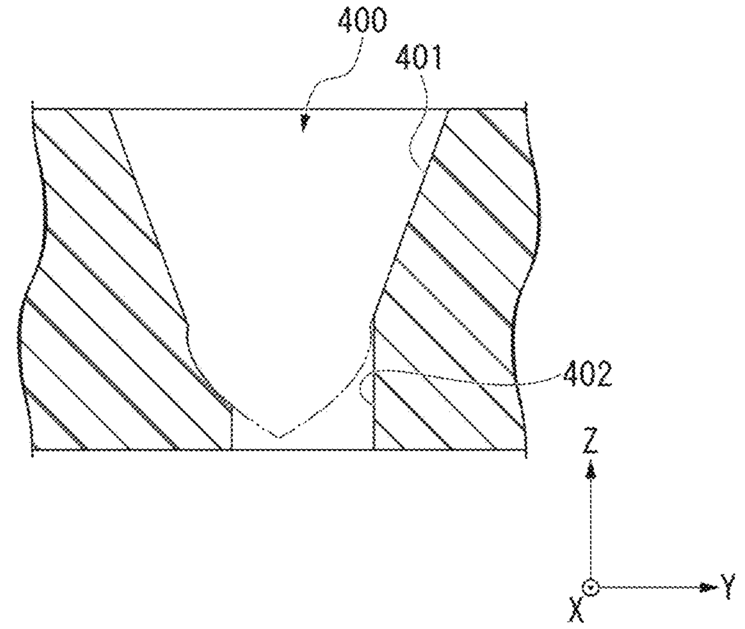
FIG. 40 is a cross-sectional view of a head chip according to a modified example.

In each of the embodiments described above, there is described the configuration in which the surfaces at both sides in the Y direction out of the inner surfaces of the lower recessed part continuously extend from the same position as the position of the lower end opening edge of the upper recessed part, but this configuration is not a limitation. It is sufficient for the inner surface of the lower recessed part to at least partially extend continuously from the same position as the position of the lower end opening edge of the upper recessed part. In this case, the configuration in which the constricted portion 112 formed of the blast mark 110 is completely removed is explained in the embodiments described above, but this configuration is not a limitation. For example, the constricted portion 112 may remain in a part of the boundary between the upper recessed part 401 and the lower recessed part 402 as in a conduction part 400 shown in FIG. 40. In this case, in the lower recessed part 402, a portion from which the constricted portion 112 is removed functions as the second inner surface part.

In each of the embodiments described above, there is described the configuration in which the surfaces at both sides in the X direction out of the inner surfaces of the lower recessed part are disposed at the outer side with respect to the lower end opening edge of the upper recessed part, but this configuration is not a limitation. It is sufficient for the inner surface of the lower recessed part to at least partially be disposed at the outer side with respect to the lower end opening edge of the upper recessed part.

In the embodiments described above, there is described the configuration in which the upper recessed parts are individually disposed so as to correspond to the pressure chambers and the ejection channels, but this configuration is not a limitation. Regarding the upper recessed part, a single upper recessed part may be disposed for a plurality of pressure chambers (or ejection channels).

In the embodiments described above, there is described the configuration in which the penetrating holes and the conduction parts overlap each other in the plan view, but this configuration is not a limitation.

In the embodiments described above, there is described the configuration in which the upper recessed parts are each formed to have the taper shape, but this configuration is not a limitation. The upper recessed parts may each be formed to have a uniform inner diameter.

Figure 41:
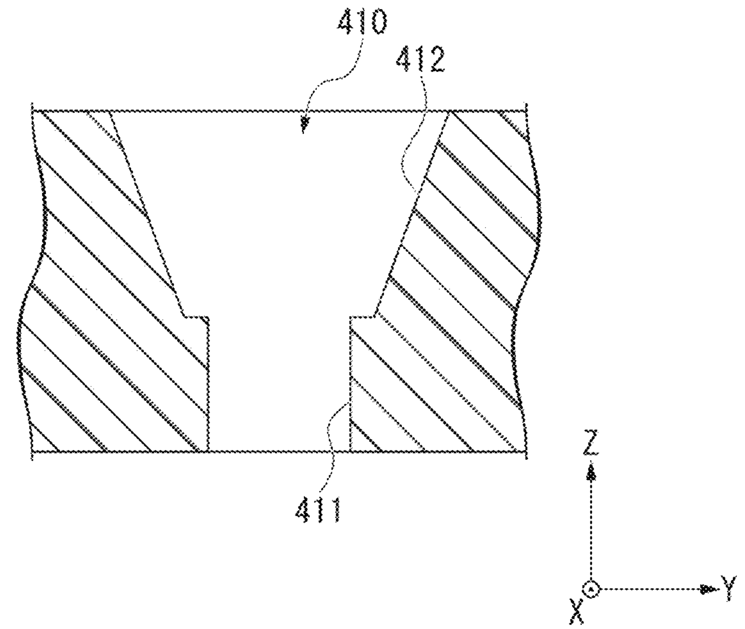
FIG. 41 is a cross-sectional view of a head chip according to a modified example.

In the embodiments described above, there is described the configuration in which a part of the inner surface of the lower recessed part continuously extends from the same position as the position of the lower end opening edge of the upper recessed part, but this configuration is not a limitation. For example, a part (the first inner surface part) of an inner surface of a lower recessed part 411 may be located at an inner side with respect to a lower end opening edge (the second inner surface part) of an upper recessed part 412 as in a conduction part 410 shown in FIG. 41.

Further, a part of the inner surface of the lower recessed part may be disposed coplanar (on the same plane) with the inner surface of the upper recessed part 412.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

a first plate having an obverse surface which faces to a first side in a thickness direction, and which is provided with a first interconnection corresponding to a pressure chamber configured to retain a liquid; and a second plate bonded to the obverse surface, wherein the second plate is provided with a first recessed part opening on a first surface facing to the first side in the thickness direction, and a second recessed part which opens on a second surface facing to a second side opposite to the first side in the thickness direction, and which is communicated with the first recessed part, the second recessed part is provided with a first inner surface part which is located within a dimensional range of the first recessed part viewed from the thickness direction, and which extends in the thickness direction continuously to an inner surface of the first recessed part, or extends in the thickness direction at an inner side with respect to the inner surface of the first recessed part, and a second inner surface part which extends in the thickness direction at an outer side with respect to the inner surface of the first recessed part at a position different from a position of the first inner surface part viewed from the thickness direction, and the second plate is provided with a second interconnection which penetrates the second plate through the first inner surface part and the inner surface of the first recessed part, and which couples an external interconnection disposed at the first side in the thickness direction to the second plate and the first interconnection to each other.

2. The head chip according to claim 1, wherein an opening area on the second surface in the second recessed part is larger than an opening area on the first surface in the first recessed part.

3. The head chip according to claim 1, wherein a plurality of the first recessed parts is disposed at intervals in a first direction crossing the thickness direction, and a plurality of the second recessed parts is disposed so as to correspond respectively to the first recessed parts.

4. The head chip according to claim 1, wherein a plurality of the first recessed parts is disposed at intervals in a first direction crossing the thickness direction, the second recessed part extends in the first direction so as to straddle at least adjacent two of the plurality of first recessed parts, out of inner surfaces of the second recessed part, the first inner surface part extends in the thickness direction continuously to the inner surface of the first recessed part or extends in the thickness direction at an inner side in a second direction crossing the first direction viewed from the thickness direction with respect to the inner surface of the first recessed part, and out of the inner surfaces of the second recessed part, the second inner surface part extends in the thickness direction at an outer side in the first direction with respect to the inner surface of the first recessed part.

5. The head chip according to claim 1, further comprising:

an actuator plate which includes a drive unit disposed so as to face the pressure chamber, and which is configured to deform so as to expand or contract the pressure chamber; and a common electrode and an individual electrode which are provided to the actuator plate, and which are configured to generate an electric field in the actuator plate to deform the actuator plate, wherein the first interconnection includes a common extraction interconnection coupled to the common electrode, and an individual extraction interconnection coupled to the individual electrode.

6. The head chip according to claim 5, wherein the second interconnection includes a common penetrating interconnection coupled to the common extraction interconnection, and an individual penetrating interconnection coupled to the individual extraction interconnection, and the common penetrating interconnection and the individual penetrating interconnection are formed independently of each other on an inner surface of the first recessed part and the second recessed part communicated with each other.

7. The head chip according to claim 5, wherein the second interconnection includes a common penetrating interconnection coupled to the common extraction interconnection, and an individual penetrating interconnection coupled to the individual extraction interconnection, the second recessed part is provided with a common-use recessed part communicated with the first recessed part, and an individual-use recessed part communicated with the first recessed part in a state of being partitioned from the common-use recessed part with a partition wall, the common penetrating interconnection is formed throughout the inner surface of the first recessed part and an inner surface of the common-use recessed part, and the individual penetrating interconnection is formed throughout the inner surface of the first recessed part and an inner surface of the individual-use recessed part.

8. The head chip according to claim 1, wherein the first recessed part is formed to have a taper shape having an inner diameter decreasing toward the second side in the thickness direction, and a dimension in the thickness direction in the first recessed part is larger than a dimension in the thickness direction in the second recessed part.

9. The head chip according to claim 1, wherein the first recessed part is formed to have a taper shape having an inner diameter gradually decreasing toward the second side in the thickness direction, and a dimension in the thickness direction in the first recessed part is smaller than a dimension in the thickness direction in the second recessed part.

10. A liquid jet head comprising:

the head chip according to claim 1.

11. A liquid jet recording apparatus comprising:

the liquid jet head according to claim 10.

* * * * *